(12) United States Patent
Hakuta et al.

(10) Patent No.: US 9,971,077 B2
(45) Date of Patent: May 15, 2018

(54) MULTILAYER STRUCTURE AND LAMINATE STRUCTURE

(71) Applicant: FUJIFILM Corporation, Tokyo (JP)

(72) Inventors: Shinya Hakuta, Ashigarakami-gun (JP); Ryou Matsuno, Ashigarakami-gun (JP); Takeharu Tani, Ashigarakami-gun (JP); Naoharu Kiyoto, Ashigarakami-gun (JP); Katsuhisa Ohzeki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 397 days.

(21) Appl. No.: 14/633,732

(22) Filed: Feb. 27, 2015

(65) Prior Publication Data

US 2015/0168620 A1 Jun. 18, 2015

Related U.S. Application Data

(63) Continuation of application No. PCT/JP2013/072412, filed on Aug. 22, 2013.

(30) Foreign Application Priority Data

Aug. 31, 2012 (JP) .................... 2012-192164

(51) Int. Cl.
*G02B 5/28* (2006.01)
*G02B 1/11* (2015.01)
(Continued)

(52) U.S. Cl.
CPC ............... *G02B 5/282* (2013.01); *B32B 7/02* (2013.01); *B32B 7/12* (2013.01); *B32B 27/18* (2013.01);
(Continued)

(58) Field of Classification Search
CPC .......... G02B 5/28; G02B 5/285; G02B 5/282; G02B 5/208; G02B 5/0833; G02B 5/0294;
(Continued)

(56) References Cited

U.S. PATENT DOCUMENTS

| 2011/0111210 A1 | 5/2011 | Matsunami et al. |
| 2013/0215501 A1 | 8/2013 | Hisamitsu et al. |

FOREIGN PATENT DOCUMENTS

| JP | 11-126024 A | 5/1999 |
| JP | 2006-110807 A | 4/2006 |

(Continued)

OTHER PUBLICATIONS

Chinese Office Action and Search Report for Chinese Application No. 201380044939.1, dated Nov. 17, 2015, with a partial English translation.

(Continued)

*Primary Examiner* — Jie Lei
(74) *Attorney, Agent, or Firm* — Birch, Stewart, Kolasch & Birch, LLP

(57) ABSTRACT

A multilayer structure including a metal particles-containing layer, a layer A having a refractive index, n1, and a layer B having a refractive index, n2, and satisfying one of the conditions (1-1) and (2-1) is capable of suppressing reflection of light at a wavelength λ intended to prevent reflection.

$n1 < n2$ and $$\lambda/4 + m\lambda/2 < n1 \times d1 < \lambda/2 + m\lambda/2 \quad \text{Condition (1-1)}$$

$n1 > n2$ and $$0 + m\lambda/2 < n1 \times d1 < \lambda/4 + m\lambda/2 \quad \text{Condition (2-1)}$$

(Continued)

wherein m represents an integer of 0 or greater; λ represents a wavelength with a unit of nm intended to prevent reflection; n1 represents a refractive index of the layer A; and d1 represents a thickness with a unit of nm of the layer A.

31 Claims, 4 Drawing Sheets

(51) Int. Cl.
| | |
|---|---|
| *B32B 7/02* | (2006.01) |
| *B32B 27/18* | (2006.01) |
| *B32B 7/12* | (2006.01) |
| *B32B 27/36* | (2006.01) |
| *G02B 1/111* | (2015.01) |
| *G02B 1/116* | (2015.01) |
| *G02B 5/02* | (2006.01) |

(52) U.S. Cl.
CPC ............... *B32B 27/36* (2013.01); *G02B 1/11* (2013.01); *B32B 2264/105* (2013.01); *B32B 2307/418* (2013.01); *B32B 2605/006* (2013.01); *G02B 1/111* (2013.01); *G02B 1/116* (2013.01); *G02B 5/0242* (2013.01); *G02B 5/0294* (2013.01)

(58) Field of Classification Search
CPC ......... G02B 5/0242; G02B 1/11; G02B 1/111; G02B 1/115; G02B 1/101; G02B 1/116; B32B 7/12; B32B 7/02; B32B 27/36; B32B 27/18; B32B 2307/418; B32B 2264/105; B32B 2605/006; B32B 17/1077; G11B 5/714; G11B 5/7021; C08J 5/18
USPC ....... 359/359, 360, 580, 581, 584–586, 589, 359/884; 428/328, 327, 425.9, 425.6
See application file for complete search history.

(56) References Cited

FOREIGN PATENT DOCUMENTS

| JP | 2011-118347 A | 6/2011 |
|---|---|---|
| JP | 2012-108207 A | 6/2012 |
| WO | 2012/057199 A1 | 5/2012 |

OTHER PUBLICATIONS

Japanese Office Action dated Jun. 23, 2015, issued in corresponding Japanese Patent Application No. 2012-192164.
Shigeki Daikuhara, Optical Film Thickness Monitor, Journal of the Surface Finishing Society of Japan, The Surface Finishing Society of Japan, 1989, vol. 40, No. 2, pp. 60-66.
International Preliminary Report on Patentability and Written Opinion of the International Searching Authority (forms PCT/IB/338, PCT/IB/373, PCT/ISA/237 and PCT/IB/326), dated Mar. 12, 2015, for International Application No. PCT/JP2013/072412, along with English translations.
International PCT/ISA/237 Search Report issued in PCT/JP2013/072412, dated Oct. 29, 2013.
PCT/ISA/237—Issued in PCT/JP2013/072412, dated Oct. 29, 2013.
Chinese Office Action and English translation thereof, dated Jul. 14, 2016, for corresponding Chinese Application No. 201380044939.1.

MULTILAYER STRUCTURE AND LAMINATE STRUCTURE

CROSS-REFERENCE TO RELATED APPLICATIONS

This application is a Continuation of PCT International Application No. PCT/JP2013/072412, filed Aug. 22, 2013, which claims priority under 35 U.S.C. Section 119(a) to Japanese Patent Application No. 2012-192164 filed on Aug. 31, 2012. Each of the above applications is hereby expressly incorporated by reference, in its entirety, into the present application.

BACKGROUND OF THE INVENTION

Field of the Invention

The present invention relates to a multilayer structure and a laminate structure obtained by using the multilayer structure. Specifically, the present invention relates to a multilayer structure capable of suppressing reflected light at a wavelength λ intended to prevent reflection and a laminate structure obtained by using the multilayer structure.

Background Art

In recent years, as one of energy saving measures for reducing carbon dioxide, heat ray shieldability-imparting materials have been developed for windows of vehicles and buildings. From the viewpoint of heat ray shieldability (solar heat gain coefficient), desired are heat reflective types with no reradiation rather than heat absorbing types with indoor reradiation of absorbed light (in an amount of about ⅓ of the absorbed solar energy), for which various proposals have been made.

For example, a thin metal film of Ag is generally used as a heat ray reflecting material since the reflectance is high, but reflects not only visible light or heat rays but also radio waves, and thus has a problem in that the visible light transmittance and the radio wave transmittance are low. For increasing the visible light transmittance, Low-E glass (for example, manufactured by Asahi Glass) using a multilayer film of Ag and ZnO is widely used in buildings, but the Low-E glass has a problem in that the radio wave transmittance is low since a metal thin film of Ag is formed on the glass surface.

As a method for solving the problem, Patent Reference 1 discloses a heat ray shielding material which has a metal particles-containing layer containing at least one type of metal particle, in which the metal particles are tabular metal particles having a substantially hexagonal to circular forms in a ratio of at least 60% by number and the main plane of tabular metal particles is plane-oriented in a range of 00 to ±300 relative to one surface of the metal particles-containing layer. With this configuration, it is possible to provide a heat ray shielding material which has high reflection wavelength selectivity and reflection bandwidth selectivity, and excellent transmittance at a wavelength intended to prevent reflection.

Further, in regard to a radio wave transmissible wavelength selection plate formed by providing a layer made of Ag fine particles on a transparent substrate, Patent Reference 2 discloses that inconvenience in which diffused reflection in a wavelength range of visible light becomes increased can be solved when a resonant wavelength is adjusted to be in the range of 600 nm to 1500 nm for the purpose of increasing a near-infrared ray shielding factor (Es) using the radio wave transmissible wavelength selection plate in which a transparent dielectric layer having a dielectric constant greater than that of the transparent substrate forms a film having an optical film thickness of 20 nm to 600 nm and a layer formed of Ag fine particles is formed on the dielectric layer.

However, the method described in Patent Reference 1 is only to provide a dielectric layer for changing the resonant wavelength of the Ag film and a concept of suppressing intensity of reflected light of the Ag film has not been researched. Further, in the Patent Reference 1, the relationship between the wavelength intended to suppress the reflected light and the film thickness of the dielectric layer has not been researched.

Patent Reference 3 discloses a front plate which is placed on the front surface of a display panel and used for preventing reflection, shielding electromagnetic waves, and the like. Further, Patent Reference 3 described that a screen which is excellent in terms of preventing reflection, cutting electromagnetic waves, and cutting infrared rays and has excellent transparency can be displayed by means of using a front plate for display in which a first anti-reflection film is provided on a surface on an observer side of a transparent base substrate through an adhesive layer, and a filter film for cutting near-infrared rays and shielding electromagnetic waves and a second anti-reflection film are respectively disposed in order through the adhesive layer on the surface on the opposite side of the surface on the observer side of the base substrate.

However, a mesh formed of a metallic thin film or an ITO film is exemplified as a filter film for cutting near-infrared rays or shielding electromagnetic waves in Patent Reference 2. They are heat absorbing types, a configuration of a heat reflective type is not described in Patent Reference 2, and research on a transmission spectrum is only made in Examples and a reflection spectrum is not researched. In addition, in Patent Reference 2, even though an anti-reflection film having an anti-reflection layer (AR) is arranged on both surfaces of the filter film for cutting near-infrared rays or shielding electromagnetic waves, the anti-reflection film is not arranged such that optical interference between the anti-reflection film and the filter film for cutting near-infrared rays or shielding electromagnetic waves may occur, and accordingly, the reflected light from the filter film for cutting near-infrared rays or shielding electromagnetic waves cannot be suppressed. Moreover, as the anti-reflection layer (AR) in Patent Reference 2, a layer obtained by alternately laminating a high refractive index layer such as a Ti oxide or zirconium and a low refractive index layer of a silicon oxide can be exemplified, but this layer is also a heat absorbing type and does not have a configuration of a heat reflective type.

CITATION LIST

Patent References

Patent Reference 1: JP-A-2011-118347
Patent Reference 2: JP-A-2006-110807
Patent Reference 3: JP-A-11-126024

SUMMARY OF INVENTION

As a result of research on the heat ray shielding material disclosed in Patent Reference 1 conducted by the present inventor, it is found that the reflectance (solar radiation) of heat rays at a wavelength intended to reflect light is excellent and the heat ray reflective type heat ray shielding material can be used in more various applications when the transmittance can be increased by further suppressing the reflectance at a wavelength intended to prevent reflection.

Moreover, in regard to the laminate structures disclosed in Patent References 2 and 3, it is found that the reflectance at a wavelength intended to prevent reflection of a metal particles-containing layer cannot be suppressed.

An object of the present invention is to solve the above-described problems in the related art and to achieve the purpose described below. That is, the object to be solved by the present invention is to provide a multilayer structure capable of suppressing reflected light at a wavelength $\lambda$ intended to prevent reflection.

In order to solve the above-described problem, as a result of intensive research on transmission and the reflection phase of the metal particles-containing layer conducted by the present inventor, it is found that reflected light at a wavelength $\lambda$ intended to prevent reflection can be suppressed using a multilayer structure obtained by providing a layer for optical interference on one surface side of the metal particles-containing layer and another layer thereon and by adjusting the thickness of the layer for optical interference to have an appropriate optical thickness (product of the refractive index and the film thickness) using the wavelength $\lambda$ intended to prevent reflection as a reference, thereby completing the present invention. Further, the range of optical thickness of the layer for optical interference which is defined in the present invention is different from $\lambda/4$ which is a thickness of a normal dielectric layer for preventing reflection and a range thereof different from that in the related art is defined in the present invention.

The present invention as specific means for solving the above-described problems is as follows.

[1] A multilayer structure including a metal particles-containing layer; a layer A having a refractive index, n1; and a layer B having a refractive index, n2 in order, wherein one of the following conditions (1-1) and (2-1) is satisfied, Condition (1-1): n1<n2 and Expression (1-1) below are satisfied, $$\lambda/4 + m\lambda/2 < n1 \times d1 < \lambda/2 + m\lambda/2 \qquad \text{Expression (1-1)}$$

wherein in Expression (1-1), m represents an integer of 0 or greater; $\lambda$ represents a wavelength (unit: nm) intended to prevent reflection; n1 represents a refractive index of the layer A; and d1 represents a thickness (unit: nm) of the layer A, Condition (2-1): n1>n2 and Expression (2-1) below are satisfied, $$0 + m\lambda/2 < n1 \times d1 < \lambda/4 + m\lambda/2 \qquad \text{Expression (2-1)}$$

wherein in Expression (2-1), m represents an integer of 0 or greater; $\lambda$ represents a wavelength (unit: nm) intended to prevent reflection; n1 represents a refractive index of the layer A; and d1 represents a thickness (unit: nm) of the layer A.

[2] In the multilayer structure according to [1], it is preferable that one of the following conditions (1-2) and (2-2) is satisfied.

Condition (1-2): n1<n2 and Expression (1-2) below are satisfied.

$$7\lambda/24 + m\lambda/2 \leq n1 \times d1 \leq 11\lambda/24 + m\lambda/2 \qquad \text{Expression (1-2)}$$

wherein in Expression (1-2), m represents an integer of 0 or greater; $\lambda$ represents a wavelength (unit: nm) intended to prevent reflection; n1 represents a refractive index of the layer A; and d1 represents a thickness (unit: nm) of the layer A.

Condition (2-2): n1>n2 and Expression (2-2) below are satisfied.

$$1\lambda/24 + m\lambda/2 \leq n1 \times d1 \leq 5\lambda/24 + m\lambda/2 \qquad \text{Expression (2-2)}$$

wherein in Expression (2-2), m represents an integer of 0 or greater; $\lambda$ represents a wavelength (unit: nm) intended to prevent reflection; n1 represents a refractive index of the layer A; and d1 represents a thickness (unit: nm) of the layer A.

[3] In the multilayer structure according to [1] or [2], it is preferable that one of following conditions (1-3) and (2-3) is satisfied.

Condition (1-3): n1<n2 and Expression (1-3) below are satisfied.

$$5\lambda/16 + m\lambda/2 \leq n1 \times d1 \leq 7\lambda/16 + m\lambda/2 \qquad \text{Expression (1-3)}$$

wherein in Expression (1-3), m represents an integer of 0 or greater; $\lambda$ represents a wavelength (unit: nm) intended to prevent reflection; n1 represents a refractive index of the layer A; and d1 represents a thickness (unit: nm) of the layer A.

Condition (2-3): n1>n2 and Expression (2-3) below are satisfied.

$$1\lambda/16 + m\lambda/2 \leq n1 \times d1 \leq 3\lambda/16 + m\lambda/2 \qquad \text{Expression (2-3)}$$

wherein in Expression (2-3), m represents an integer of 0 or greater; $\lambda$ represents a wavelength (unit: nm) intended to prevent reflection; n1 represents a refractive index of the layer A; and d1 represents a thickness (unit: nm) of the layer A.

[4] In the multilayer structure according to any one of [1] to [3], it is preferable that the metal particles-containing layer is a silver particles-containing layer.

[5] In the multilayer structure according to any one of [1] to [4], it is preferable that a main component in a form of metal particles in the metal particles-containing layer is tabular metal particles having a hexagonal to circular forms.

[6] In the multilayer structure according to any one of [1] to [5], it is preferable that 80% by number or more of the tabular metal particles having a hexagonal to circular forms relative to the total number of the hexagonal to circular tabular metal particles contained in the metal particules-containing layer are present in a range of $\lambda/4$ ($\lambda$ represents a wavelength (unit: nm) intended to prevent reflection) in terms of the thickness in the metal particles-containing layer.

[7] In the multilayer structure according to any one of [1] to [6], it is preferable that the thickness of the metal particles-containing layer is $\lambda/4$ ($\lambda$ represents a wavelength (unit: nm) intended to prevent reflection) or less.

[8] In the multilayer structure according to any one of [1] to [7], it is preferable that one side of the metal particles-containing layer includes a layer C in contact with the layer B and the layer B satisfies Expression (3-1) below.

$$L\lambda/4 - \lambda/8 \leq n2 \times d2 \leq L\lambda/4 + \lambda/8 \qquad \text{Expression (3-1)}$$

wherein in Expression (3-1), L represents an integer of 1 or greater; $\lambda$ represents a wavelength (unit: nm) intended to prevent reflection; n2 represents a refractive index of the layer B; and d2 represents a thickness (unit: nm) of the layer B.

[9] In the multilayer structure according to [8], it is preferable that the layer B satisfies Expression (3-2) below.

$$L\lambda/4 - \lambda/12 \leq n2 \times d2 \leq L\lambda/4 + \lambda/12 \qquad \text{Expression (3-2)}$$

wherein in Expression (3-2), L represents an integer of 1 or greater; $\lambda$ represents a wavelength (unit: nm) intended to prevent reflection; n2 represents a refractive index of the layer B; and d2 represents a thickness (unit: nm) of the layer B.

[10] In the multilayer structure according to [8] or [9], it is preferable that the layer B satisfies Expression (3-3) below.

$$L\lambda/4-\lambda/16 \leq n2 \times d2 \leq L\lambda/4+\lambda/16 \quad \text{Expression (3-3)}$$

wherein in Expression (3-3), L represents an integer of 1 or greater; λ represents a wavelength (unit: nm) intended to prevent reflection; n2 represents a refractive index of the layer B; and d2 represents a thickness (unit: nm) of the layer B.

[11] In the multilayer structure according to any one of [1] to [10], it is preferable that one side of the metal particles-containing layer includes the layer C in contact with the layer B and the layer B satisfies Expression (4-1) below.

$$k\lambda'/4-\lambda/8 \leq n2 \times d2 \leq k\lambda'/4+\lambda/8 \quad \text{Expression (4-1)}$$

wherein in Expression (4-1), k represents an integer of 1 or greater; λ' represents a wavelength (unit: nm) intended to have strong reflection; n2 represents a refractive index of the layer B; and d2 represents a thickness (unit: nm) of the layer B.

[12] In the multilayer structure according to [11], it is preferable that the layer B satisfies Expression (4-2) below.

$$k\lambda'/4-\lambda/12 \leq n2 \times d2 \leq k\lambda'/4+\lambda/12 \quad \text{Expression (4-2)}$$

wherein in Expression (4-2), k represents an integer of 1 or greater; λ' represents a wavelength (unit: nm) intended to have strong reflection; n2 represents a refractive index of the layer B; and d2 represents a thickness (unit: nm) of the layer B.

[13] In the multilayer structure according to [11] or [12], it is preferable that the layer B satisfies Expression (4-3) below.

$$k\lambda'/4-\lambda/16 \leq n2 \times d2 \leq k\lambda'/4+\lambda/16 \quad \text{Expression (4-3)}$$

wherein in Expression (4-3), k represents an integer of 1 or greater; λ' represents a wavelength (unit: nm) intended to have strong reflection; n2 represents a refractive index of the layer B; and d2 represents a thickness (unit: nm) of the layer B.

[14] In the multilayer structure according to any one of [8] or [13], it is preferable that the layer B is a laminate formed of a plurality of layers B' and all of the layers B' respectively satisfy at least one of Expressions (3-1) and (4-1) described above.

[15] In the multilayer structure according to any one of [8] or [14], it is preferable that a refractive index n3 of the layer C is greater than a refractive index n2 of the layer B.

[16] In the multilayer structure according to any one of [1] or [15], it is preferable that a second layer A and a second layer B which satisfy the above-described condition (1-1) or (2-1) are present on the opposite side of the layer A and the layer B of the metal particles-containing layer.

[17] In the multilayer structure according to any one of [1] or [16], it is preferable that m is 1 or more.

[18] It is preferable that the multilayer structure according to any one of [1] or [17] includes a support.

[19] It is preferable that the multilayer structure according to any one of [1] or [18] includes a support and the support is the layer B.

[20] It is preferable that the multilayer structure according to any one of [8] or [19] includes a support and the support is the layer C.

[21] In the multilayer structure according to any one of [18] or [20], it is preferable that the refractive index at a wavelength λ (λ represents a wavelength (unit: nm) intended to prevent reflection) of the support is 1.55 or more.

[22] In the multilayer structure according to any one of [18] or [21], it is preferable that the support contains PET as a main component.

[23] In the multilayer structure according to any one of [1] or [22], it is preferable that the minimum value of a reflection spectrum is present in the range of visible light having a wavelength of 380 nm to 780 nm.

[24] In the multilayer structure according to any one of [1] or [23], it is preferable that the minimum value of the reflection spectrum is present in the range of a wavelength of 380 nm to 780 nm in the reflection spectrum in the range of a wavelength of 380 nm to 1500 nm.

[25] In the multilayer structure according to any one of [1] or [24], it is preferable that the visible light transmittance thereof is 60% or more.

[26] In the multilayer structure according to any one of [1] or [25], it is preferable that the haze value thereof is 5% or less.

[27] In the multilayer structure according to any one of [1] or [26], it is preferable that the wavelength λ intended to prevent reflection is in the range of 400 nm to 700 nm.

[28] It is preferable that the multilayer structure according to any one of [1] or [27] is used for a heat ray shielding material.

[29] It is preferable that the multilayer structure according to any one of [1] or [28] further includes an adhesive layer.

[30] In the multilayer structure according to [29], it is preferable that a second layer A and a second layer B which satisfy the above-described condition (1-1) or (2-1) are present on the opposite side of the layer A and the layer B of the metal particles-containing layer and the second layer B is the adhesive layer.

[31] A laminate structure which is obtained by laminating the multilayer structure according to any one of [1] to [30] and one of glass and plastic.

According to the present invention, it is possible to provide a multilayer structure capable of suppressing reflection of light at a wavelength λ intended to prevent reflection.

DESCRIPTION OF EMBODIMENTS

Figure 1:
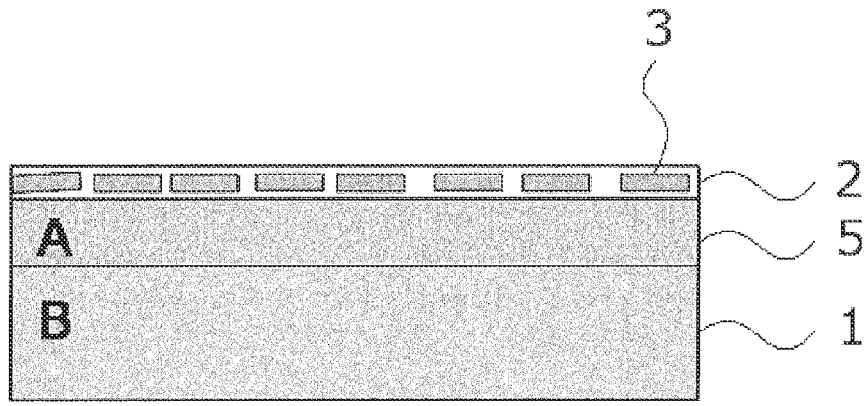
FIG. 1 is a view schematically illustrating an example of a multilayer structure according to the present invention.

The description of the constituent elements of the present invention described below may be for some typical embodiments of the present invention, to which, however, the present invention should not be limited. In this description, the numerical range expressed by the wording "a number to another number" means the range that falls between the former number indicating the lower limit of the range and the latter number indicating the upper limit thereof.

[Multilayer Structure]

A multilayer structure of the present invention includes a metal particles-containing layer; a layer A whose refractive index is n1; and a layer B whose refractive index is n2 in order, and one of following conditions (1-1) and (2-1) is satisfied.

Condition (1-1): n1<n2 and Expression (1-1) below are satisfied.

$$\lambda/4+m\lambda/2 < n1 \times d1 < \lambda/2 + m\lambda/2 \qquad \text{Expression (1-1)}$$

In Expression (1-1), m represents an integer of 0 or greater; λ represents a wavelength (unit: nm) intended to prevent reflection; n1 represents a refractive index of the layer A; and d1 represents a thickness (unit: nm) of the layer A.

Condition (2-1): n1>n2 and Expression (2-1) below are satisfied.

$$0 + m\lambda/2 < n1 \times d1 < \lambda/4 + m\lambda/2 \qquad \text{Expression (2-1)}$$

In Expression (2-1), m represents an integer of 0 or greater; λ represents a wavelength (unit: nm) intended to prevent reflection; n1 represents a refractive index of the layer A; and d1 represents a thickness (unit: nm) of the layer A.

<Optical Characteristics>

By employing such a configuration, the multilayer structure of the present invention can suppress reflected light at a wavelength λ intended to prevent reflection. Although not adhering to any theories, it is predicted that optical phase rotation of light reflection of the metal particles-containing layer becomes −90° from the results of optical simulation using an FDTD method and Examples described below. The phase rotation angle is different from 0° occurring in a dielectric (interface with a substance having a low refractive index) or from 180° (interface with a substance having a high refractive index). For this reason, it is considered that reflected light at a wavelength λ intended to prevent reflection of a metal particles-containing layer for the first time can be suppressed by controlling the film thickness so as to satisfy the conditions specific to the metal particles-containing layer.

The wavelength λ intended to prevent reflection is not particularly limited, and examples thereof include respective bandwidths of visible light, infrared light, and UV light. Among these, visible light is preferable and the wavelength λ intended to prevent reflection in the multilayer structure of the present invention is preferably in the range of 380 nm to 780 nm, more preferably in the range of 400 nm to 700 nm, particularly preferably in the range of 450 nm to 650 nm, and most preferably in the range of 500 nm to 630 nm. Since the reflected light of the metal particles-containing layer in visible light leads to glare in appearance or deterioration of visible light transmittance, it is preferable to prevent reflection in the above-described range.

In a case of a structure interposed between a PET film and normal glass, the visible light reflectance of the multilayer structure of the present invention is preferably less than 15.0%, more preferably 10.3% or less, particularly preferably 10% or less, more particularly preferably 9.5% or less, and still more particularly preferably 9% or less. However, in a case of using a high refractive index substrate or glass, the total visible light reflectance is not limited thereto.

Further, the visible light transmittance, the visible light reflectance, and solar reflectance in the present specification are values defined based on JIS A5759.

In the multilayer structure of the present invention, the minimum value of the reflection spectrum is present preferably in a region of visible light having a wavelength of 380 nm to 780 nm, more preferably in the range of 400 nm to 700 nm, particularly preferably in the range of 450 nm to 650 nm, and most preferably in the range of 500 nm to 630 nm.

In the multilayer structure of the present invention, in a case of the reflection spectrum in the range of 380 nm to 1500 nm, the minimum value of the reflection spectrum is present preferably in the range of 380 nm to 780 nm and particularly preferably in the range of 400 nm to 700 nm.

The haze of the multilayer structure of the present invention is preferably 5% or less from viewpoints of improvement of the appearance and the visibility, more preferably 2% or less, particularly preferably 1.5% or less from a viewpoint of easily obtaining effects of the present invention by reducing the visible light scattering amount derived from the metal particles-containing layer and making optical interference occur easily, more particularly preferably 1.4% or less, still more particularly preferably 1.35% or less, and most preferably 1.3% or less. Further, when the haze is more than 20%, it is unfavorable for safety since the material may cause trouble in seeing outside objects when used, for example, for glass for automobiles or glass for buildings.

It is preferable that the maximum value of the solar reflectance of the multilayer structure of the present invention is present in the range of 600 nm to 2000 nm (preferably in the range of 800 nm to 1800 nm) in terms of increasing the efficiency of solar reflectance. The solar reflectance of the multilayer structure of the present invention is preferably 10% or more, more preferably 15% or more, and particularly preferably more than 15.3%.

The visible light reflectance of the multilayer structure of the present invention is preferably 60% or more from a viewpoint of easily obtaining effects of the present invention by reducing the visible light scattering amount derived from the metal particles-containing layer and making optical interference occur easily, more preferably 65% or more, and particularly preferably 70% or more. Further, when the visible light reflectance is less than 60%, the material may cause trouble in seeing outside objects when used, for example, for glass for automobiles or glass for buildings.

The UV transmittance of the multilayer structure of the present invention is preferably 5% or less and more preferably 2% or less. When the UV transmittance exceeds 5%, the color of the tabular metal particle layer is changed due to UV rays of sunlight in some cases.

<Layer Configuration/Form>

The multilayer structure of the present invention may include other layers in addition to the layer A and the layer B. For example, an embodiment having other layers such as an adhesive layer, a UV absorbent layer, a support (substrate), and a metal oxide particles-containing layer according to the necessity is also preferable.

Hereinafter, the layer structure and a preferred embodiment of the form of the multilayer structure of the present invention will be described with reference to the accompanying drawings.

(Configuration of FIG. 1)

As the layer structure of the multilayer structure, as illustrated in FIG. 1, an embodiment which includes a metal particles-containing layer 2 containing at least one kind of metal particle, includes a layer A whose refractive index is n1 as an undercoat layer 5, includes a layer B whose refractive index is n2 as a support 1, and satisfies the condition (1-1) or the condition (2-1) can be exemplified.

Condition (1-1): n1<n2 and Expression (1-1) below are satisfied.

$$\lambda/4+m\lambda/2 < n1 \times d1 < \lambda/2 + m\lambda/2 \qquad \text{Expression (1-1)}$$

In Expression (1-1), m represents an integer of 0 or greater; λ represents a wavelength (unit: nm) intended to prevent reflection; n1 represents a refractive index of the layer A; and d1 represents a thickness (unit: nm) of the layer A.

Condition (2-1): n1>n2 and Expression (2-1) below are satisfied.

$$0+m\lambda/2 < n1 \times d1 < \lambda/4 + m\lambda/2 \qquad \text{Expression (2-1)}$$

In Expression (2-1), m represents an integer of 0 or greater; λ represents a wavelength (unit: nm) intended to prevent reflection; n1 represents a refractive index of the layer A; and d1 represents a thickness (unit: nm) of the layer A.

The preferred range of the condition (1-1) or the condition (2-1) will be described. Further, the following preferred range of the condition (1-1) or the condition (2-1) is the same as that of the multilayer structure of the present invention other than the configuration of FIG. 1.

In Expressions (1-1) and (2-1) above, m represents an integer of 0 or greater and it is preferable that m represents an integer of 0 to 5 from viewpoints of low production cost and robustness of a film thickness.

Further, m is more preferably an integer of 1 to 5 from a viewpoint of capability of performing a design in which both of suppressing reflection of visible light and enhancing reflection of near-infrared light are achieved when the multilayer structure of the present invention is used as a heat ray shielding material and particularly preferably 1 from viewpoints of suppressing reflection of visible light and enhancing reflection of near-infrared light in the vicinity of 1000 nm. Further, enhancing reflection can be achieved by controlling the refractive index and the thickness of the layer B so as to satisfy Expression (4-1) described below.

Further, since the film thickness becomes extremely large and the film thickness is unlikely to be precisely controlled when m is more than 5, m is preferably 5 or less from a viewpoint of productivity.

In addition, m is preferably 0 in some cases from a viewpoint of suppressing a change in color of oblique incident light or suppressing an increase of reflected light.

In consideration of optical effects, since the effect of preventing reflection can be obtained in the range of ±λ/8, it is preferable that the variation is within this range of the film thickness. The range is more preferably in the range of ±λ/12 and most preferably in the range of ±λ/16.

In the multilayer structure of the present invention, it is preferable that one of following conditions (1-2) and (2-2) is satisfied.

Condition (1-2): n1<n2 and Expression (1-2) below are satisfied.

$$7\lambda/24+m\lambda/2 \leq n1 \times d1 \leq 11\lambda/24 + m\lambda/2 \qquad \text{Expression (1-2)}$$

In Expression (1-2), m represents an integer of 0 or greater; λ represents a wavelength (unit: nm) intended to prevent reflection; n1 represents a refractive index of the layer A; and d1 represents a thickness (unit: nm) of the layer A.

Condition (2-2): n1>n2 and Expression (2-2) below are satisfied.

$$1\lambda/24+m\lambda/2 \leq n1 \times d1 \leq 5\lambda/24 + m\lambda/2 \qquad \text{Expression (2-2)}$$

In Expression (2-2), m represents an integer of 0 or greater; λ represents a wavelength (unit: nm) intended to prevent reflection; n1 represents a refractive index of the layer A; and d1 represents a thickness (unit: nm) of the layer A.

Further, the preferred ranges of m in Expressions (1-2) and (2-2) above are the same as those of m in Expressions (1-1) and (2-1) above.

In the multilayer structure of the present invention, it is more preferable that one of following conditions (1-3) and (2-3) is satisfied.

Condition (1-3): n1<n2 and Expression (1-3) below are satisfied.

$$5\lambda/16+m\lambda/2 \leq n1 \times d1 \leq 7\lambda/16 + m\lambda/2 \qquad \text{Expression (1-3)}$$

In Expression (1-3), m represents an integer of 0 or greater; λ represents a wavelength (unit: nm) intended to prevent reflection; n1 represents a refractive index of the layer A; and d1 represents a thickness (unit: nm) of the layer A.

Condition (2-3): n1>n2 and Expression (2-3) below are satisfied.

$$1\lambda/16+m\lambda/2 \leq n1 \times d1 \leq 3\lambda/16 + m\lambda/2 \qquad \text{Expression (2-3)}$$

In Expression (2-3), m represents an integer of 0 or greater; λ represents a wavelength (unit: nm) intended to prevent reflection; n1 represents a refractive index of the layer A; and d1 represents a thickness (unit: nm) of the layer A.

Further, the preferred ranges of m in Expressions (1-3) and (2-3) above are the same as those of m in Expressions (1-1) and (2-1) above.

The layer A and the layer B in the multilayer structure of the present invention are not limited to the configuration of FIG. 1. For example, the layer A may be another functional layer (for example, an overcoat layer as a second layer A in FIG. 3 described below) other than the undercoat layer and the layer B may be another layer (for example, an adhesive layer as a second layer B in FIG. 3 described below or a second undercoat layer in FIG. 4 described below) other than the support.

In the configuration of FIG. 1, particularly, when the layer B is a support, it is preferable to use a support whose refractive index is 1.5 or more which is larger than that of ordinary glass whose refractive index (refractive index n is 1.5 or less) at a wavelength λ intended to prevent reflection, from viewpoints of easily adjusting the refractive index thereof to be larger than a refractive index n2 of the layer A and of being capable of using the support as the layer B by applying the refractive index of the support. In addition, in a case where the layer B is a support, it is more preferable to use a support whose refractive index is 1.55 or more and particularly preferable to use a support whose refractive index is 1.61 or more.

The preferred range of the layer B in FIG. 1 is the same as that of the layer B in FIG. 4 described below.

Figure 3:
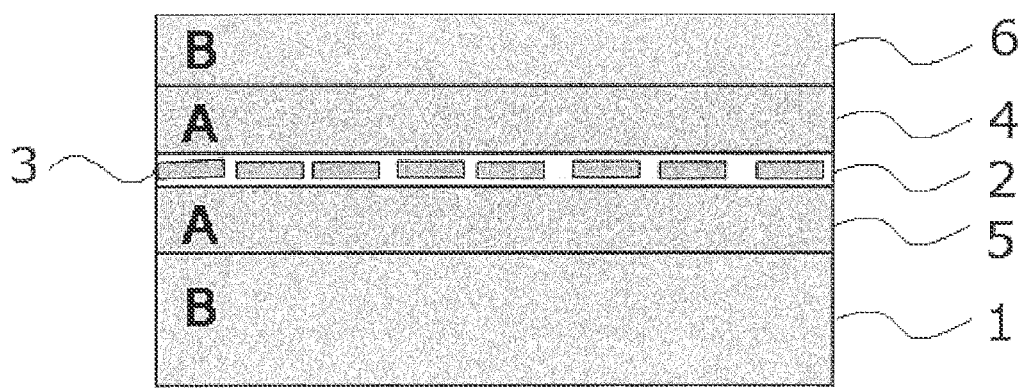
FIG. 3 is a view schematically illustrating another example of a multilayer structure according to the present invention.

(Configuration of FIG. 3)

As another preferred embodiment of the multilayer structure of the present invention, as illustrated in FIG. 3, an embodiment which includes a metal particles-containing layer 2 containing at least one kind of metal particle, includes a layer A whose refractive index is n1 as an undercoat layer 5, includes a layer B whose refractive index is n2 as a support 1, includes an overcoat layer 4 as a second layer A on the opposite side of the metal particles-containing layer 2, includes an adhesive layer 6 as a second layer B thereon, and satisfies the condition (1-1) or the condition (2-1) can be preferably exemplified. It is preferable that the second layer A and the second layer B satisfying the condition (1-1) or (2-1) are present on the opposite side of the layer A and the layer B of the metal particles-containing layer in this manner, from a viewpoint of further suppressing reflected light at a wavelength λ intended to prevent reflection.

The preferred range of the second layer A in FIG. 3 is the same as that of the condition (1-1) or (2-1).

The preferred range of the second layer B in FIG. 3 is the same as that of the layer B in FIG. 4 described below.

Figure 4:
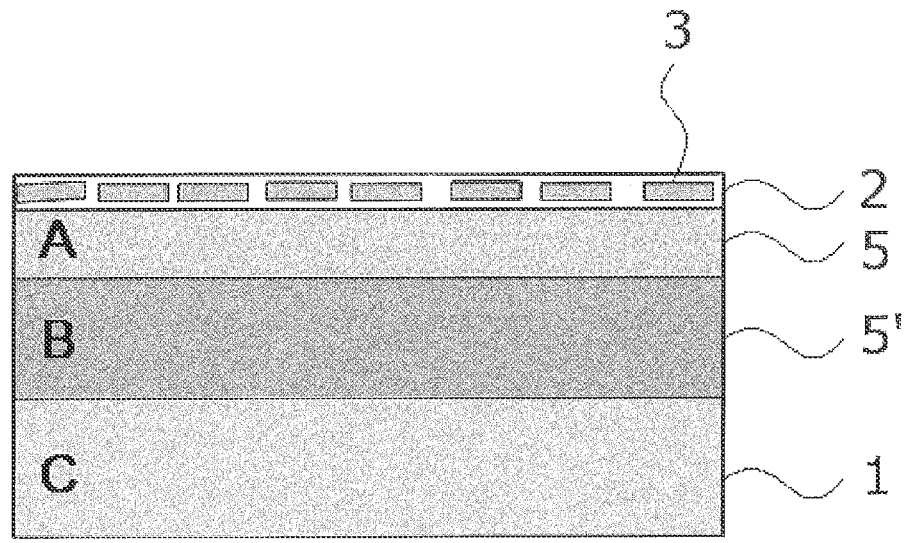
FIG. 4 is a view schematically illustrating still another example of a multilayer structure according to the present invention.

(Configuration of FIG. 4)

As another preferred embodiment of the multilayer structure of the present invention, as illustrated in FIG. 4, an embodiment which includes a layer A whose refractive index is n1 as an undercoat layer 5, includes a layer B whose refractive index is n2 as a second undercoat layer 5', includes a layer C as a support 1, and satisfies the condition (1-1) or the condition (2-1) can be preferably exemplified.

Further, in the configuration of FIG. 4, it is preferable that the layer B satisfies Expression (3-1) below from a viewpoint of obtaining a more excellent effect of preventing reflection. Moreover, particularly, when both of the layer A and the layer C interposing the layer B are dielectrics, it is preferable that the layer B satisfies Expression (3-1) below from a viewpoint of preventing reflection.

$$Lλ/4-λ/8 ≤ n2×d2 ≤ Lλ/4+λ/8 \quad \text{Expression (3-1)}$$

In Expression (3-1), L represents an integer of 1 or greater; λ represents a wavelength (unit: nm) intended to prevent reflection; n2 represents a refractive index of the layer B; and d2 represents a thickness (unit: nm) of the layer B.

The preferred range of Expression (3-1) above will be described. Further, the following preferred range of Expression (3-1) above is the same in the multilayer structure of the present invention other than the configuration of FIG. 4.

In Expression (3-1) above, L represents an integer of 1 or greater, is preferably in the range of 1 to 5, and is more preferably 1 from viewpoints of improving productivity due to change in color of oblique incident light and the small film thickness and easily controlling the film thickness.

In consideration of optical effects, since the effect of preventing reflection can be preferably obtained in the range of ±λ/8, it is preferable that the variation is within this range of the film thickness. The range is more preferably in the range of ±λ/12 and most preferably in the range of ±λ/16.

In the multilayer structure of the present invention, it is more preferable that the layer B satisfies Expression (3-2) below.

$$Lλ/4-λ/12 ≤ n2×d2 ≤ Lλ/4+λ/12 \quad \text{Expression (3-2)}$$

In Expression (3-2), L represents an integer of 1 or greater; λ represents a wavelength (unit: nm) intended to prevent reflection; n2 represents a refractive index of the layer B; and d2 represents a thickness (unit: nm) of the layer B.

In the multilayer structure of the present invention, it is particularly preferable that the layer B satisfies Expression (3-3) below.

$$Lλ/4-λ/16 ≤ n2×d2 ≤ Lλ/4+λ/16 \quad \text{Expression (3-3)}$$

In Expression (3-3), L represents an integer of 1 or greater; λ represents a wavelength (unit: nm) intended to prevent reflection; n2 represents a refractive index of the layer B; and d2 represents a thickness (unit: nm) of the layer B.

Further, the preferred ranges of L in Expressions (3-2) and (3-3) above are the same as that of L in Expression (3-1) above.

Further, in the configuration of FIG. 4, it is preferable that the layer B satisfies Expression (4-1) below from a viewpoint of enhancing reflection at a wavelength λ' intended to have strong reflection.

$$kλ'/4-λ/8 ≤ n2×d2 ≤ kλ'/4+λ/8 \quad \text{Expression (4-1)}$$

In Expression (4-1), k represents an integer of 1 or greater; λ' represents a wavelength (unit: nm) intended to have strong reflection; n2 represents a refractive index of the layer B; and d2 represents a thickness (unit: nm) of the layer B.

The preferred range of Expression (4-1) above will be described. Further, the following preferred range of Expression (4-1) above is the same in the multilayer structure of the present invention other than the configuration of FIG. 4.

In Expression (4-1) above, k represents an integer of 1 or greater, is preferably in the range of 1 to 5, and is more preferably 1 from viewpoints of improving productivity due to change in color of oblique incident light and the small film thickness and easily controlling the film thickness.

The wavelength λ' intended to have strong reflection is not particularly limited, and examples thereof include respective bandwidths of visible light, infrared light, and UV light. Among these, infrared light is preferable from a viewpoint of use as a heat ray shielding material and the wavelength λ' intended to have reflection in the multilayer structure of the present invention is preferably in the range of 700 nm to 2500 nm, more preferably in the range of 800 nm to 1500 nm, and particularly preferably in the range of 900 nm to 1200 nm.

When the wavelength of less than 700 nm is allowed to have strong reflection, reflected light having a red color is exceedingly conspicuous, and this leads to a decrease of the transmittance of visible light. Meanwhile, since there is almost no energy at a wavelength of 2500 nm or more in the sunlight spectrum when a wavelength larger than 2500 nm is allowed to have reflection, the effect as the heat ray shielding material is decreased.

In consideration of optical effects, since the effect of preventing reflection can be preferably obtained in the range of ±λ/8, it is preferable that the variation is within this range of the film thickness. The range is more preferably in the range of ±λ/12 and most preferably in the range of ±λ/16.

In the multilayer structure of the present invention, it is more preferable that the layer B satisfies Expression (4-2) below.

$$kλ'/4-λ/12 \leq n2 \times d2 \leq kλ'/4+λ/12 \quad \text{Expression (4-2)}$$

In Expression (4-2), k represents an integer of 1 or greater; λ' represents a wavelength (unit: nm) intended to have strong reflection; n2 represents a refractive index of the layer B; and d2 represents a thickness (unit: nm) of the layer B.

In the multilayer structure of the present invention, it is particularly preferable that the layer B satisfies Expression (4-3) below.

$$kλ'/4-λ/16 \leq n2 \times d2 \leq kλ'/4+λ/16 \quad \text{Expression (4-3)}$$

In Expression (4-3), k represents an integer of 1 or greater; λ' represents a wavelength (unit: nm) intended to have strong reflection; n2 represents a refractive index of the layer B; and d2 represents a thickness (unit: nm) of the layer B.

Further, the preferred ranges of kin Expressions (4-2) and (4-3) above are the same as that of k in Expression (4-1) above.

In the configuration of FIG. 4, it is preferable that the refractive index n3 at a wavelength λ intended to prevent reflection of the layer C is larger than the refractive index n2 at a wavelength λ intended to prevent reflection of the layer B from viewpoints of occurring optical interference with reflected light of the metal particles-containing layer and obtaining a more excellent effect of preventing reflection in the layer B and the layer C. Particularly, when the layer C is a support, it is preferable to use a support whose refractive index is 1.5 or more which is larger than that of ordinary glass whose refractive index (refractive index n is 1.5 or less) at a wavelength λ intended to prevent reflection, from viewpoints of easily adjusting the refractive index thereof to be larger than a refractive index n2 of the layer B and of being capable of using the support as the layer C by applying the refractive index of the support. In addition, in a case where the layer C is a support, it is more preferable to use a support whose refractive index is 1.55 or more.

(Other Configurations not Illustrated)

In addition, in the multilayer structure of the present invention, it is preferable that the layer B is a laminate formed of a plurality of layers B' and all of the layers B' respectively satisfy at least one of Expressions (3-1) and (4-1) above. Further, it is more preferable that the layer B is a laminate formed of a plurality of layers B' and all of the layers B' respectively satisfy Expression (3-1) above. Further, it is more preferable that the layer B is a laminate formed of a plurality of layers B' and all of the layers B' respectively satisfy Expression (4-1) above.

In addition, in the multilayer structure of the present invention, it is preferable that the layer C satisfies at least one of Expressions (3-1) and (4-1) above and more preferable that the layer C satisfies both of Expressions (3-1) and (4-1) above. In this configuration, a support may be included on the layer C or a layer satisfying at least one of Expressions (3-1) and (4-1) above may be further included on the layer C.

Even when a plurality of layers satisfying at least one of Expressions (3-1) and (4-1) above is included, reflection at a wavelength λ intended to prevent reflection can be suppressed.

Further, it is preferable that Expression (3-1) above in these cases satisfies Expression (3-2) above and more preferable that Expression (3-1) above satisfies Expression (3-3) above. Further, it is preferable that Expression (4-1) above in these cases satisfies Expression (4-2) above and more preferable that Expression (4-1) above satisfies Expression (4-3) above.

(Arrangement of Each Layer and Form of Multilayer Structure)

In the multilayer structure of the present invention, it is possible to control reflection of a desired wavelength λ using optical interference in reflection due to a plasmon resonance wavelength caused by metal particles contained in the metal particles-containing layer by making the configuration of the layer into a layer that satisfies the above-described condition (1-1) or (2-1) as illustrated in FIGS. 1, 3, and 4.

Here, in the multilayer structure of the present invention, the metal particles-containing layer, the layer A, the layer B, the layer C, the second layer A, and the second layer B may be arranged in a state in which respective layers are in close contact to one another or may be arranged through an interference layer having a thickness of 30 nm or less or an adhesive layer. The effect of suppressing the reflection at the wavelength λ of the present invention using optical interference is particularly significant when the respective layers of the layer C, the layer B, the layer A, the metal particles-containing layer, the second layer A, and the second layer B are arranged in close contact to one another. That is, it is preferable that the layer C and the layer B are arranged in close contact with each other and more preferable that the entire surfaces of the layer C and the layer B are directly bonded to each other. It is preferable that the layer B and the layer A are arranged in close contact with each other and more preferable that the entire surfaces of the layer B and the layer A are directly bonded to each other. It is preferable that the layer A and the metal particles-containing layer are arranged in close contact with each other and more preferable that the entire surfaces of the layer A and the metal particles-containing layer are directly bonded to each other. It is preferable that the metal particles-containing layer and the second layer A are arranged in close contact with each other and more preferable that the entire surfaces of the metal particles-containing layer and the second layer A are directly bonded to each other. It is preferable that the second layer A and the second layer B are arranged in close contact with each other and more preferable that the entire surfaces of the second layer A and the second layer B are directly bonded to each other.

The multilayer structure of the present invention may be in a state of being a sheet form, and may be in a state of being wound in a roll form. Since the multilayer structure of the present invention has the favorable adhesion-failure resistance, there are few failures when the plurality of multilayer structures of the present invention are stacked in a case of being wound in the sheet form, and creaking is reduced in a case of being in the roll form. In addition, in a case where the multilayer structure of the present invention is in a state of being wound in the roll form, the material is preferably wound on a winding core with the diameter of 50 mm to 250 mm. Preferably, the multilayer structure of the present invention has the adhesion-failure resistance which is preferably in a range of 2 kg/cm² to 20 kg/cm².

<Configuration of Each Layer>

1. Metal Particles-Containing Layer

The metal particles-containing layer, which is not particularly limited, is a layer containing at least one kind of metal particle can be suitably selected in accordance with an intended purpose.

Not adhering to any theory, the multilayer structure of the present invention is not limited to the production method described below; but, the tabular metal particles may be eccentrically located in one surface of the metal particles-containing layer by adding a specific latex thereto in producing the metal particles-containing layer. The mechanism for allowing the tabular metal particles to be unevenly distributed on the surface is not fully examined, but it is considered that floating metal particles on the liquid surface at the time of coating and drying is indispensable and balance of the surface tension which is to be changed at the time of drying is important.

—1-1. Metal Particles—

The metal particles are not particularly limited and can be suitably selected in accordance with an intended purpose.

In the multilayer structure of the present invention, it is preferable that the main components in a form of metal particles in the metal particles-containing layer are tabular metal particles, more preferable that the main components thereof are hexagonal to circular tabular metal particles, and particularly preferable that the main components thereof include 60% by number or more of hexagonal to circular tabular metal particles.

In the multilayer structure of the present invention, it is preferable that 80% by number or more of the tabular metal particles in a hexagonal to circular forms in the metal particles-containing layer are present in the range of λ/4 (λ represents a wavelength (unit: nm) intended to prevent reflection) in terms of the thickness from a viewpoint that transmitted light and reflected light respectively made by metal particles are not in a relationship of cancelling each other but in a relationship of strengthening each other so that wavelength selectivity thereof becomes efficient. Further, in the metal particles-containing layer, in a case where 80% by number or more of the tabular metal particles in a hexagonal form to a circular form are not present in the range of λ/4 in terms of the thickness but distributed over a larger range, the absorptivity tends to be increased instead of the reflectance in the vicinity of the plasmon resonance wavelength.

When the thickness of the metal particles-containing layer is referred to as d, 80% by number or more of the hexagonal to circular tabular metal particles exist preferably in the range of the surface of the metal particles-containing layer to the depth of d/2 thereof, more preferably in a range from the surface of the metal particles-containing layer to the depth of d/3 thereof.

Regarding the existence form of the tabular metal particles in the hexagonal to circular form in the metal particles-containing layer, it is preferable that the main plane of the tabular metal particles in the hexagonal to circular forms is plane-oriented in a range of 0° to ±30° on average relative to one surface of the metal particles-containing layer (in a case where the multilayer structure of the present invention has a substrate, relative to the surface of the substrate), more preferable that the main plane thereof is plane-oriented in the range of 0° to ±20° on average, and particularly preferable that the main plane thereof is plane-oriented in the range of 0° to ±10° on average.

Preferably, one surface of the metal particles-containing layer is a flat surface. In a case where the metal particles-containing layer of the multilayer structure of the present invention has a substrate serving as a temporary support, it is preferable that both the surface of the metal particles-containing layer and the surface of the substrate are nearly horizontal surfaces. Here, the multilayer structure may or may not have the temporary support.

The size of the metal particles is not particularly limited and can be suitably selected in accordance with an intended object thereof. For example, the particles may have an average particle diameter of 500 nm or less.

The material of the metal particles are not particularly limited and can be suitably selected in accordance with an intended object thereof. From the viewpoint that the heat ray (near-infrared ray) reflectance thereof is high, preferred are silver, gold, aluminum, copper, rhodium, nickel, platinum, or the like.

—1-2. Tabular Metal Particles—

The tabular metal particles are not particularly limited as long as the particle has two main planes (see FIGS. 5A and 5B) and can be suitably selected in accordance with an intended purpose, and examples thereof include particles in a hexagonal form, a circular form, and a triangular form. Among these, in terms of high transmittance of visible light, particles in hexagonal or more polygonal form to a circular form are more preferable and particles in a hexagonal form or a circular form are particularly preferable.

In the present specification, the circular form means a form in which the number of sides having a length of 50% or more of the average circle equivalent diameter of tabular silver particles described below is zero per one tabular silver particle. The tabular metal particles in the circular form are not particularly limited as long as the particle has no angle but is in a roundish form when the tabular metal particles are observed from the top of the main plane using a transmission electron microscope (TEM) and can be suitably selected in accordance with an intended purpose.

In the present specification, the hexagonal form means a form in which the number of sides having a length of 20% or more of the average circle equivalent diameter of tabular silver particles described below is six per one tabular silver particle. Further, the same applies to other polygonal forms. The tabular metal particles in the hexagonal form are not particularly limited as long as the particle has a substantially hexagonal form when the tabular metal particles are observed from the top of the main plane using a transmission electron microscope (TEM) and can be suitably selected in accordance with an intended purpose. For example, the angle of the hexagonal form of the particles may be an acute angle or an obtuse angle. However, from the viewpoint of the ability of the particles to reduce visible light absorption, the angle is preferably a obtuse angle. The degree of the obtuseness of the angle is not particularly limited and can be suitably selected in accordance with an intended purpose.

The materials of the tabular metal particles are not particularly limited and can be suitably selected from materials which are the same as those of the metal particles in accordance with an intended purpose thereof. Preferably, the tabular metal particles contain at least silver.

Of the metal particles existing in the metal particles-containing layer, the ratio of the hexagonal to circular tabular metal particles is at least 60% by number to the total number of the metal particles, preferably at least 65% by number, and more preferably at least 70% by number. When the ratio of the tabular metal particles is less than 60% by number, the visible light transmittance of the layer becomes lower in some cases.

—1-2-1. Plane Orientation—

Preferably, in the multilayer structure of the present invention, the main plane of the hexagonal to circular tabular metal particles is plane-oriented in a range of 0° to ±30° on average relative to one surface of the metal particles-containing layer (in a case where the multilayer structure has a substrate, relative to the surface of the substrate), preferably in a range of 0° to ±20° on average, and particularly preferably in a range of 0° to ±10° on average.

The existence state of the tabular metal particles is not particularly limited and can be suitably selected in accordance with an intended purpose.

Figure 6A:
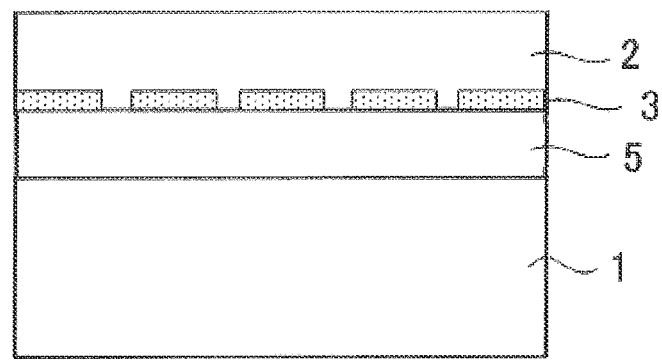
FIG. 6A is a cross-sectional view schematically illustrating an example of a state in which a metal particles-containing layer containing tabular metal particles is present in the multilayer structure of the present invention.
Figure 6B:
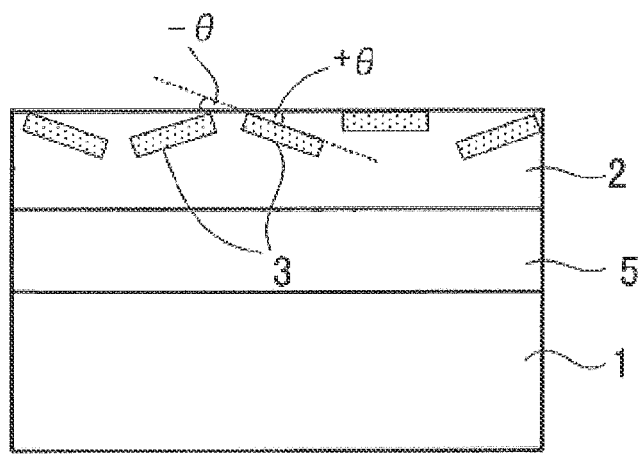
FIG. 6B is a cross-sectional view schematically illustrating a state in which a metal particles-containing layer containing tabular metal particles is present in the multilayer structure of the present invention and illustrates a view explaining an angle (θ) between the metal particles-containing layer (parallel to the plane of a substrate) containing tabular metal particles and the plane of tabular metal particles in a hexagonal to circular forms.
Figure 6C:
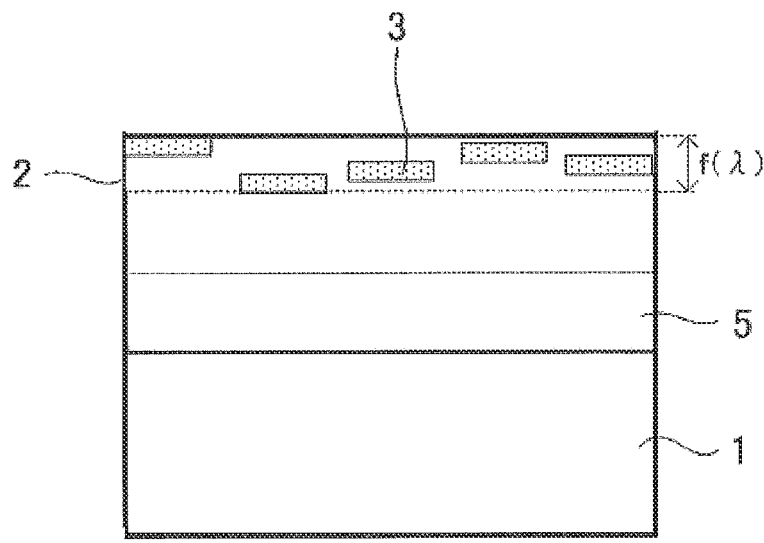
FIG. 6C is a cross-sectional view schematically illustrating a state in which a metal particles-containing layer containing tabular metal particles is present in the multilayer structure of the present invention and is a view illustrating an existence region F(λ) of tabular metal particles in the depth direction of a heat ray shielding material of the metal particles-containing layer.

Here, FIGS. 6A to 6C are cross-sectional views schematically illustrating examples of a state in which a metal particles-containing layer containing tabular metal particles is present in the multilayer structure of the present invention. FIGS. 6A to 6C illustrate the existence state of the tabular metal particles 3 in the metal particles-containing layer 2. FIG. 6B is a view illustrating the angle (±θ) between the plane of the substrate 1 and the plane of the tabular metal particle 3. FIG. 6C illustrates the existence region in the depth direction of the multilayer structure of the metal particles-containing layer 2.

In FIG. 6B, the angle (±θ) between the surface of the substrate 1 and the main plane (plane determining the circle equivalent diameter D) or the extended line of the main plane of the tabular metal particle 3 corresponds to the predetermined range in the above-described plane orientation. Specifically, the plane orientation means that the tilt angle (±θ) illustrated in FIG. 6B is small when the cross section of the multilayer structure is observed, and in particular as in FIG. 6C, means that the surface of the substrate 1 is parallel with the main plane of the tabular metal particles 3, that is, θ is 0°. When the angle of the plane orientation of the main plane of the tabular metal particle 3 relative to the surface of the substrate 1, that is, θ illustrated in FIG. 6B is ±30° or less, the reflectance at a predetermined wavelength (for example, from the long wavelength side of the visible light region to the near-infrared region) of the multilayer structure can be increased.

The mode of evaluation of whether or not the main plane of the tabular metal particle is in a plane orientation relative to one surface of the metal particles-containing layer (in a case where the multilayer structure has a substrate, the surface of the substrate) is not particularly limited and can be suitably selected in accordance with an intended purpose. For example, in one evaluation method employable here, a suitable cross-sectional slice of the multilayer structure is prepared, and the metal particles-containing layer (in a case where the multilayer structure has a substrate, the substrate) and the tabular metal particles in the slice are observed and evaluated. Concretely, the multilayer structure is cut with a microtome or through focused ion beam technology (FIB) to prepare a cross-sectional sample or a cross-sectional slice sample of the multilayer structure, and this is observed with various types of microscopes (for example, field emission scanning electron microscope (FE-SEM) or the like), and the resulting image is analyzed for the intended evaluation.

In the multilayer structure, in a case where the binder to cover the tabular metal particles swells in water, the sample thereof that has been frozen with liquid nitrogen may be cut with a diamond cutter mounted on a microtome to produce the cross-sectional sample or the cross-sectional slice sample. On the other hand, in a case where the binder to cover the tabular metal particles in the multilayer structure does not swell in water, the intended cross-sectional sample or cross-sectional slice sample may be directly prepared from the material.

Not particularly limited, when the cross-sectional sample or the cross-sectional slice sample prepared in the manner as above may be observed in any manner suitably selected in accordance with an intended purpose so far as in the sample, it is possible to confirm whether or not the main plane of the tabular metal particles could be in plane orientation relative to one surface of the metal particles-containing layer (in a case where the multilayer structure has a substrate, the surface of the substrate). For example, there are described observations with FE-SEM, TEM, optical microscope, or the like. The cross-sectional sample may be observed with FE-SEM, and the cross-sectional slice sample may be observed with TEM. In evaluation with FE-SEM, it is preferable that the microscope has a spatial resolving power capable of clearly determining the form of the tabular metal particles and the tilt angle (±θ in FIG. 6B) thereof.

—1-2-2. Average Particle Diameter (Average Circle Equivalent Diameter) and Particle Diameter Distribution of Average Particle Diameter (Average Circle Equivalent Diameter)—

The average particle diameter (average circle equivalent diameter) of the tabular metal particles is not particularly limited and can be suitably selected in accordance with an intended purpose. Preferably, the average particle diameter is from 70 nm to 500 nm, and more preferably is from 100 nm to 400 nm. When the average particle diameter (average circle equivalent diameter) is less than 70 nm, the contribution of absorption by the tabular metal particles is larger than that of reflection by the particles and therefore, the material could not ensure sufficient heat ray reflectance; but when more than 500 nm, the haze (scattering) increases so that the transparency of the substrate is thereby lowered.

The average particle diameter (average circle equivalent diameter) means the average value of the data of the main plane diameter (maximum length) of 200 tabular particles that are randomly selected from the image taken in observation of the particles with TEM.

The metal particles-containing layer may contain two or more different types of metal particles that differ in the average particle diameter (average circle equivalent diameter) thereof; and in such a case, the metal particles may have two or more peaks of the average particle diameter (average circle equivalent diameter) thereof, or that is, the metal particles may have two average particle diameters (average circle equivalent diameters).

In the multilayer structure of the present invention, preferably, the coefficient of variation of the particle size distribution of the tabular metal particles is 30% or less, and more preferably 20% or less. When the coefficient of variation is more than 30%, the heat ray reflection wavelength range of the multilayer structure may broaden.

Here, the coefficient of variation of the particle size distribution of the tabular metal particles is a value (%) calculated, for example, as follows: The distribution range of the particle diameter of 200 tabular metal particles that have been employed for calculation of the average value as described above is plotted to determine the standard deviation of the particle size distribution, and this is divided by the average value of the main plane diameter (maximum length) obtained as above (average particle diameter (average circle equivalent diameter)) to produce the intended value (%).

—1-2-3. Aspect Ratio—

The aspect ratio of the tabular metal particles is not particularly limited and can be suitably selected in accordance with an intended object thereof, and is preferably from 8 to 40, and more preferably from 10 to 35 from the viewpoint that the reflectance of the particles in an IR region of wavelengths 780 nm to wavelengths 1,800 nm becomes higher in accordance with an intended purpose. When the aspect ratio is less than 8, then the reflection wavelength becomes shorter than 780 nm; and when more than 40, then the reflection wavelength becomes longer than 1,800 nm and the material could not secure a sufficient heat ray reflective power.

Figure 5A:
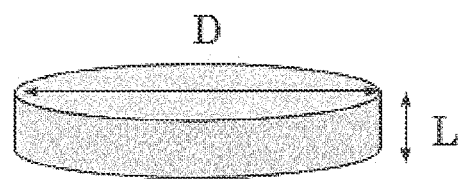
FIG. 5A is a perspective view schematically illustrating an example of the form of a tabular metal particle included in the multilayer structure of the present invention and illustrates a tabular metal particle in a circular form.
Figure 5B:
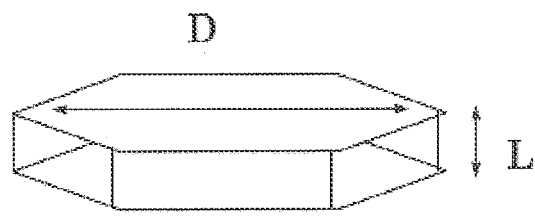
FIG. 5B is a perspective view schematically illustrating an example of the form of a tabular metal particle included in the multilayer structure of the present invention and illustrates a tabular metal particle in a hexagonal form.

The aspect ratio means a value calculated by dividing the average particle diameter (average circle equivalent diameter) of the tabular metal particles by the average particle thickness of the tabular metal particles. The average particle thickness corresponds to the distance between the main planes of the tabular metal particles, and, for example, is indicated by L as illustrated in FIG. 5A and FIG. 5B, the average particle thickness may be measured with an atomic force microscope (AFM).

The method of measuring the average particle thickness with an AFM is not particularly limited and can be suitably selected in accordance with an intended purpose. For example, there is described a method in which a dispersion of particles that contains tabular metal particles is dropped onto a glass substrate and dried thereon, and the thickness of one particle is measured.

In addition, preferably, the thickness of the tabular metal particle is 5 nm to 20 nm.

—1-2-4. Existence Region of Tabular Metal Particles—

Preferably, in the multilayer structure of the present invention, 80% by number or more of the hexagonal to circular tabular metal particles relative to the total number of the hexagonal to circular tabular metal particles contained in the metal particules-containing layer exist in a range from the surface to d/2, of the metal particles-containing layer, and more preferably in the range to d/3; and even more preferably, at least 60% by number of the hexagonal to circular tabular metal particles are exposed out of one surface of the metal particles-containing layer.

Here, the existence distribution of the tabular metal particles in the metal particles-containing layer may be measured, for example, on the image taken through SEM observation of a cross-sectional sample of the multilayer structure.

The plasmon resonance wavelength of the metal that constitutes the tabular metal particles in the metal particles-containing layer is not particularly limited and can be suitably selected in accordance with an intended purpose, but from the viewpoint of imparting heat ray reflection performance to the layer, the wavelength is preferably in the range of 400 nm to 2,500 nm, and from the viewpoint of imparting visible light transmittance thereto, the wavelength is more preferably in the range of 700 nm to 2,500 nm.

—1-2-5. Medium in Metal Particles-Containing Layer—

The medium in the metal particles-containing layer is not particularly limited and can be suitably selected in accordance with an intended purpose. In the multilayer structure of the present invention, the metal-containing layer contains preferably a polymer, more preferably a transparent polymer. The polymer includes various high-molecular substances, for example, polyvinyl acetal resin, polyvinyl alcohol resin, polyvinyl butyral resin, polyacrylate resin, polymethyl methacrylate resin, polycarbonate resin, polyvinyl chloride resin, (saturated) polyester resin, polyurethane resin, and natural polymers such as gelatin, cellulose, or the like. Of those, in the present invention, it is preferable that the main polymer of the polymer is a polyvinyl alcohol resin, a polyvinyl butyral resin, a polyvinyl chloride resin, a (saturated) polyester resin or a polyurethane resin. More preferred are a polyester resin and a polyurethane resin from the viewpoint that 80% by number or more of the hexagonal to circular tabular metal particles relative to the total number of the hexagonal to circular tabular metal particles contained in the metal particles-containing layer could be readily made to exist in a range from the surface to d/2, of the metal particles-containing layer; and even more preferred is a polyester resin and a polyurethane resin from the viewpoint of further improving the rubbing resistance of the multilayer structure of the present invention.

In this description, the main polymer of the polymer contained in the metal-containing layer means the polymer component that accounts for at least 50% by mass of the polymer contained in the metal-containing layer.

The refractive index n of the medium is preferably in the range of 1.4 to 1.7.

—1-2-6. Areal Ratio of Tabular Metal Particles—

The areal ratio [(B/A)×100] that is the ratio of the total area B of the tabular metal particles to the area A of the substrate when the multilayer structure is seen from the top thereof (the total projected area A of the metal particles-containing layer when the metal particles-containing layer is seen in the vertical direction thereof) is preferably at least 15%, more preferably at least 20%. When the areal ratio is less than 15%, then the maximum heat ray reflectance of the material may lower and the material could not sufficiently secure the heat shielding effect thereof.

Here, the areal ratio may be measured, for example, by processing the image taken through SEM observation of the substrate of the multilayer structure from the top thereof or the image taken through an atomic force microscope (AFM) observation thereof.

—1-2-7. Average Intergranular Distance of Tabular Metal Particles—

The average intergranular distance of the tabular metal particles that are adjacent to each other in the horizontal direction in the metal particles-containing layer is preferably at least $1/10$ of the average particle diameter of the tabular metal particles from the viewpoint of the visible light transmittance and the maximum heat ray reflectance of the layer.

When the average intergranular distance in the horizontal direction of the tabular metal particles is less than $1/10$ of average particle diameter of the tabular metal particles, then the visible light transmittance may lower. In addition, when more than 10, then the heat ray reflectance may lower. The average intergranular distance in the horizontal direction is preferably nonuniform (at random) from the viewpoint of the visible light transmittance of the layer. When the distance is not at random, or that is, when the distance is uniform, a moire fringe may be observed due to diffractive scattering.

Here, the average intergranular distance in the horizontal direction of the tabular metal particles means an average value of the intergranular distance data of two adjacent particles. The average intergranular distance that is at random means that "when an SEM image containing at least 100 tabular metal particles is binarized to provide a two-dimensional autocorrelation of the brightness value, then the result does not have any other significant maximum point than the point of origin".

—1-2-8. Layer Configuration of Metal Particles-Containing Layer—

In the multilayer structure of the present invention, the tabular metal particles are arranged in the form of the metal particles-containing layer that contains the tabular metal particles, as in FIGS. 6A to 6C.

The metal particles-containing layer may be composed of a single layer as in FIGS. 6A to 6C, or may be composed of multiple metal particles-containing layers. In a case where the metal particles-containing layer is composed of multiple layers, it may be given heat shieldability in accordance with the wavelength range in which the heat shieldability is desired to be given to the layer.

—1-2-9. Thickness of Metal Particles-Containing Layer—

In the multilayer structure of the present invention, it is preferable that the thickness of the metal particles-containing layer is ¼ or less (λ represents a wavelength (unit: nm) intended to prevent reflection) from a viewpoint that transmitted light and reflected light respectively made by metal particles are not in a relationship of cancelling each other but in a relationship of strengthening each other so that wavelength selectivity thereof becomes efficient.

Specifically, in a case where the multilayer structure of the present invention is used as a heat ray shielding material in which the wavelength λ intended to prevent reflection is set as visible light and the plasmon resonance wavelength of the metal constituting the tabular metal particles is adjusted in the range of 700 nm to 2500 nm, the thickness of the metal particles-containing layer is preferably in the range of 5 nm to 160 nm, more preferably in the range of 8 nm to 100 nm, and particularly preferably in the range of 10 nm to 80 nm.

Here, the thickness of each metal particles-containing layer can be measured, for example, on the image taken through SEM observation of a cross-sectional sample of the multilayer structure.

In a case where any other layer, for example, an overcoat layer to be described below is arranged on the metal particles-containing layer of the multilayer structure, the boundary between the other layer and the metal particles-containing layer may be determined in the same manner as above, and the thickness d of the metal particles-containing layer may also be determined. In a case where the same type of polymer as that of the polymer contained in the metal particles-containing layer is used to form a coating film on the metal particles-containing layer, in general, the boundary between the metal particles-containing layer and the coating film is hardly differentiated, thus carbon is deposited on the metal particles-containing layer, and an overcoat layer is coated thereon. The boundary between both the layers could be determined on the image taken through SEM observation of a cross section thereof, and the thickness d of the metal particles-containing layer could be thereby determined.

—1-2-10. Method for Synthesis of Tabular Metal Particles—

The method of synthesizing the tabular metal particles is not particularly limited and can be suitably selected in accordance with an intended purpose, and examples of the method for synthesis of substantially hexagonal to substantially circular tabular metal particles include a liquid-phase method such as a chemical reduction method, an optochemical reduction method, an electrochemical reduction method or the like. Of those, especially preferred is a liquid-phase method such as a chemical reduction method or an optochemical reduction method from the viewpoint of the form and size controllability thereof. After hexagonal to triangular, tabular metal particles have been synthesized, the particles may be etched with a dissolution species capable of dissolving silver, such as nitric acid or sodium nitrite, then aged by heating or the like to thereby blunt the corners of the hexagonal to triangular tabular metal particles to produce the intended hexagonal to circular tabular metal particles.

Regarding any other method of synthesizing the tabular metal particles than the above, a seed crystal may be fixed in advance on the surface of a transparent substrate such as film or glass, and then metal particles (for example, Ag) may be crystal-like grown in a tabular form thereon.

In the multilayer structure of the present invention, the tabular metal particles may be further processed so as to be given desired characteristics. An additional process is not particularly limited and can be suitably selected in accordance with an intended purpose. For example, there are described formations of a high-refractivity shell layer, addition of various additives such as dispersant, antioxidant, or the like.

—1-2-10-1. Formation of High-Refractivity Shell Layer—

The tabular metal particles may be coated with a high-refractivity material having a high visible light transparency for the purpose of further increasing the visible light transparency thereof.

The high-refractivity material is not particularly limited and can be suitably selected in accordance with the object thereof. For example, there are described $TiO_x$, $BaTiO_3$, $ZnO$, $SnO_2$, $ZrO_2$, $NbO_x$, or the like.

The coating method is not particularly limited and can be suitably selected in accordance with an intended purpose. For example, employable here is a method of hydrolyzing tetrabutoxytitanium to form a $TiO_x$ layer on the surface of the tabular metal particles of silver, as reported by Langmuir, 2000, Vol. 16, pp. 2731 to 2735.

In a case where a high-refractivity metal oxide layer shell is difficult to form directly on the tabular metal particles, another method may be employable here, in which the tabular metal particles have been synthesized in the manner as described above, then a shell layer of $SiO_2$ or a polymer is suitably formed thereon, and further the above-described metal oxide layer is formed on the shell layer. In a case where $TiO_x$ is used as a material of the high-refractivity metal oxide layer, $TiO_x$ having a photocatalyst activity may deteriorate the matrix in which the tabular metal particles are to be dispersed, and in such a case, therefore, an $SiO_2$ layer may be optionally formed in accordance with an intended object thereof, after the $TiO_x$ layer has been formed on the tabular metal particles.

—1-2-10-2. Addition of Various Additives—

In the multilayer structure of the present invention, the tabular metal particles may have, as adsorbed thereon, an antioxidant such as mercaptotetrazole or ascorbic acid for the purpose of preventing the metal such as silver constituting the tabular metal particles from being oxidized. In addition, also for preventing oxidation, an oxidation sacrifice layer of Ni or the like may be formed on the surface of the tabular metal particles. For shielding them from oxygen, the particles may be coated with a metal oxide film of $SiO_2$ or the like.

For imparting dispersibility to the tabular metal particles, for example, a dispersant such as a low-molecular-weight dispersant, or a high-molecular-weight dispersant that contains at least any of N element, S element and P element, such as quaternary ammonium salts or amines may be added to the tabular metal particles.

—1-3. Additives—

The multilayer structure of the present invention includes the metal particles-containing layer and at least one additive among a UV absorbent, a near-infrared light absorbing dye, and a heat ray shielding material may be added to each layer described below.

—1-3-1. UV Absorbent—

The UV absorbent is not particularly limited and can be suitably selected in accordance with an intended purpose, and examples thereof include a benzophenone-type UV absorbent, a benzotriazole-type UV absorbent, a triazine-type UV absorbent, a salicylate-type UV absorbent, and a cyanoacrylate-type UV absorbent. These may be used alone or in combination of two or more kinds thereof.

The benzophenone-type UV absorbent is not particularly limited and can be suitably selected in accordance with an intended purpose, and examples thereof include 2-hydroxy-4-methoxy-5-sulfobenzophenone.

The benzotriazole-type UV absorbent is not particularly limited and can be suitably selected in accordance with an intended purpose, and examples thereof include 2-(5-chloro-2H-benzotriazole-2-yl)-4-methyl-6-tert-butyl phenol (Tinuvin 326), 2-(2-hydroxy-5-methyl phenyl)benzotriazole, 2-(2-hydroxy-5-tertiary butyl phenyl)benzotriazole, and 2-(2-hydroxy-3-5-ditertiary butyl phenyl)-5-chlorobenzotriazole.

The triazine UV absorbent is not particularly limited and can be suitably selected in accordance with an intended purpose, and examples thereof include a mono(hydroxyphenyl)triazine compound, a bis(hydroxyphenyl)triazine compound, and a tris(hydroxyphenyl)triazine compound.

Examples of the mono(hydroxyphenyl)triazine compound include 2-[4-[(2-hydroxy-3-docecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, 2-(2-hydroxy-4-isooctyloxyphenyl)-4,6-bis(2,4-dimethylphenyl)-1,3,5-triazien, and 2-(2-hydroxy-4-dodecyloxyphenyl)-4,6-bis(2,4-dimethylphenyl)-1,3,5-triazine. Examples of the bis(hydroxyphenyl)triazine compound include 2,4-bis(2-hydroxy-4-propyloxyphenyl)-6-(2,4-dimethylphenyl)-1,3,5-triazine, 2,4-bis(2-hydroxy-3-methyl-4-propyloxyphenyl)-6-(4-methylphenyl)-1,3,5-triazine, 2,4-bis(2-hydroxy-3-methyl-4-hexyloxyphenyl)-6-(2,4-methylphenyl)-1,3,5-triazine, and 2-phenyl-4,6-bis[2-hydroxy-4-[3-(methoxyheptaethoxy)-2-hydroxypropyloxy]phenyl]-1,3,5-triazien. Examples of the tris(hydroxyphenyl)triazine compound include 2,4-bis(2-hydroxy-4-butoxyphenyl)-6-(2,4-dibutoxyphenyl)-1,3,5-triazine, 2,4,6-tris(2-hydroxy-4-octyloxyphenyl)-1,3,5-triazine, 2,4,6-tris[2-hydroxy-4-(3-butoxy-2-hydroxypropyloxy)phenyl]-1,3,5-triazine, 2,4-bis[2-hydroxy-4-[1-(isooctyloxycarbonyl)ethoxy]phenyl]-6-(2,4-dihydroxyphenyl)-1,3,5-triazine, 2,4,6-tris[2-hydroxy-4-[1-(isooctyloxycarbonyl)ethoxy]phenyl]-1,3,5-triazine, and 2,4-bis[2-hydroxy-4-[1-(isooctyloxycarbonyl)ethoxy]phenyl]-6-[2,4-bis[1-(isooctyloxycarbonyl)ethoxy]phenyl-1,3,5-triazine.

The salicylate-type UV absorbent is not particularly limited and can be suitably selected in accordance with an intended purpose, and examples thereof include phenyl salicylate, p-tert-butylphenyl salicylate, p-octylphenyl salicylate, and 2-ethylhexyl salicylate.

The cyanoacrylate-type UV absorbent is not particularly limited and can be suitably selected in accordance with an intended purpose, and examples thereof include 2-ethylhexyl-2-cyano-3,3-diphenyl acrylate, and ethyl-2-cyano-3,3-diphenyl acrylate.

—1-3-2. Near-Infrared Absorbing Dye—

As the infrared absorbing dye, near-infrared absorbing dyes described in JP-A-2008-181096, JP-A-2001-228324, and JP-A-2009-244493 or a near-infrared absorbing compound described in JP-A-2010-90313 can be preferably used.

Examples of the infrared absorbing dye include a cyanine dye, an oxonol dye, and a pyrrolopyrrole compound.

Further, in regard to the near-infrared absorbing dye, in a case where a support is used therefor, the near-infrared absorbing dye-containing layer may be newly provided on the surface on the opposite side of the surface having the metal particles-containing layer, the undercoat layer, and the overcoat layer. This is because reflecting heat rays is more useful than absorbing heat rays when the multilayer structure of the present invention is used as the heat ray shielding material from a viewpoint of heat cracking or improving light resistance and weather resistance of the near-infrared absorbing dye, heat ray reflecting ability can be further increased by providing the near-infrared light absorbing dye-containing layer on the opposite side of the light incident side relative to the metal particles-containing layer.

(1) Cyanine Dye

As the cyanine dye, a methine dye such as a pentamethine cyanine dye, a heptamethine cyanine dye, or a nonamethine cyanine dye is preferable, and a methine dye described in JP-A-2001-228324 is preferable. As a ring group of the cyanine dye, a group having a thiazole ring, an indolenine ring, or a benzoindolenine ring is preferable.

As the cyanine dye used in the present invention, a cyanine dye represented by the general formula (I) in JP-A-2001-228324 can be exemplified, and among these, a pentamethine cyanine dye, a heptamethine cyanine dye, or a nonamethine cyanine dye (particularly, an aggregate of these) is preferable; a pentamethine cyanine dye, a heptamethine cyanine dye, or a nonamethine cyanine dye (particularly, an aggregate of these) represented by the general formula (II) in JP-A-2001-228324 is more preferable; and a heptamethine cyanine dye represented by the general formula (II) in JP-A-2001-228324 is particularly preferable.

Hereinafter, specific examples of the heptamethine cyanine dye represented by the general formula (II) in JP-A-2001-228324 are described, but the present invention is not limited thereto.

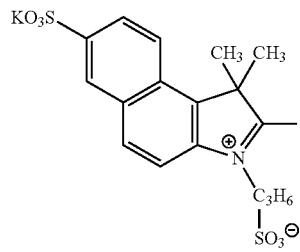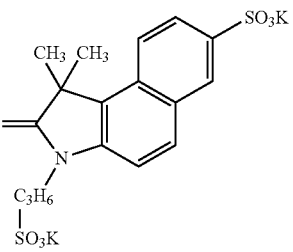

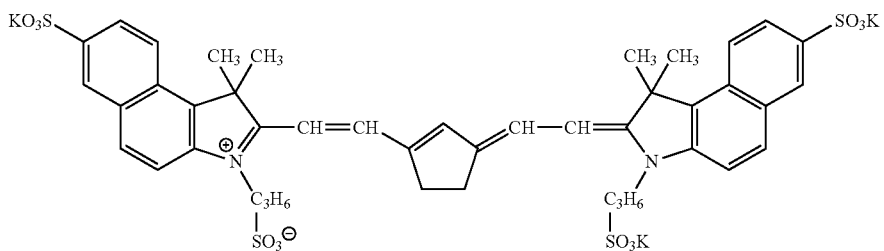
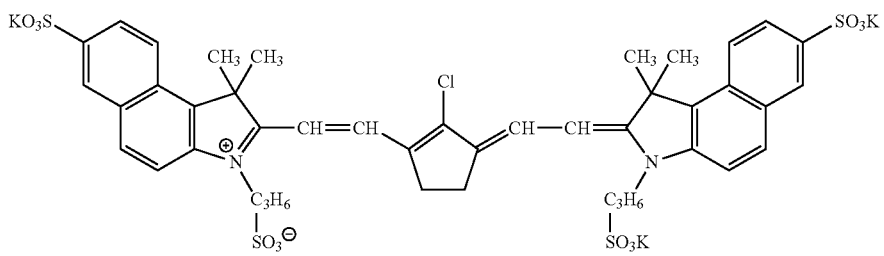
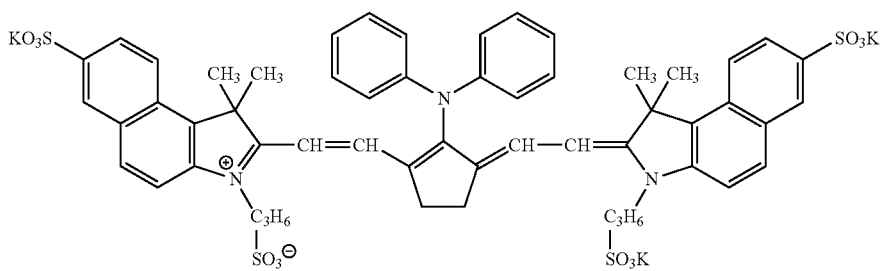
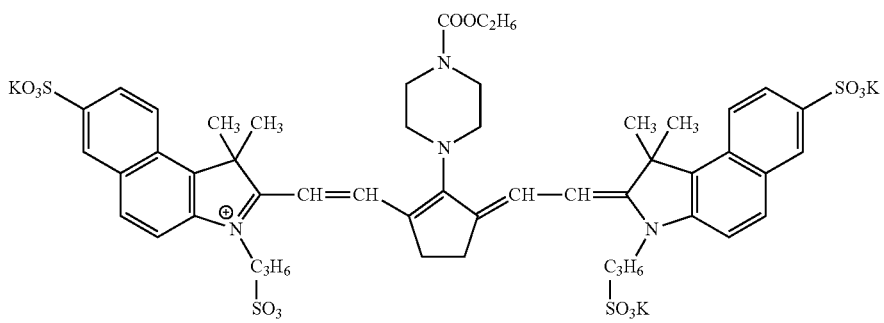
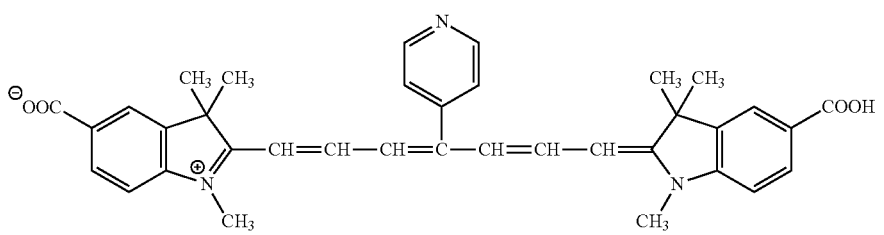
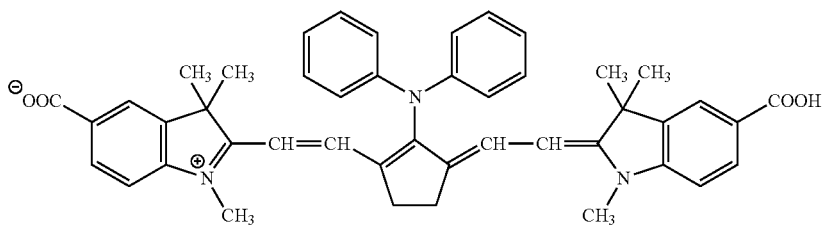

-continued
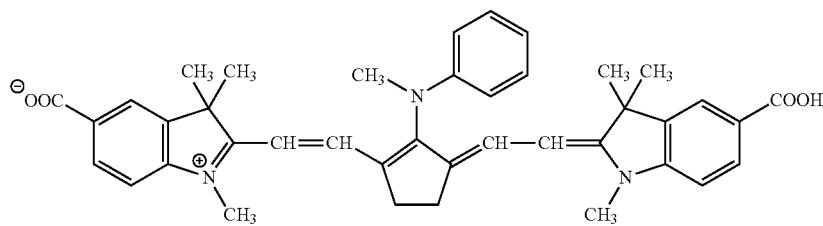
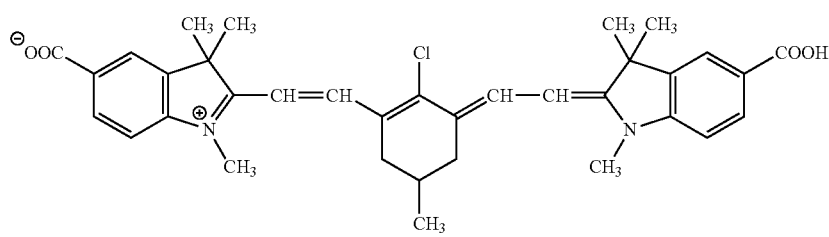
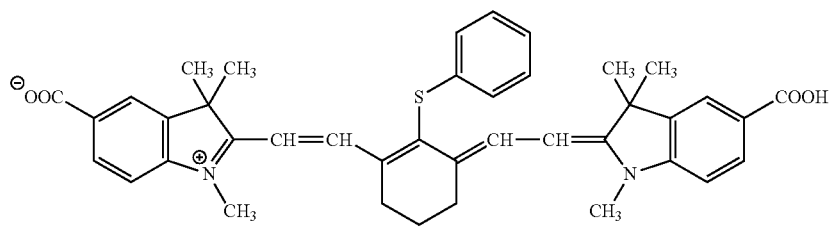
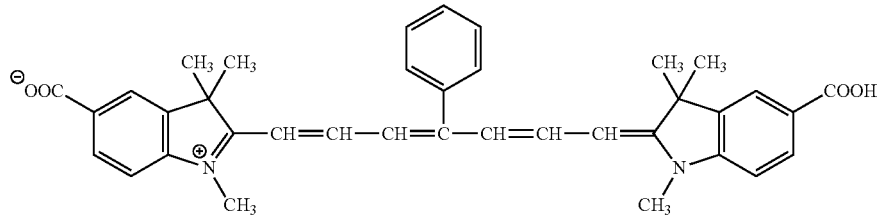
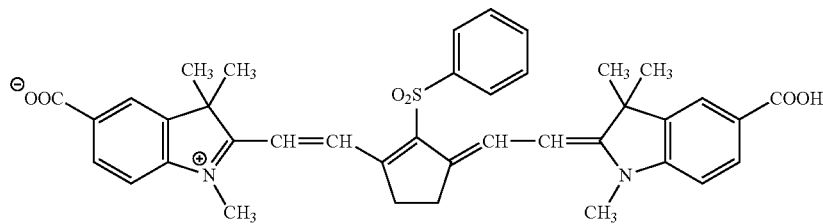
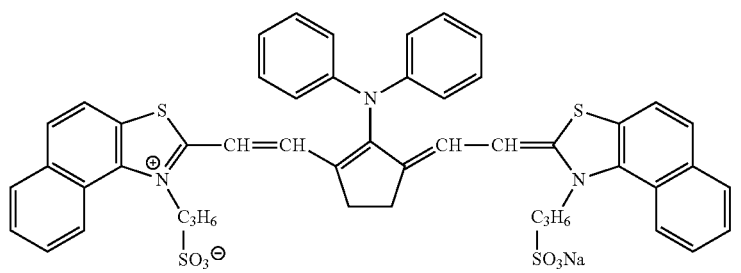
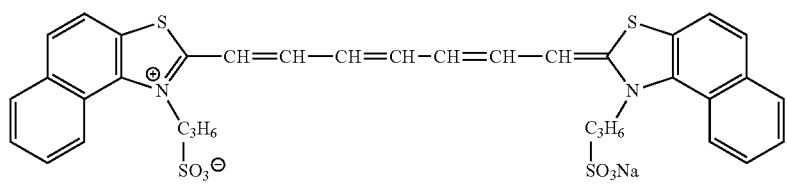

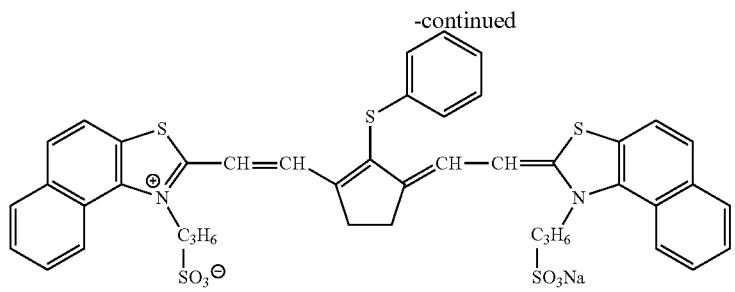
(2) Oxonol Dye
As the oxonol dye, an oxonol dye represented by the general formula (II) in JP-A-2009-244493 is preferable, and a barbituric acid oxonol dye having a barbituric acid ring is more preferable.
Hereinafter, examples of the oxonol dye represented by the general formula (II) in JP-A-2009-244493 will be described, but the present invention is not limited thereto.
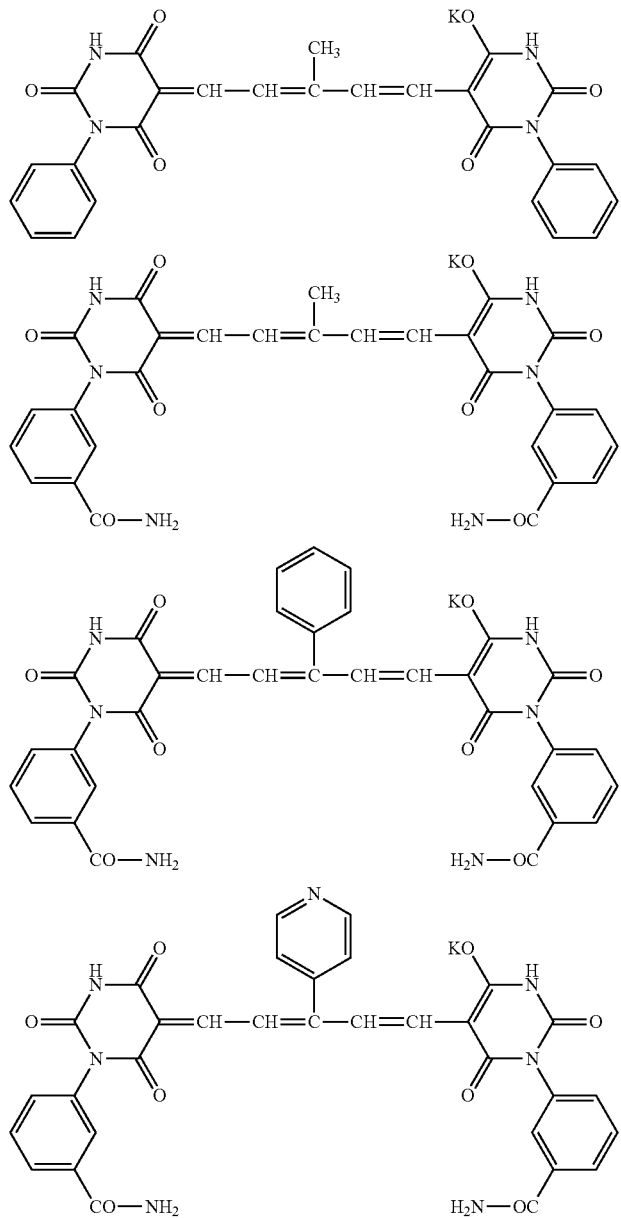

-continued
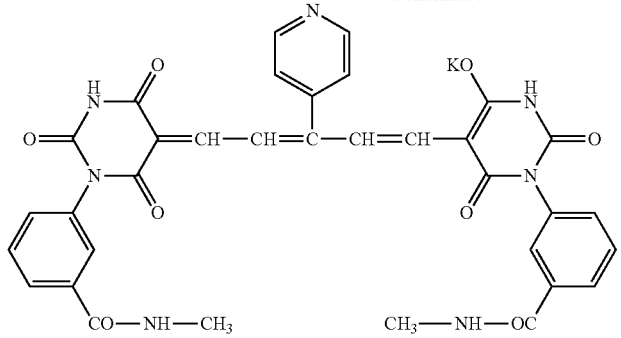
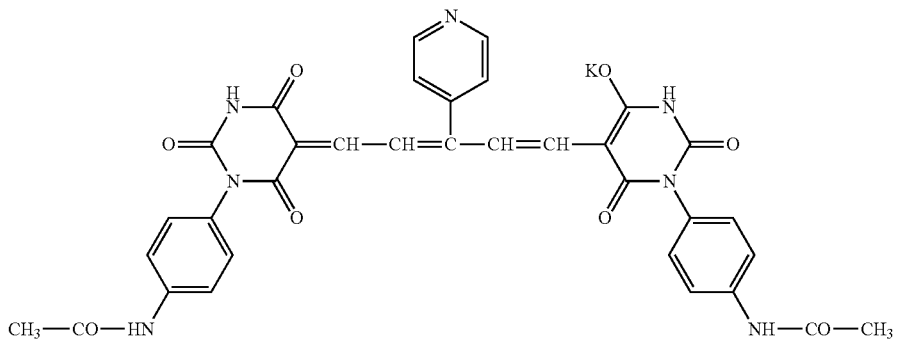
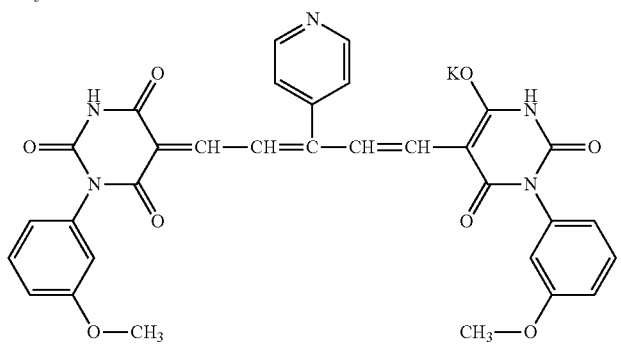
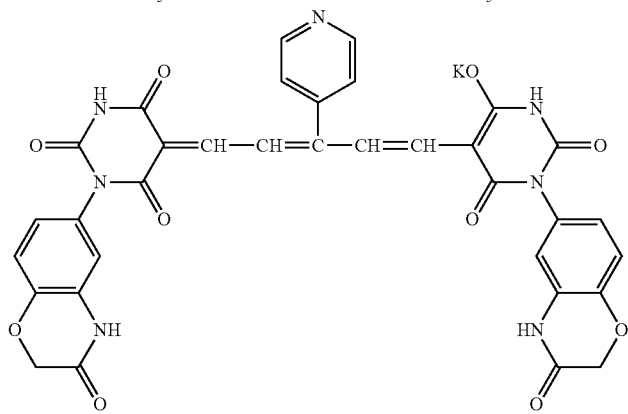
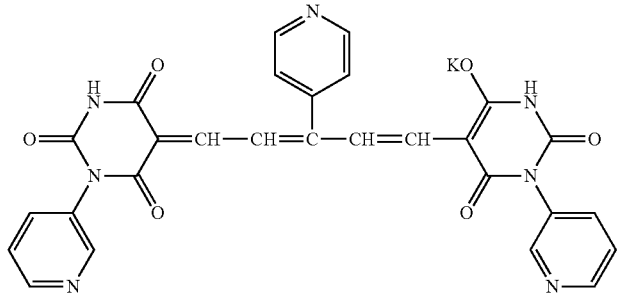

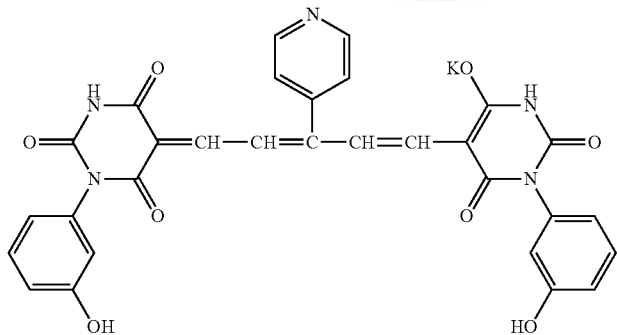
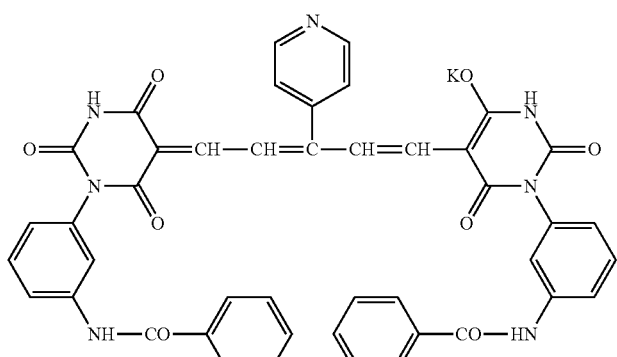
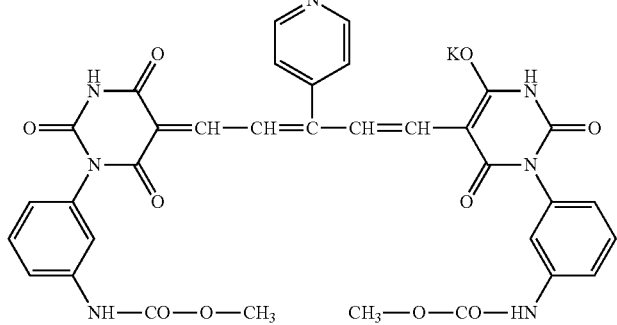
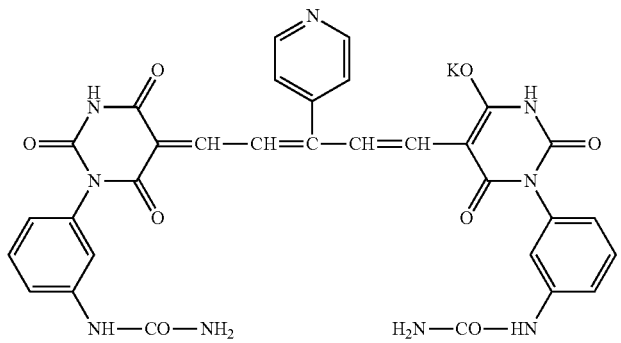
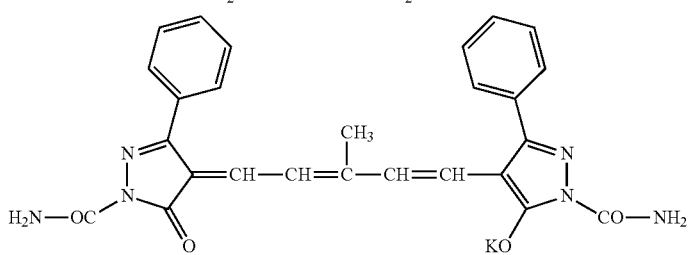

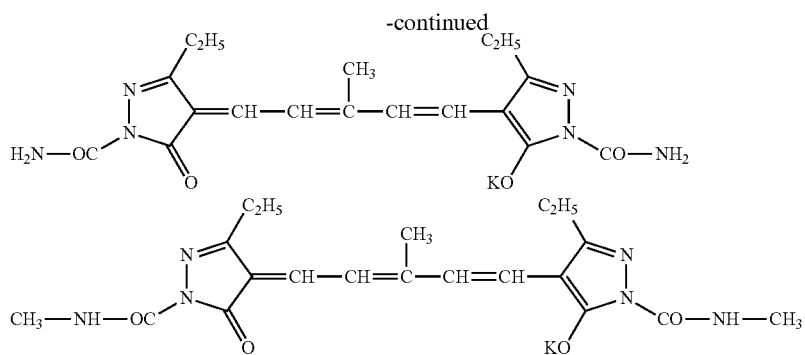

(3) Pyrrolopyrrole Compound

As the pyrrolopyrrole compound, a pyrrolopyrrole compound represented by the general formula (1) in JP-A-2010-90313 is preferable and a pyrrolopyrrole compound represented by any one of the general formulae (2), (3), and (4) in JP-A-2010-90313 is more preferable.

Hereinafter, examples of the pyrrolopyrrole compound (dye) represented by any one of the general formulae (1) to (4) in JP-A-2010-90313 will be described, but the present invention is not limited thereto.

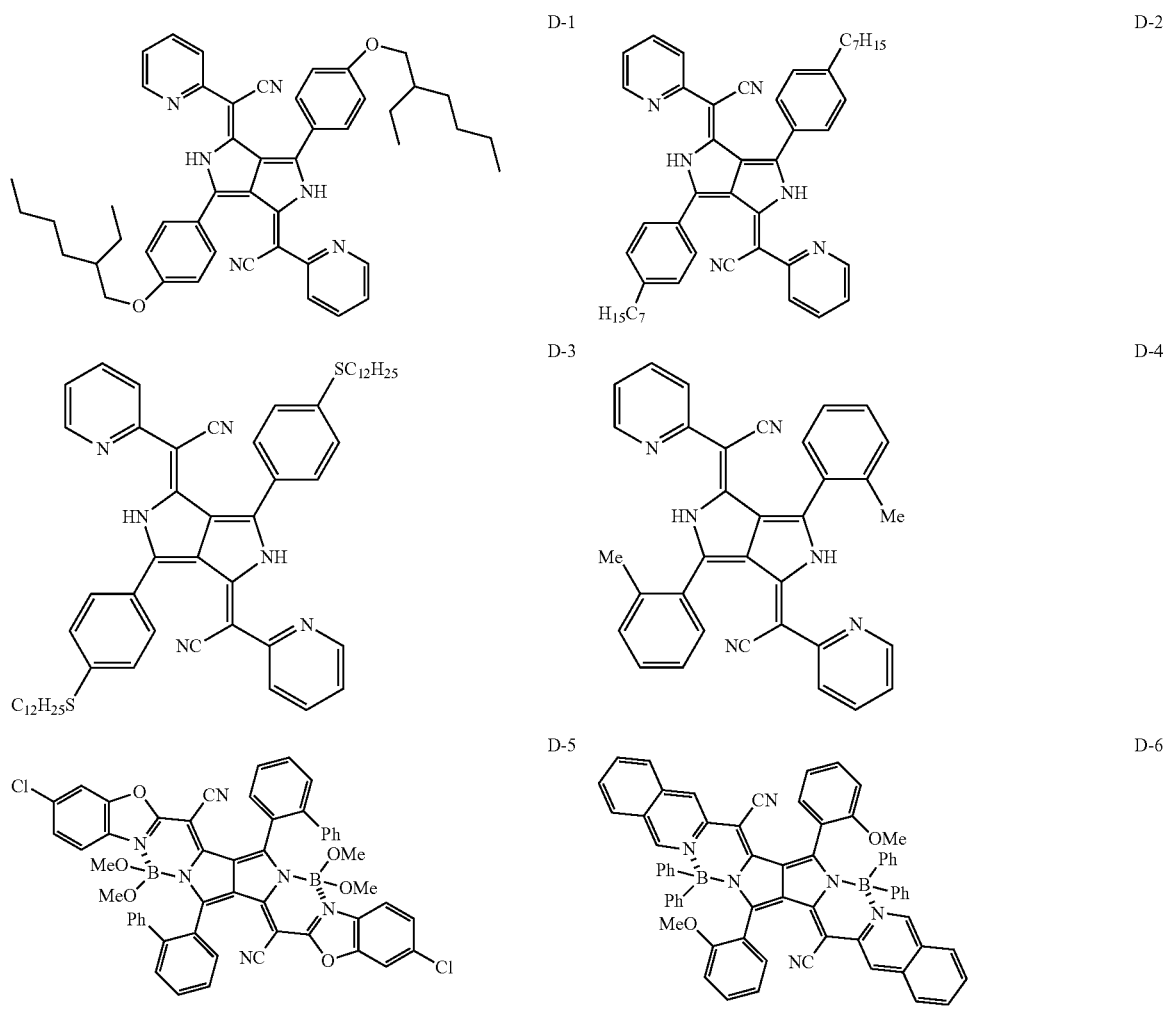

-continued
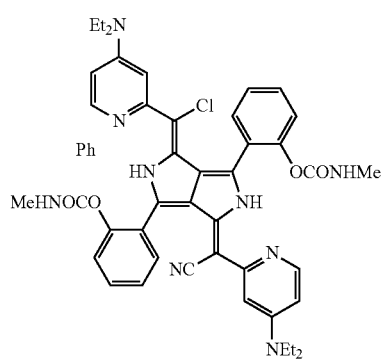
D-7
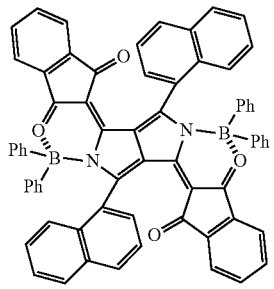
D-8
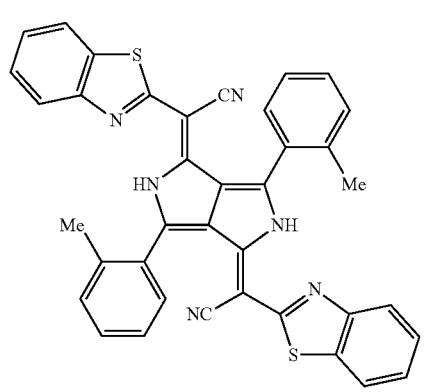
D-9
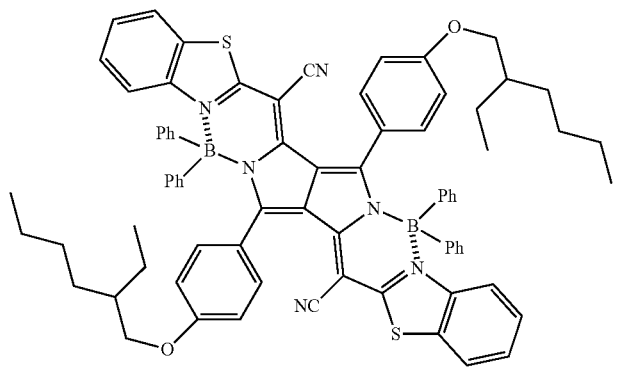
D-10
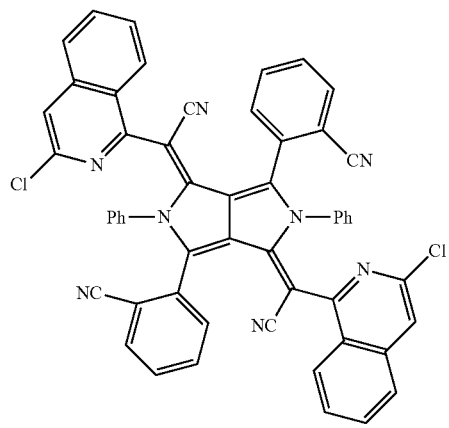
D-11

-continued
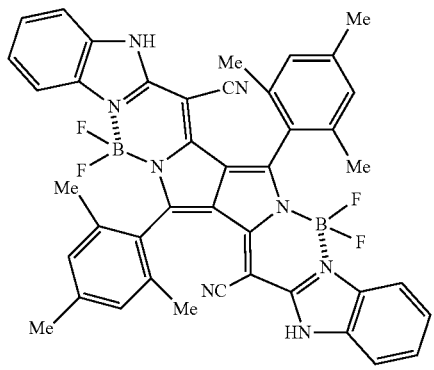
D-12
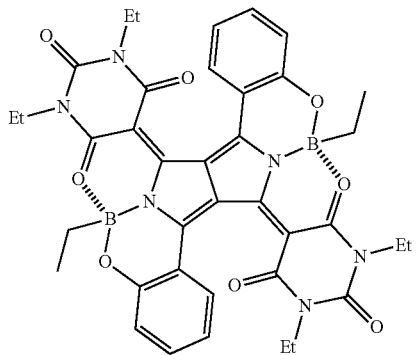
D-13
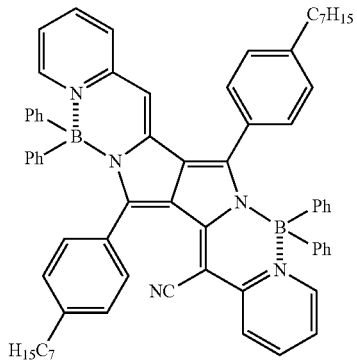
D-14
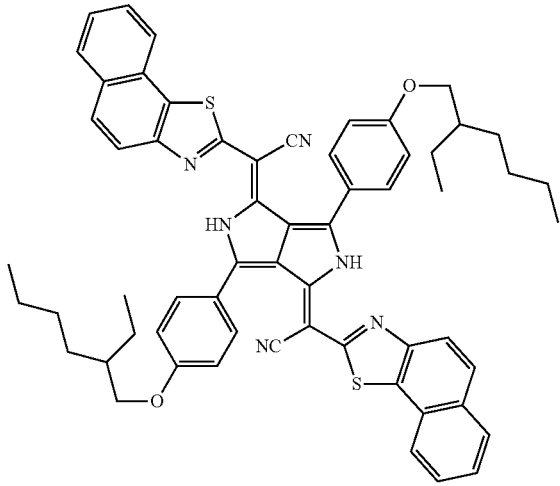
D-15

-continued
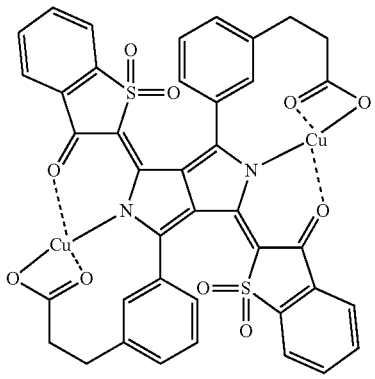
D-16
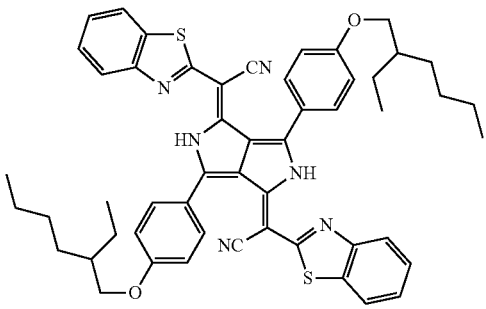
D-17
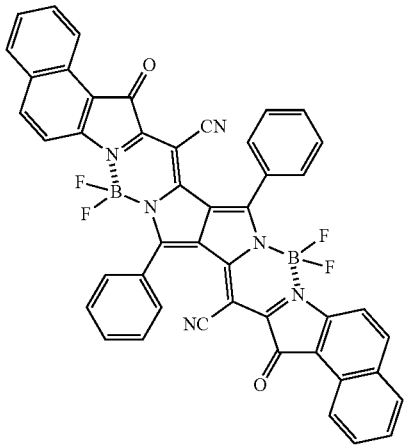
D-18
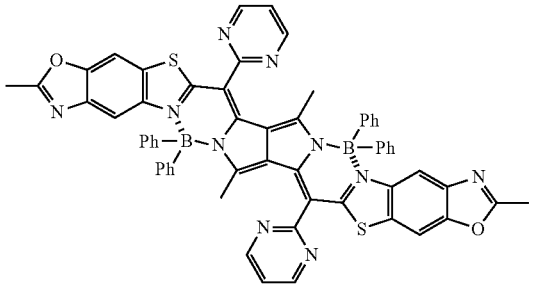
D-19

-continued
D-20
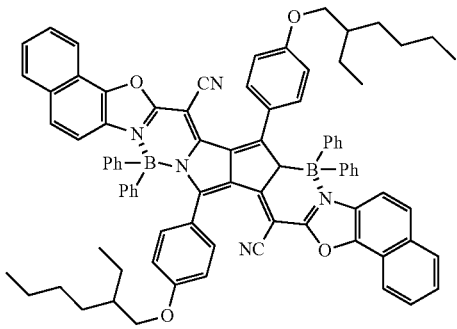
D-21
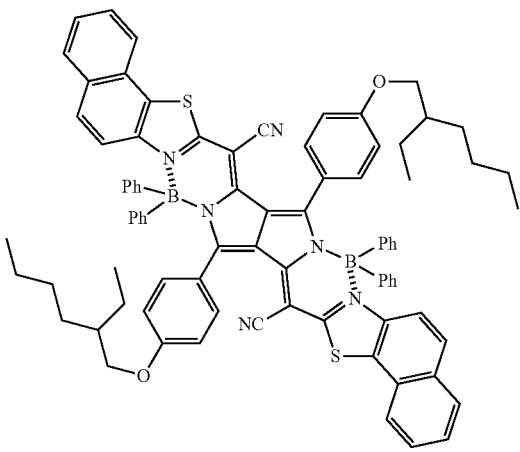
D-22
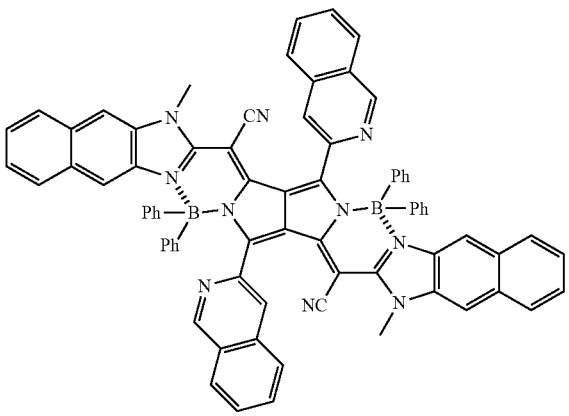
D-23
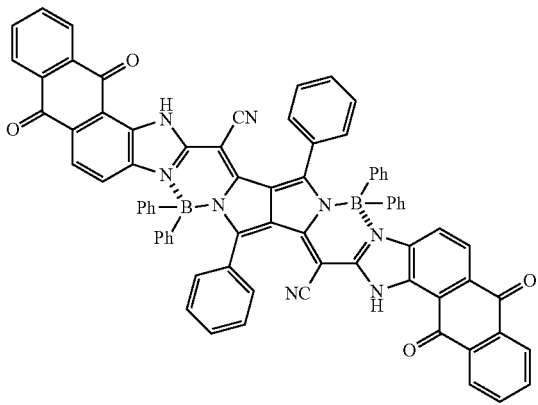

-continued
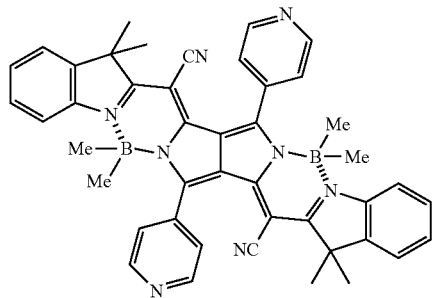
D-24
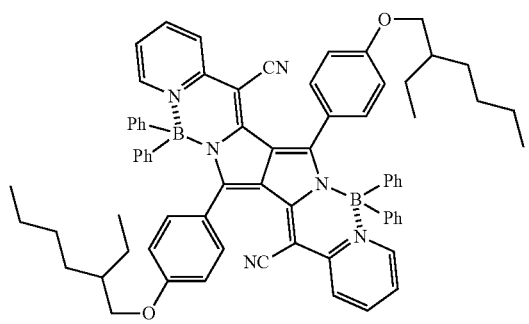
D-25
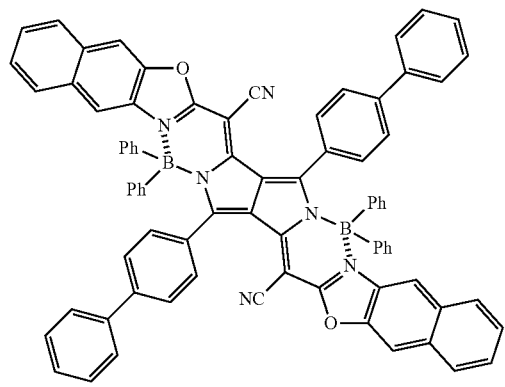
D-26
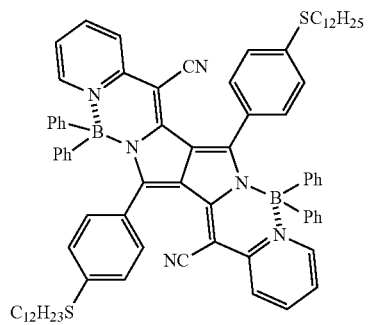
D-27

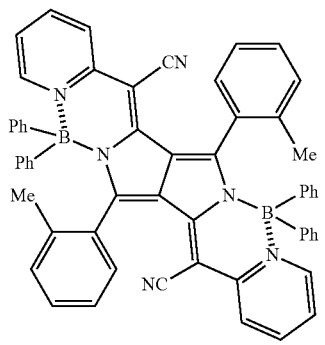
D-28
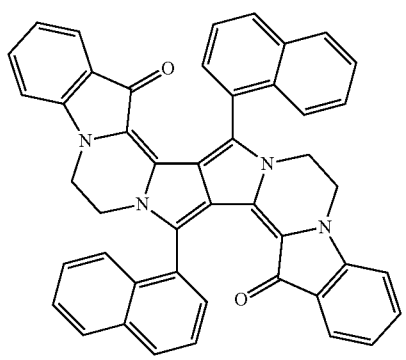
D-29
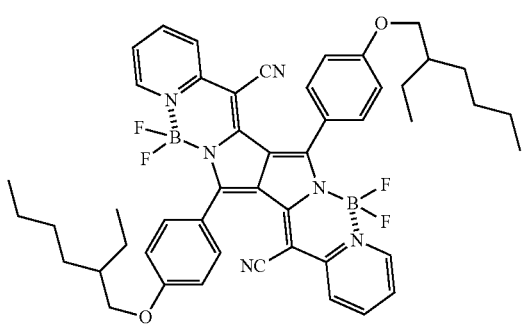
D-30
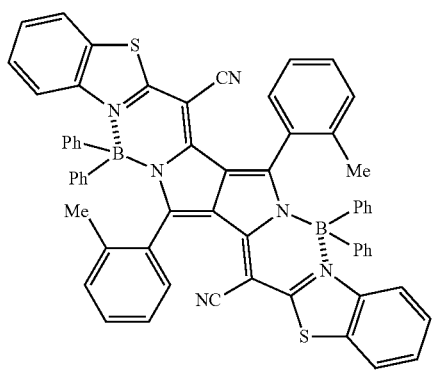
D-31

-continued
D-32
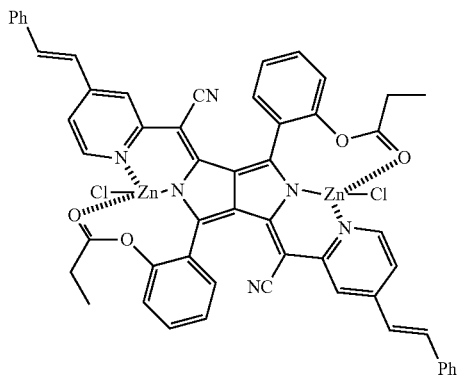
D-33
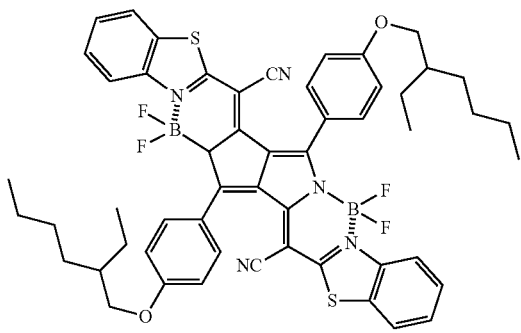
D-34
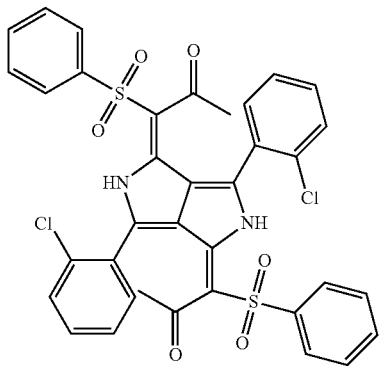
D-35
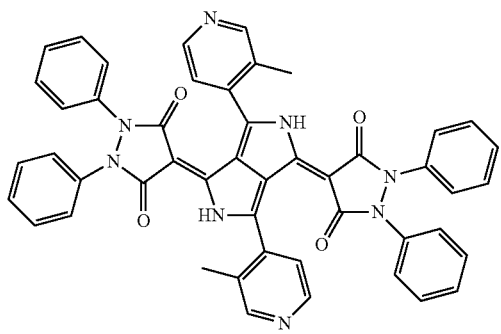

-continued
D-36
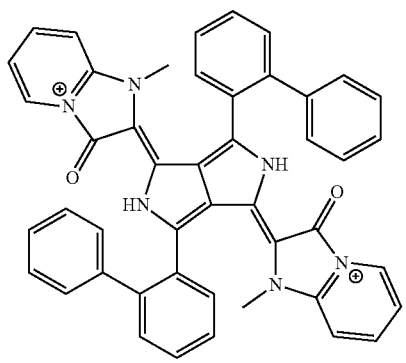
D-37
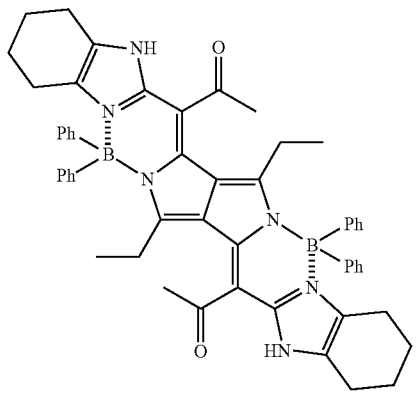
D-38
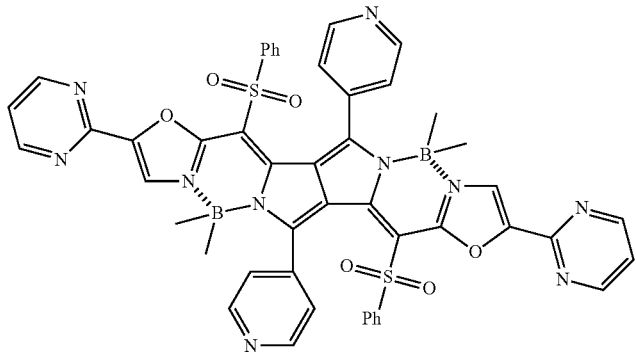
D-39
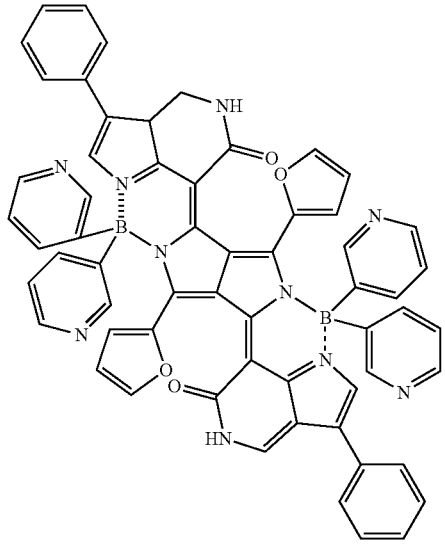

-continued
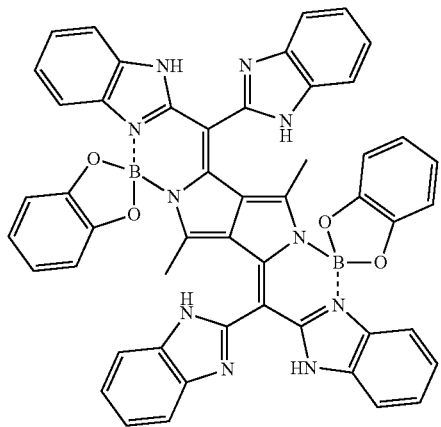
D-40
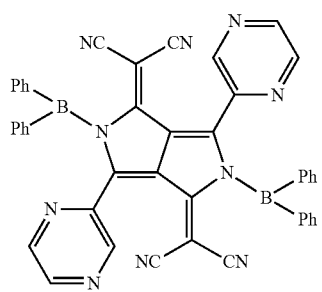
D-41
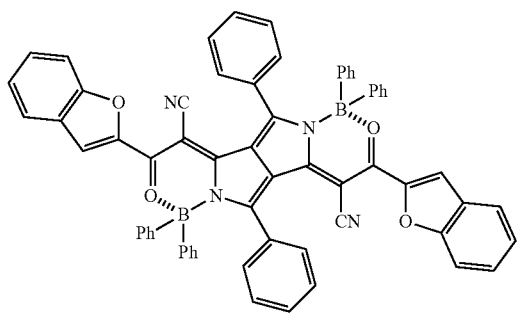
D-42
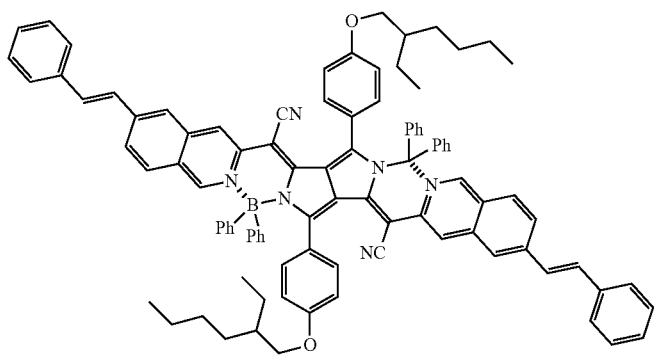
D-43

-continued
D-44
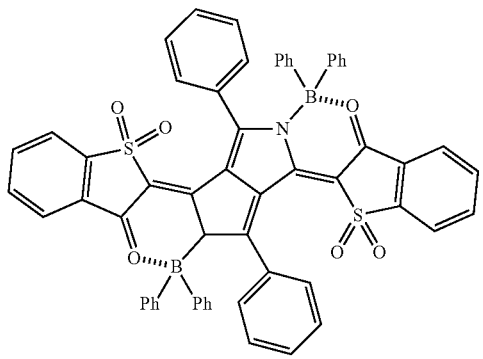
D-45
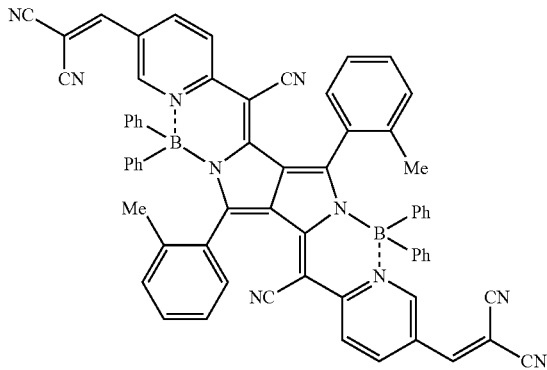
D-46
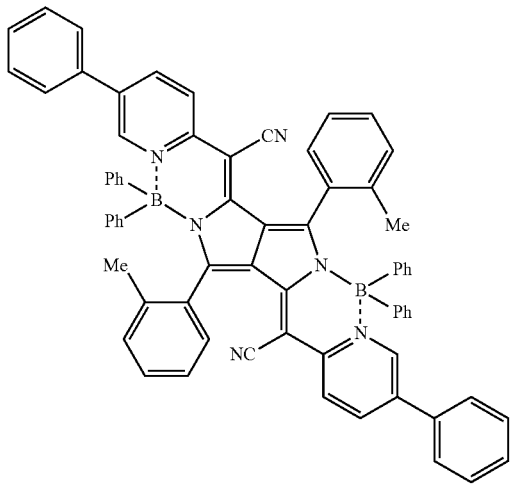
D-47
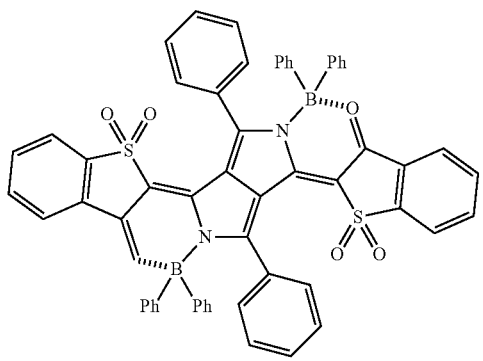

-continued
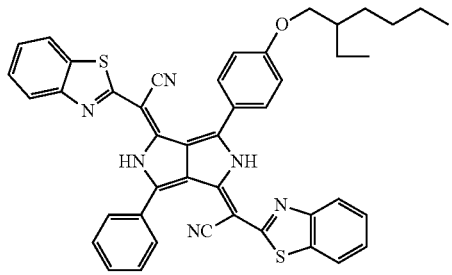
D-101
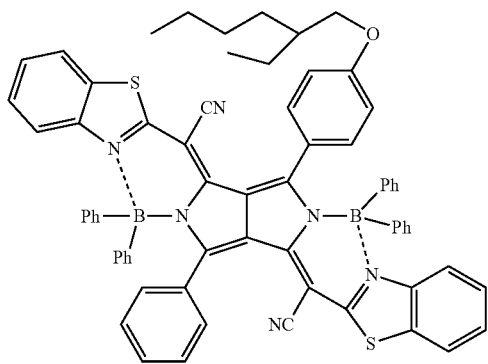
D-102
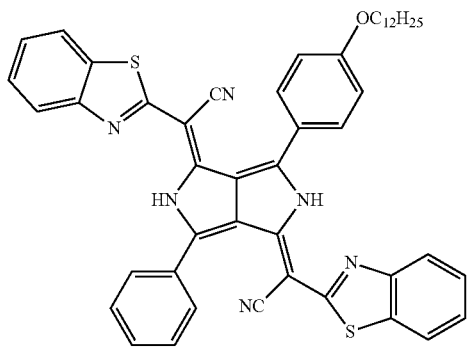
D-103
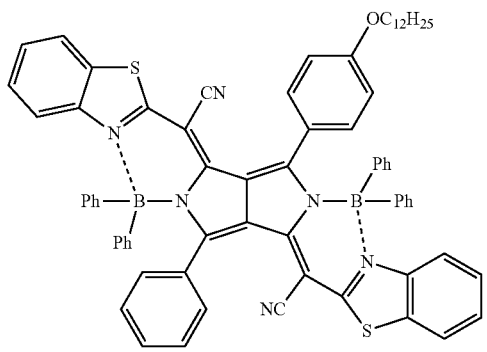
D-104

D-105
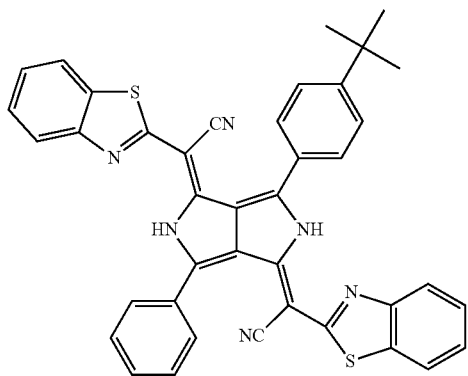
D-106
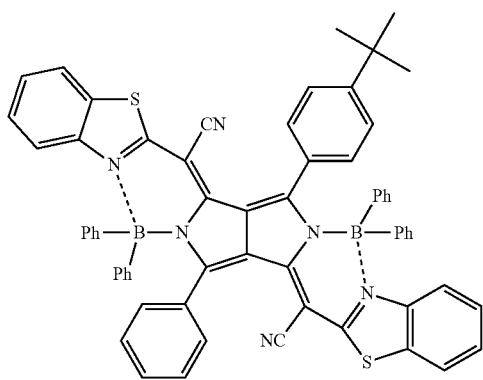
D-107
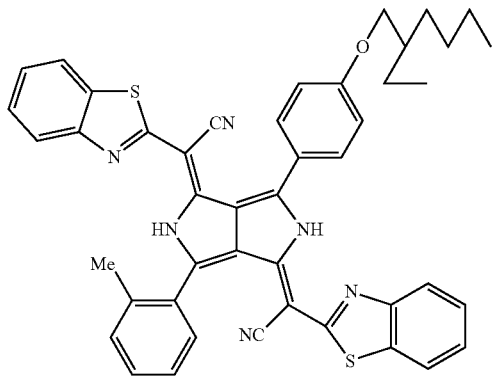
D-108
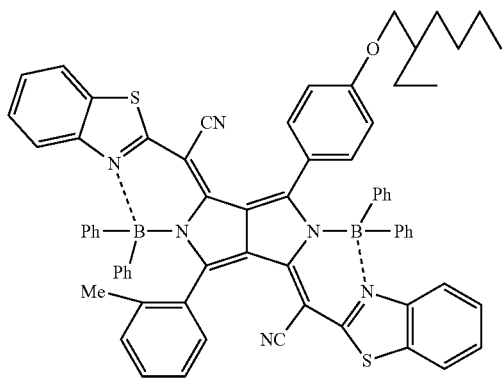

-continued
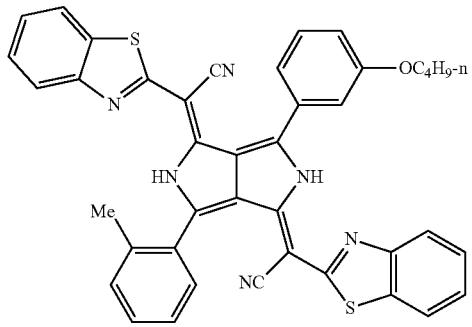
D-109
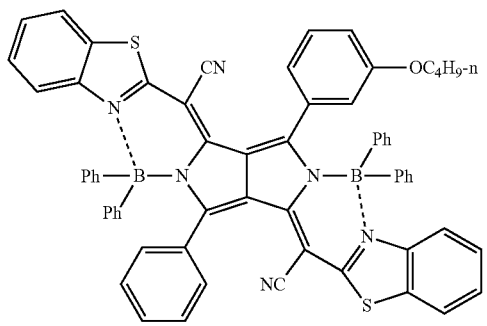
D-110
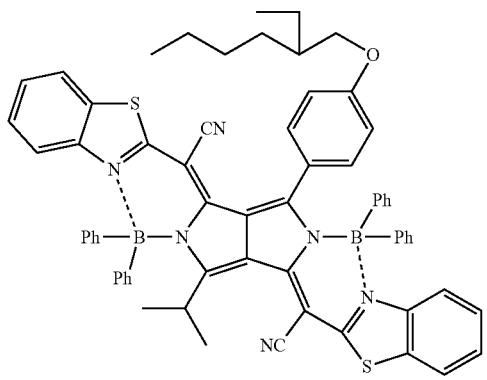
D-111
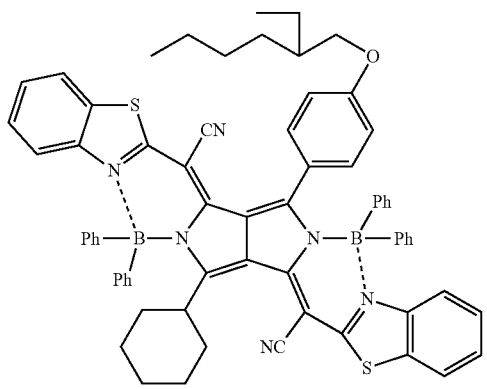
D-112

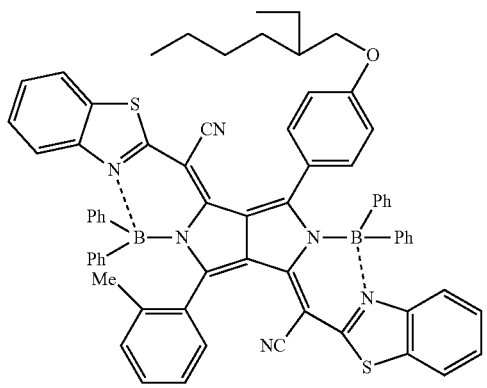
D-113
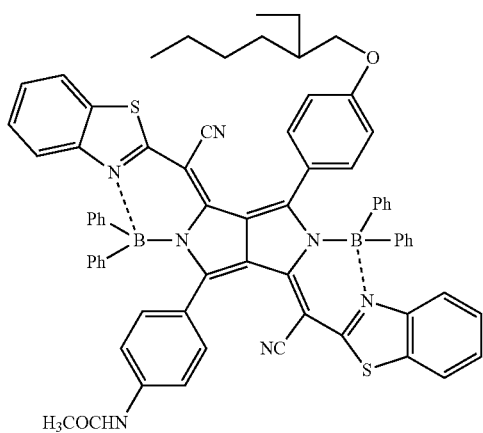
D-114
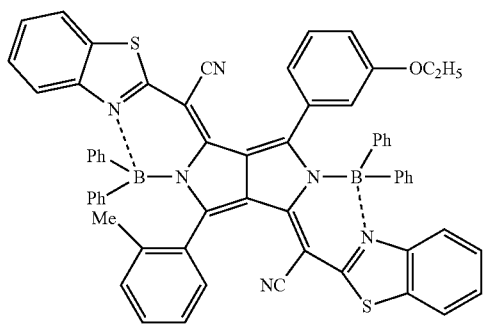
D-115
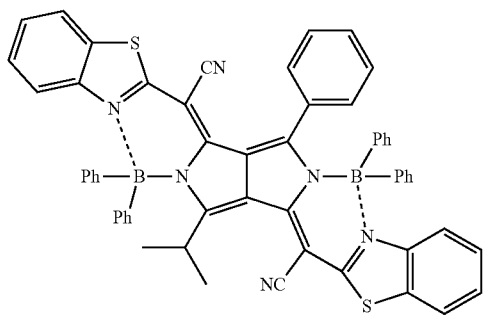
D-116

-continued
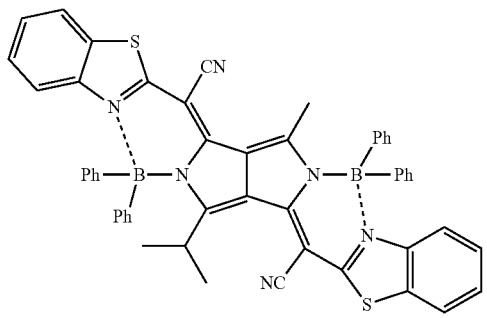
D-117
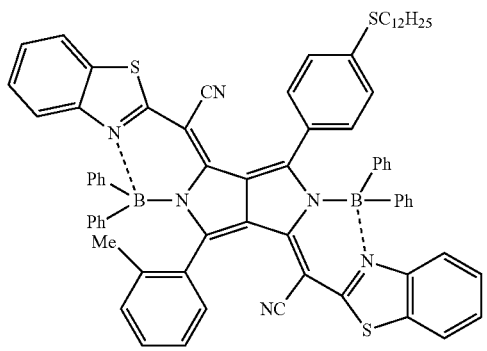
D-118
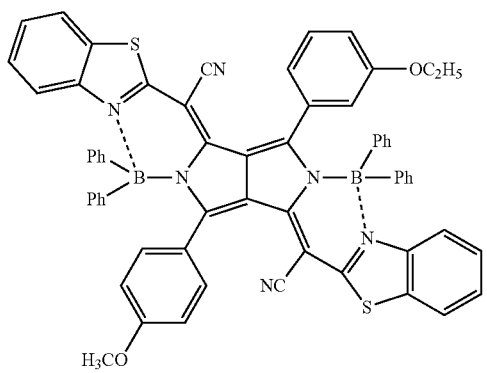
D-119
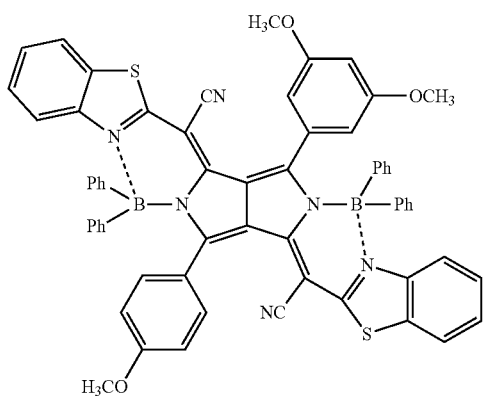
D-120

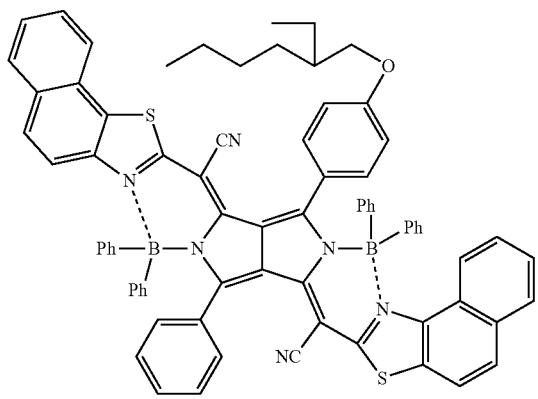
D-121
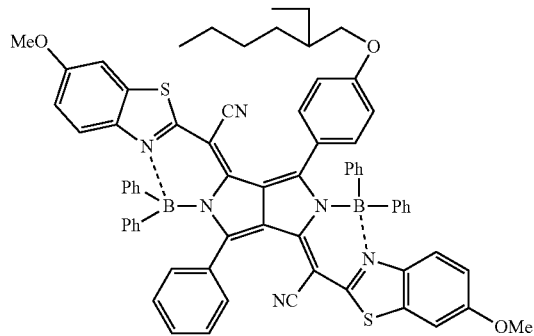
D-122
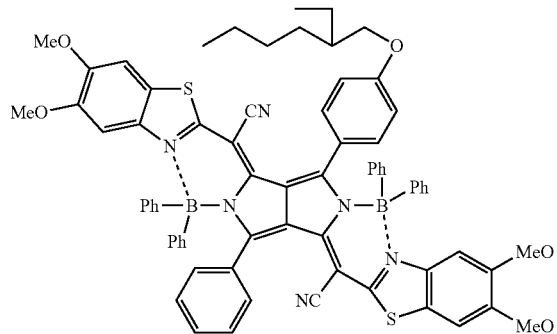
D-123
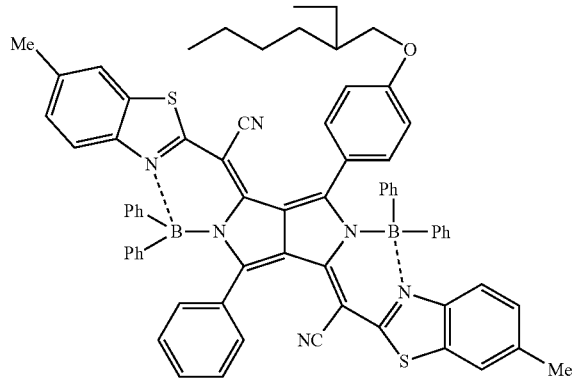
D-124

D-125
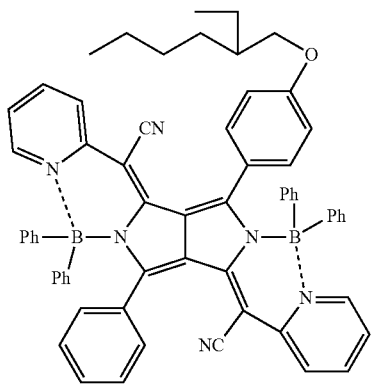
D-126
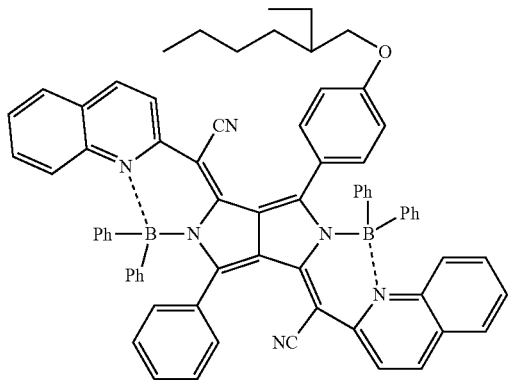
D-127
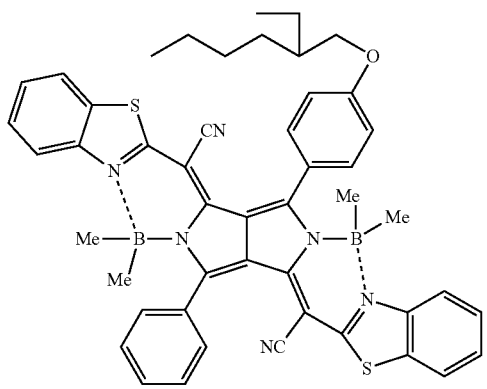
D-128
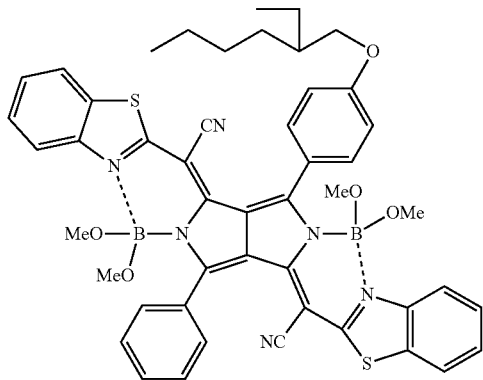

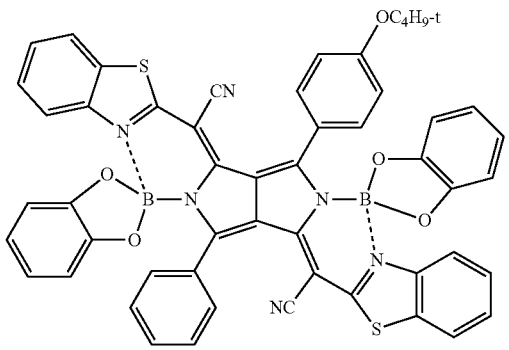
D-129
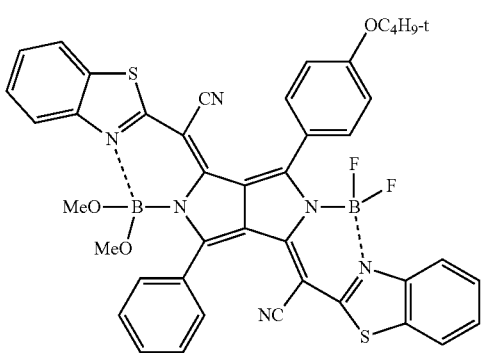
D-130
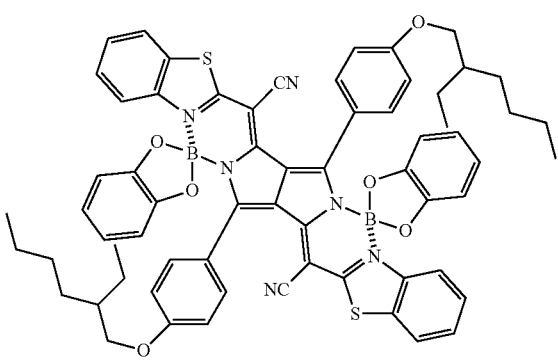
D-131
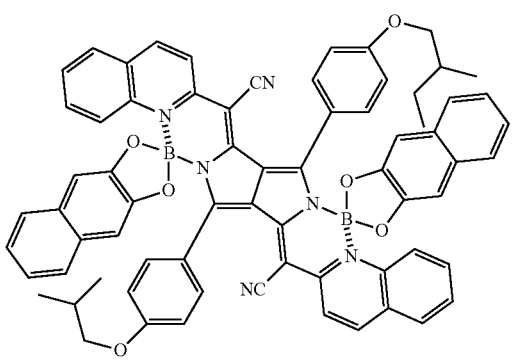
D-132

-continued
D-133
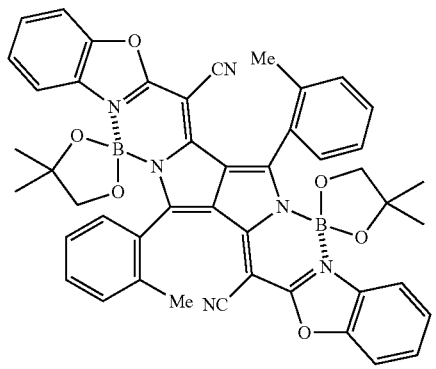
D-134
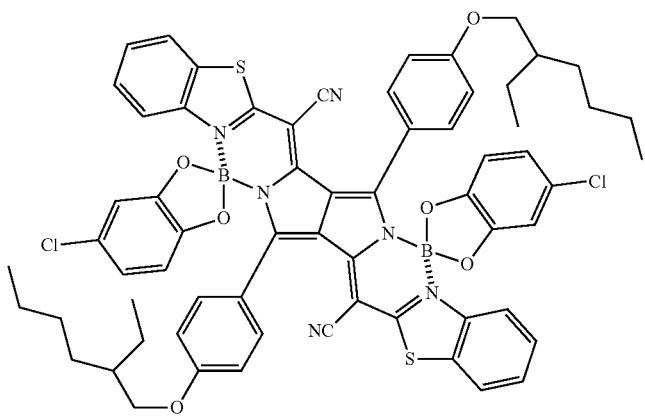
D-135
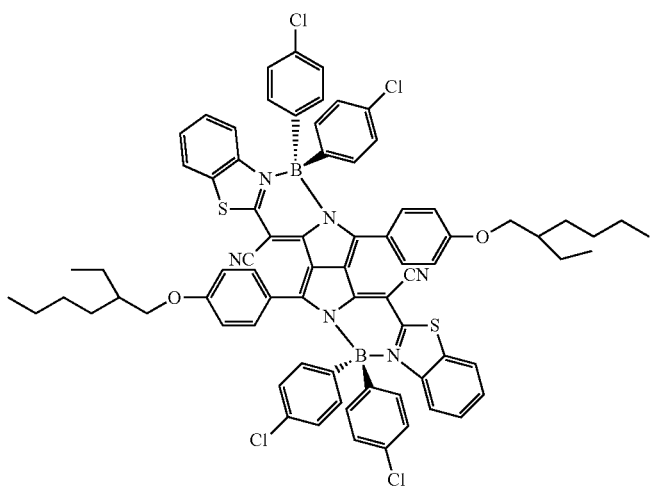

-continued
D-136
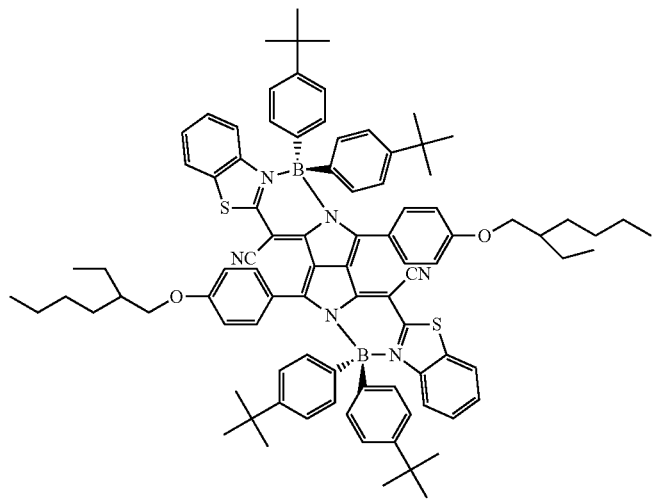
D-137
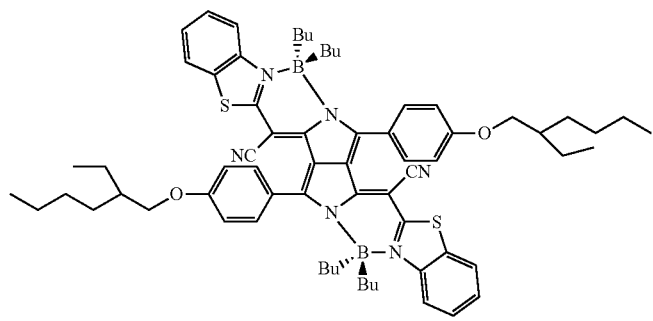
D-138
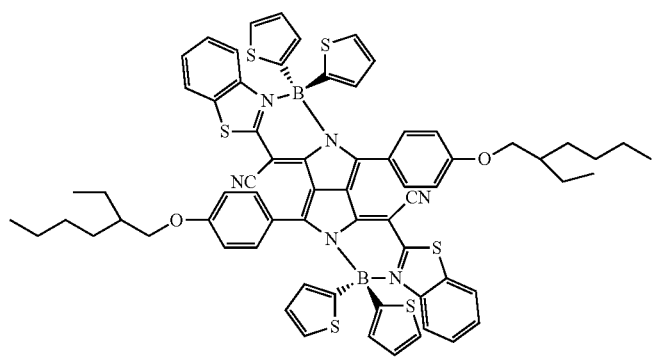
D-139
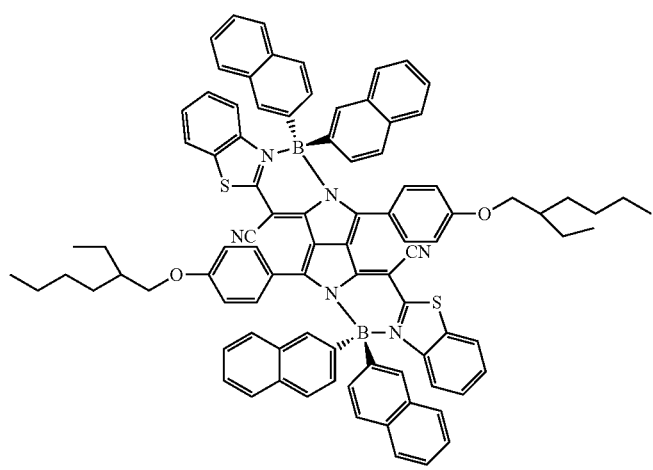

—1-3-3. Heat Ray Shielding Material—

As the heat ray shielding material, metal oxide particles can be exemplified.

Examples of the metal oxide particles include tin-doped indium oxide (hereinafter, abbreviated as "ITO"), tin-doped antimony oxide (hereinafter, abbreviated as "ATO"), zinc oxide, titanium oxide, indium oxide, tin oxide, antimony oxide, and glass ceramics. Among these, ITO, ATO, or zinc oxide is more preferable in terms of capable of producing a multilayer structure (heat ray shielding material) having excellent heat ray absorbing ability and having heat ray absorbing ability in a broad range by being combined with tabular silver particles, and ITO is particularly preferable in terms of shielding 90% or more of infrared rays at 1200 nm or more and having a transmittance of visible light of 90% or more.

As the volume average particle diameter of primary particles of the metal oxide particles, 0.1 μm or less is preferable because the transmittance of visible light is not decreased and scattering of visible light is suppressed.

The form of the metal oxide particles is not particularly limited and can be suitably selected in accordance with an intended purpose, and examples thereof include a spherical form, a needle-like form, and a plate-like form.

2. Undercoat Layer

The multilayer structure of the present invention is a structure including the metal particles-containing layer, the layer A, and the layer B. In a preferred embodiment, as the above-described configuration of FIG. 1, the support is used as the layer B, the undercoat layer is used as the layer A, and the metal particles-containing layer is arranged thereon.

Further, in another preferred embodiment, as the above-described configuration of FIG. 4, the support is used as the layer C, the undercoat layer and the second undercoat layer are used as the layer B and the layer A, and the metal particles-containing layer is arranged thereon.

By employing such configurations, it is possible to easily form the multilayer structure of the present invention.

As the materials used for the undercoat layer, materials which are the same as those for an overcoat layer described below can be used.

In a case where the undercoat layer and the second undercoat layer are respectively used as the layer B and the layer A, examples of a method of adjusting the refractive index of each layer include a method of changing a binder used for each layer and a method of adjusting the refractive index by adding fine particles. The preferred range of the binder or fine particles used for the undercoat layer at this time is the same as that of a binder or fine particles used for the overcoat layer described below.

The thickness of the undercoat layer is preferably in the range of 0.01 μm to 1000 μm, more preferably in the range of 0.02 μm to 500 μm, particularly preferably in the range of 0.10 m to 10 μm, and more particularly preferably in the range of 0.15 μm to 2 μm.

However, in a case where the corresponding undercoat layer is used as the layer A, the range becomes the range satisfying Expression (1-1) or (2-1).

3. Support

The multilayer structure of the present invention is a structure including the metal particles-containing layer, the layer A, and the layer B, and the support can be used as the layer B as the configuration of FIG. 1. Further, as the configuration of FIG. 4, the support may be used as the layer C.

It is preferable that the multilayer structure of the present invention includes a support on the surface on the opposite side of the surface on which the overcoat layer described below of the metal particles-containing layer is arranged.

The support is not particularly limited as long as the support is an optically transparent substrate and can be suitably selected in accordance with an intended purpose, and examples thereof include a support whose transmittance of visible light is 70% or more, a support whose transmittance of visible light is preferably 80% or more, and a support whose transmittance in the near-infrared region is high.

The form, the structure, the size, and the materials of the support are not particularly limited and can be suitably selected in accordance with an intended purpose. The form thereof may be plate-like, the structure thereof may be a single layer structure or a multilayer structure, and the size thereof can be suitably selected according to the size of the multilayer structure.

The material of the support is not particularly limited and can be suitably selected in accordance with an intended purpose, and examples thereof include a film made of a polyolefin resin such as polyethylene, polypropylene, poly 4-methylpentene-1, or polybutene-1; a polyester resin such as polyethylene terephthalate or a polyethylene naphthalate; and a cellulose resin such as a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin, or cellulose acetate and a laminate film of these. Among these, a polyethylene terephthalate film is particularly preferable from viewpoints of a high refractive index and easily satisfying the optical characteristics as the B layer or the C layer.

The thickness of the support is not particularly limited and can be suitably selected in accordance with an intended purpose of use of the solar radiation shielding film, and the thickness thereof is normally in the range of 10 μm to 500 μm, but the thickness thinner than that is preferable from a viewpoint of the demand of thinning a film. The thickness of the support is preferably in the range of 10 μm to 100 μm, more preferably in the range of 20 μm to 75 μm, and particularly preferably in the range of 35 μm to 75 μm. Further, when the thickness of the substrate becomes larger, there is a tendency that construction thereof becomes hard since the substrate is firm as a material while adhering to a building material or an automobile as the multilayer structure. In addition, the cost of raw materials tends to be increased while the transmittance of visible light is decreased by the substrate being thick.

4. Overcoat Layer

The multilayer structure of the present invention may include an overcoat layer arranged in close contact with the surface of the metal particles-containing layer. In this case, it is preferable that the overcoat layer is included as the second layer A in the configuration of FIG. 3. Further, the overcoat layer may contain fine particles. Examples of a method of adjusting the refractive index of the overcoat layer include a method of changing a binder used for the overcoat layer and a method of adjusting the refractive index by adding fine particles.

When the multilayer structure of the present invention has the overcoat layer, especially in a case where the tabular metal particles are eccentrically located in the surface of the metal particles-containing layer, the overcoat layer can prevent the tabular metal particles from peeling away in the production process to cause contamination, and the configuration of the tabular metal particles being disordered in forming any other layer on the metal particles-containing layer, and thus the multiple layer is preferred.

The fine particles may be inorganic fine particles and organic fine particles, but the inorganic fine particles are preferred.

As examples of the inorganic fine particles, there are described oxides (for example, colloidal silica, titanium oxide, magnesium oxide, and aluminum oxide), alkaline earth metal salts (for example, sulfate salts or carbonate salts, and concretely, barium sulfate, calcium carbonate, magnesium sulfate, strontium sulfate, calcium carbonate, and the like), silver halide particles in which an image is not formed, glass, or the like. Further, inorganic particles may be used, disclosed in U.S. Pat. Nos. 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245, 4,029,504, and the like. Of the inorganic fine particles, colloidal silica, titanium oxide, barium sulfate, silver halide, and the like are preferred, and colloidal silica is especially preferred. As specific examples of colloidal silica, there are described commercial products having trade names such as Ludox AM, Ludox AS, Ludox LS, and Ludox HS by E. I. du pont de Nemours & Co. (USA), trade names such as Snowtex 20, Snowtex C, Snowtex N, and Snowtex 0 by Nissan Chemical (Tokyo, Japan), trade names such as Syton C-30 and Syton-200 by Monsant Co. (USA), trade names such as Nalcoag 1030, Nalcoag 1060, and Nalcoag ID-21-64 by Nalco Chem. Co. (USA), and trade names such as Seahostar KE-W10, KE-W30, and KE-W50 by Nippon Shokubai. In addition, also used is tin dioxide-antimony compound needle-like metal oxide aqueous dispersion which is commercially available under the trade name of FS-10D manufactured by Ishihara Sangyo Kaisha.

As the organic fine particles, aqueous dispersion polymers (latex) are preferably used, and, for example, there are described esters of acrylic acid or methacrylic acid, particularly, polymers containing alkyl groups having 1 to 10 carbon atoms, such as methyl, ethyl, n-propyl, isopropyl, n-butyl, isobutyl, t-butyl, hexyl, 2-ethylhexyl, heptyl and n-octyl; copolymers of unsaturated carboxylic acid component such as acrylic acid, methacrylic acid, fumaric acid, itaconic acid, and maleic acid therewith; and acrylonitrile, methacrylonitrile, halo-substituted acrylonitrile, halogen substituted methacrylonitrile, acrylamide, methacrylamide, N-methylol acrylonitrile, N-ethanol acrylamide, N-methyl acrylamide, N-propanol acrylamide, N-methylol methacrylamide, N-t-butyl acrylamide, hydroxyethyl acrylate, methacrylic acid hydroxyethyl, glycidyl acrylate, glycidyl methacrylate, fumaric acid, itaconic acid, maleic acid, itaconic anhydride, maleic anhydride, half esters of itaconic acid, and the like. As monomers which can be optionally used together, there are described vinyl esters such as vinyl acetate, vinyl chloroacetate, and vinyl benzoate, vinyl pyridine, vinyl chloride, butadien, and the like. Such an aqueous dispersion polymer can be obtained by dispersing the mixture of the monomers in water with a surfactant and then polymerizing the dispersed mixture with a typical radical initiator.

The average particle diameter of the fine particles is preferably from 5 nm to 1500 nm, more preferably from 5 nm to 900 nm, and even more preferably from 5 nm to 300 nm. For use in the multilayer structure, general fine particles which are exposed to the overcoat layer scatter light which tends to increase the haze, and thus preferably the haze is reduced by using a limited particle size.

The mass ratio of the fine particles in the overcoat layer to the binder is preferably from 0.02 to 0.4, more preferably from 0.02 to 0.3, and even more preferably from 0.02 to 0.2.

The overcoat layer is not particularly limited and can be suitably selected in accordance with an intended purpose. However, for example, the layer contains a binder, a mat agent, and a surfactant, in addition to the fine particles, and may optionally contain any other component.

The binder is not particularly limited and can be suitably selected in accordance with an intended purpose, and, for example, there are described thermosetting or thermocurable resins such as acrylic resin, silicone resin, melamine resin, urethane resin, alkyd resin, fluororesin, or the like. In addition, the binder exemplified in the UV absorbent layer may also be used. A function as an overcoat layer may be additionally imparted to a UV absorbent layer.

The thickness of the overcoat layer is preferably in the range of 0.01 µm to 1000 µm, more preferably in the range of 0.02 µm to 500 µm, particularly preferably in the range of 0.10 µm to 10 µm, and more particularly preferably in the range of 0.15 µm to 2 µm. When the overcoat layer containing the fine particles is given, a thin film which is about 100 nm thick is generally preferred in consideration of an amount of a material to be used and the surface roughness. Although an interface occurs between the formed overcoat layer and an adhesive layer, the thickness of the overcoat layer is preferably at least 150 nm from the viewpoint of preventing characteristic peak reflection from being reduced due to addition of light interference to a reflection spectrum of the tabular metal particles. However, this is except for a case where a refractive index of the adhesive layer matches a refractive index of the overcoat layer. On the other hand, bar coating is advantageous in minimizing manufacturing costs, and thus the thickness of a dried film of the overcoat layer is preferably 2000 nm or less in consideration of general corresponding viscosity of the coating and wet coating amount.

Here, in the case where the overcoat layer is used as the second layer A, the preferable material or thickness of the overcoat layer is in the range satisfying the condition (1-1) or the condition (2-1).

The average surface roughness Ra of the overcoat layer is preferably 5 nm or more.

4'. Adhesive Layer

It is preferable that the multilayer structure of the present invention includes an adhesive layer when a laminate structure of the present invention is formed.

Further, in the case where the multilayer structure of the present invention includes the overcoat layer, the adhesive layer may be used as the second layer B in the configuration of FIG. 3. In addition, examples of a method of adjusting the refractive index of the adhesive layer include a method of changing a binder used for the adhesive layer and a method of adjusting the refractive index by adding fine particles.

It is preferable that the multilayer structure of the present invention includes the adhesive layer. The adhesive layer may be the overcoat layer, an adhesive layer having a function of the UV ray absorbent layer, or an adhesive layer free from the UV ray absorbing solvent.

The materials which can be used for forming the adhesive layer are not particularly limited and can be suitably selected in accordance with an intended purpose, and examples thereof include a polyvinyl butyral (PVB) resin, an acrylic resin, a styrene/acrylic resin, a urethane resin, a polyester resin, and a silicone resin. These can be used alone or in combination of two or more kinds thereof. The adhesive layer made of these materials can be formed by coating.

In addition, an antistatic agent, a lubricant, and an anti-blocking agent may be used.

The thickness of the adhesive layer is preferably in the range of 0.1 µm to 10 µm.

Here, in the case where the adhesive layer is used as the second layer B, the preferable material or thickness of the adhesive layer is in the range satisfying at least one of the condition (3-1) and the condition (4-1).

5. Metal Oxide Particles-Containing Layer

It is preferable that the multilayer structure of the present invention further includes a metal oxide particles-containing layer containing at least one kind of metal oxide particle as a layer absorbing long wave infrared rays from a viewpoint of balance between heat ray shielding and production cost. It is preferable that the multilayer structure of the present invention includes the metal oxide particles-containing layer on the surface side of the opposite side of the surface of the metal particles-containing layer on which tabular metal particles in the hexagonal to circular forms of the metal particles-containing layer are exposed. In this case, when the multilayer structure of the present invention is arranged such that the tabular metal particles-containing layer is on the side of heat rays such as sunlight in the light incident direction, some of the heat rays (or all heat rays) are reflected on the tabular metal particles-containing layer and some of the heat rays are absorbed by the metal oxide-containing layer so that the total quantity of heat of the quantity of heat directly received in the inside of the multilayer structure due to the heat rays transmitted through the multilayer structure without being absorbed by the metal oxide-containing layer and the quantity of heat absorbed by the metal oxide-containing layer of the multilayer structure and indirectly transmitted to the inside of the multilayer structure can be decreased.

The metal oxide particles-containing layer is not particularly limited as long as the layer contains at least one kind of metal oxide particle and can be suitably selected in accordance with an intended purpose.

As the materials of the metal oxide particles, the metal oxide particles-containing layer can be formed using heat ray shielding materials exemplified as the additives of the metal particles-containing layer.

The content of the metal oxide particles in the metal oxide particles-containing layer is not particularly limited and can be suitably selected in accordance with an intended object thereof. For example, the content is preferably from $0.1 \text{ g/m}^2$ to $20 \text{ g/m}^2$, more preferably from $0.5 \text{ g/m}^2$ to $10 \text{ g/m}^2$, and even more preferably from $1.0 \text{ g/m}^2$ to $4.0 \text{ g/m}^2$.

When the content is less than $0.1 \text{ g/m}^2$, then the amount of sunshine which could be felt on skin may increase; and when more than $20 \text{ g/m}^2$, then the visible light transmittance of the layer may worsen. On the other hand, when the content is from $1.0 \text{ g/m}^2$ to $4.0 \text{ g/m}^2$, it is advantageous since the above two problems could be overcome.

The content of the metal oxide particles in the metal oxide particles-containing layer may be determined, for example, as follows: The TEM image of an ultra-thin section of the heat ray shielding layer and the SEM image of the surface thereof are observed, the number of the metal oxide particles in a given area and the average particle diameter thereof are measured, and the mass (g) calculated on the basis of the number and the average particle diameter thereof and the specific gravity of the metal oxide particles is divided by the given area ($m^2$) to give the content. In a different way, the metal oxide fine particles in a given area of the metal oxide particles-containing layer are dissolved out in methanol, and the mass (g) of the metal oxide particles is measured through fluorescent X-ray determination, and is divided by the given area ($m^2$) to give the content.

6. Other Layers (6-1. UV Absorbent Layer)

The UV absorbent layer is not particularly limited and can be suitably selected in accordance with an intended purpose so far as the layer contains at least one type of UV absorbent, and may be an adhesive layer, or a layer between the adhesive layer and the metal particles-containing layer (for example, an overcoat layer, a substrate, intermediate layers other than those, and the like). In any case, it is preferable that the UV absorbent layer be added to the layer to be arranged on the side to be exposed to sunlight relative to the metal particles-containing layer.

In a case where the UV absorbent layer forms an intermediate layer which is neither an adhesive layer nor a substrate, the UV absorbent layer contains at least one type of UV absorbent, and may optionally contain any other component such as a binder. The multilayer structure of the present invention preferably has the UV absorbent layer on the surface side of the metal particles-containing layer of the side where the hexagonal to circular tabular metal particles are exposed. In this case, an overcoat layer, described later, and the UV absorbent layer may be the same as or different from each other. Concretely, preferred is an embodiment of the multilayer structure of the present invention in which the overcoat layer is a layer between the UV absorbent layer and the metal particles-containing layer, and also preferred is an embodiment in which the overcoat layer is the UV absorbent layer.

—6-1-1. UV Absorbent—

The UV absorbent is not particularly limited and can be suitably selected in accordance with an intended purpose, and the UV ray absorbent layer can be formed using the UV absorbent exemplified as an additive of the metal particles-containing layer.

—6-1-2. Binder—

The binder used in the UV absorbent layer is not particularly limited and can be suitably selected in accordance with an intended object thereof, but is preferably one having high visible light transparency and solar transparency. For example, there are described acrylic resin, polyvinyl butyral, polyvinyl alcohol, or the like. When the binder absorbs heat rays, then the reflection effect of the tabular metal particles may be thereby weakened, and therefore, it is preferable that, for the UV absorbent layer to be formed between a heat ray source and the tabular metal particles, a material not having an absorption in the region of from 450 nm to 1,500 nm is selected and the thickness of the UV absorbent layer is reduced.

The thickness of the UV absorbent layer is preferably from $0.01 \text{ μm}$ to $1,000 \text{ μm}$, more preferably from $0.02 \text{ μm}$ to $500 \text{ μm}$. When the thickness is less than $0.01 \text{ μm}$, then the UV absorption becomes poor; and when more than $1,000 \text{ μm}$, then the visible light transmittance may lower.

The content of the UV absorbent layer varies, depending on the UV absorbent layer to be used, and therefore could not be indiscriminately defined. Preferably, the content is suitably so as to be defined as to produce a desired UV transmittance to the multilayer structure of the present invention.

The UV transmittance is preferably 5% or less, more preferably 2% or less. When the UV transmittance is more than 5%, then the color of the tabular metal particles-containing layer is changed by the UV rays of sunlight.

—6-2. Hard Coat Layer—

For imparting scratch resistance thereto, preferably, the multilayer structure has a hard coat layer having hard coatability.

The hard coat layer is not particularly limited and can be suitably selected in point of the type thereof and the formation method for the layer, in accordance with the purpose. For example, there are described thermosetting or photosetting resins such as acrylic resin, silicone resin, melamine resin, urethane resin, alkyd resin, fluororesin, or the like. Not particularly limited, the thickness of the hard coat layer can be suitably selected in accordance with an intended object thereof. Preferably, the thickness is from 1 µm to 50 µm. Further forming an anti-reflection layer and/or an antiglare layer on the hard coat layer is preferred, since a functional film having an anti-reflection property and/or an antiglare property in addition to scratch resistance may be obtained. The hard coat layer may contain the above-described metal oxide particles.

<Method of Producing Multilayer Structure>

The method of producing the multilayer structure of the present invention is not particularly limited and can be suitably selected in accordance with an intended purpose. For example, there is described a coating method of forming the above-described metal particles-containing layer, the above-described A layer, the B layer, and optionally other layers on the surface of the above-described substrate.

(Method of Forming Metal Particles-Containing Layer)

The method of forming the metal particles-containing layer is not particularly limited and can be suitably selected in accordance with an intended purpose. For example, there are described a method of coating a dispersion containing the above-described tabular metal particles onto the surface of the underlying layer such as the above-described substrate with a dip coater, a die coater, a slit coater, a bar coater, a gravure coater or the like, and a method of plane orientation according to an LB membrane method, a self-assembly method, a spray coating method or the like. Of those, preferred is the method of using the bar coater. In producing the multilayer structure of the present invention, a composition of the metal particles-containing layer used in Examples to be given hereinunder is prepared, and then a latex or the like is added thereto in order that 80% by number or more of the above-described hexagonal to circular tabular metal particles relative to the total number of the hexagonal to circular tabular metal particles contained in the metal particles-containing layer preferably exist in a range from the surface of the metal particles-containing layer to d/2 thereof, and more preferably to d/3. The amount of the latex to be added is not particularly limited. For example, the latex is preferably added in an amount of from 1% to 10000% by mass relative to the tabular silver particles.

As an additive added to a coating liquid used when the metal particles-containing layer is formed by coating, a surfactant or an additive described in paragraphs [0027] to [0031] of JP-A-2005-17322 can be exemplified.

The surfactant is not particularly limited, and any surfactant such as an aliphatic, aromatic, or a fluorine-based surfactant; and any surfactant such as a nonionic, anionic, or cationic surfactant may be used. As the surfactant, a surfactant described in JP-A-2011-218807 can be exemplified. Further, the surfactant is described in "*Surfactant Handbook*" (edited by Ichiro NISHI, Ichiro IMAI, and SHOZO Kasai, Sangyo Tosho Co., Ltd., published in 1960). The amount of the surfactant to be added is preferably in the range of 0.1 mg/m$^2$ to 30 mg/m$^2$ and more preferably in the range of 0.2 mg/m$^2$ to 10 mg/m$^2$. Further, repelling occurs in some cases when the amount of the surfactant to be added is less than 0.1 mg/m$^2$ and the surface state becomes deteriorated in some cases when the amount of surfactant to be added is more than 30 mg/m$^2$.

Specifically, as the surfactant, F Lipal 8780P (manufactured by Lion Corporation) or Naroacty CL-95 (manufactured by Sanyo Chemical Industries Co., Ltd.) is preferably used.

The surfactant may be used along or in combination of two or more kinds thereof.

A method of forming the above-described metal particles-containing layer may include a method of plane orientation using electrostatic interaction for the purpose of increasing adsorption performance of the tabular metal particles onto the substrate surface or the plane orientation. The method may include, for example, a method of charging the surface of the substrate to a positive polarity (for example, of modifying the substrate surface with an amino group or the like) in a case where the surface of the tabular metal particles is charged to a negative polarity (for example, a state in which the tabular metal particles are dispersed in a negative-charged medium such as a citric acid) so as to electrostatically increase plane orientation, thereby giving plane orientation. In a case where the surface of the tabular metal particle is hydrophilic, a hydrophilic/hydrophobic sea-island structure is formed on the surface of the substrate in a block copolymer method or a µ contact stamp method, and the plane orientation and the intergranular distance of the tabular metal particles may be controlled by using hydrophilic/hydrophobic interaction.

If desired, the plane orientation of the tabular metal particles may be promoted by pressing with a pressure roller, such as a calendar roller, a lamination roller or the like after the coating.

(Method of Forming Layer A, Layer B, and Layer C Other than Support)

The layer A, the layer B, and the layer C other than the support are preferably formed by coating. The coating method at this time is not particularly limited and a known method can be used. The additive used for each layer is not particularly limited, but an additive which is the same as the additive added to the coating liquid used when the metal particles-containing layer is formed by coating is preferably used.

(Method of Forming Adhesive Layer)

The adhesive layer may be used as the layer A, the layer B, and the layer C and is preferably formed by coating in the same manner. For example, the adhesive layer can be laminated on the surface of a lower layer such as the metal particles-containing layer or the overcoat layer. The coating method at this time is not particularly limited and a known method can be used.

(Lamination of Adhesive Layer Through Dry Lamination)

In a case where the multilayer structure film of the present invention is used for imparting functionality to existing windowpanes or the like, the film may be stuck to the indoor side of the windowpanes by laminating thereon via an adhesive. In such a case, it is preferable that the reflection layer is made to face as much as possible the sunlight side because the heat generation could be prevented, and therefore it is suitable that an adhesive layer is laminated on a silver nano disk particle layer and the material is stuck to a windowpane via the adhesive layer.

In laminating the adhesive layer onto the surface of a silver nano disk layer, an adhesive-containing coating liquid may be directly applied onto the surface thereof; however, various additives contained in the adhesive as well as the plasticizer and the solvent to be used may disturb the alignment of the silver nano disk layer or may deteriorate the silver nano disk itself. To minimize such problems, it is effective to employ dry lamination in which an adhesive is previously applied onto a release film and dried thereon to prepare an adhesive film, and the adhesive surface of the resulting film is laminated to the surface of the silver nano disk layer of the film of the present invention.

[Laminate Structure]

There can be produced a laminate structure of the present invention by laminating the multilayer structure of the present invention with any of glass or plastic.

The production method is not particularly limited and can be suitably selected in accordance with an intended object thereof. There is described a method of sticking the multilayer structure as produced in the manner as above to glass or plastic for vehicles such as automobiles or the like, or to glass or plastic for buildings. Further, the multilayer structure of the present invention and one of glass and plastic may be laminated with each other using a coating liquid.

The multilayer structure of the present invention is preferably used as the heat ray shielding material by being configured as a laminate structure laminated with one of glass and plastic. The heat ray shielding material is in any mode of selectively reflecting or absorbing heat rays (near-infrared rays), and the mode of using the material is not particularly limited and can be suitably selected in accordance with an intended purpose. For example, there are described a film or a laminate structure for vehicles, a film or a laminate structure for buildings, a film for agricultural use, or the like. Of those, preferred are a film or a laminate structure for vehicles and a film or a laminate structure for buildings, from the viewpoint of the energy-saving effect thereof.

In the present invention, the heat rays (near-infrared rays) average near-infrared rays (from 780 nm to 1,800 nm) that are contained in a ratio of about 50% in sunlight.

EXAMPLES

Hereinafter, Examples of the present invention and Comparative Examples will be described, but the present invention is not limited to the Examples. In addition, the Comparative Examples cannot be said to be well-known techniques.

In the following Examples, the material used, its amount and ratio, the details of the treatment and the treatment process may be suitably modified or changed not overstepping the spirit and the scope of the present invention. Accordingly, the scope of the present invention should not be limitatively interpreted by the Examples described below.

Production Example 1

Preparation of Silver Tabular Particle Dispersion B1

—Synthesis of Tabular Metal Particles—

24.5 mL of an aqueous 1% sodium citrate solution and 16.7 mL of an aqueous 8 g/L sodium polystyrene sulfonic acid solution were added to 308 mL of pure water and heated to 35° C. 1 mL of an aqueous 2.3 mM sodium borohydride solution was added to the solution and 363 mL of an aqueous 0.5 mM silver nitrate solution (Ag-1) was added while stirring. After the solution was stirred for 30 minutes, 24.5 mL of an aqueous 1% sodium citrate solution, 33 mL of an aqueous 10 mM ascorbic acid solution, and 211 mL of pure water were added thereto. Further, 199 mL of an aqueous 0.5 mM silver nitrate solution (Ag-2) was added while stirring. After the solution was stirred for 30 minutes, an aqueous gelatin solution obtained by dissolving 197 mL of an aqueous 7.7% potassium hydroquinonesulfonate solution, 33 g of inert gelatin having an average molecular weight of 100000, and 22 g of inert gelatin having an average molecular weight of 20000 in 480 mL of pure water was added to a reactor. Next, 4.4 mL of 1N nitrate was added thereto, a white precipitate-mixed solution of silver sulfite obtained by mixing 67 mL of an aqueous 13.5% sodium sulfite solution, 228 mL of an aqueous 10% silver nitrate solution, and 369 mL of pure water were added thereto in advance. The solution was stirred for 300 minutes and 145 mL of 1N NaOH was added thereto, thereby obtaining a silver tabular particle dispersion A1.

—Evaluation of Metal Particles—

(Ratio of Tabular Particles, Average Particle Diameter (Average Circle Equivalent Diameter), Coefficient of Variation, and Thickness of Average Particle)

When an SEM image was observed on four hundred particles in the silver tabular particle dispersion A1 and image analysis was performed by setting tabular particles in a hexagonal form as A and amorphous particles other than tabular particles as B, the ratio (% by number) of number of particles corresponding to A was 96%. The average particle diameter of particles corresponding to A (average circle equivalent diameter) was 135 nm. The average circle equivalent diameter (coefficient of variation) of the plate-like particle A obtained by dividing standard deviation of particle diameter distribution by the average circle equivalent diameter was 17%.

The obtained silver average particle dispersion A1 was dried after dropwise addition to a glass substrate and the thickness of respective tabular metal particles corresponding to A was measured using an atomic force microscope (AFM) (Nanocutell, manufactured by Seiko Instruments, Inc.). The measurement conditions using an AFM were a self-detecting sensor, a DFM mode, a measurement range of 5 µm, a scanning speed of 180 sec/1 frame, and the number of data points of 256×256. The average particle thickness of the tabular particles in the dispersion A1 was 10 nm.

—Preparation of Metal Particles-Containing Layer—

Centrifugation was performed on 500 mL of the silver tabular particle dispersion B1 at 7000 rpm for 30 minutes using a centrifugal separator (H-200N manufactured by Kokusan, Inc., Amble Rotor BN), and silver tabular particles were precipitated. 450 mL of a supernatant solution after the centrifugation was disposed, 200 mL of an aqueous 0.2 mM NaOH solution was added thereto, and precipitated hexagonal tabular particles were redispersed, thereby preparing a silver tabular particle dispersion B1.

Production Example 2

Preparation of Coating Liquid M1 for Metal Particles-Containing Layer

A coating liquid M1 for the metal particles-containing layer with the following composition was prepared.

Composition of Coating liquid M1 for metal particles-containing layer:

Polyurethane aqueous solution: HYDRAN HW-350
(manufactured by DIC, Ltd., solid content concentration: 30% by mass) 0.27 parts by mass Surfactant A: F Lipal 8780P
(manufactured by Lion Corporation, solid content: 1% by mass) 0.96 parts by mass Surfactant B: Naroacty CL-95
(manufactured by Sanyo Chemical Industries Co., Ltd., solid content: 1% by mass) 1.19 parts by mass Tabular silver particles dispersion B1 32.74 parts by mass 1-(5-Methylureidophenyl)-5-Mercaptotetrazole
(manufactured by Wako Pure Chemical Industries, Ltd., solid content: 2% by mass) 0.61 parts by mass Water 34.23 parts by mass Methanol 30 parts by mass

Production Example 3

Preparation of Coating Liquid M2 for Metal Particles-Containing Layer

A coating liquid M2 for the metal particles-containing layer with the following composition was prepared.

Composition of Coating liquid M2 for metal particles-containing layer:
Polyurethane aqueous solution: HYDRAN HW-350 (manufactured by DIC, Ltd., solid content concentration: 30% by mass) 4.32 parts by mass
Surfactant A: F Lipal 8780P (manufactured by Lion Corporation, solid content: 1% by mass) 0.96 parts by mass
Surfactant B: Naroacty CL-95 (manufactured by Sanyo Chemical Industries Co., Ltd., solid content: 1% by mass) 1.19 parts by mass
Tabular silver particles dispersion B1 32.74 parts by mass
1-(5-Methylureidophenyl)-5-Mercaptotetrazole (manufactured by Wako Pure Chemical Industries, Ltd., solid content: 2% by mass) 0.61 parts by mass
Water 30.18 parts by mass
Methanol 30 parts by mass

Production Example 4

Preparation of Coating Liquid A1 for Layer A

The coating liquid A1 for the layer A with the following composition was prepared.

Composition of Coating Liquid A1 for Layer A:
Polyurethane aqueous solution: HYDRAN HW-350 (manufactured by DIC, Ltd., solid content concentration: 30% by mass) 3.23 parts by mass
Surfactant A: F Lipal 8780P (manufactured by Lion Corporation, solid content: 1% by mass) 0.96 parts by mass
Surfactant B: Naroacty CL-95 (manufactured by Sanyo Chemical Industries Co., Ltd., solid content: 1% by mass) 1.18 parts by mass
Water 64.63 parts by mass
Methanol 30 parts by mass

Production Example 5

Preparation of Coating Liquid A2 for Layer A

The coating liquid A2 for the layer A with the following composition was prepared.

Composition of Coating Liquid A2 for Layer A:
Polyurethane aqueous solution: HYDRAN HW-350 (manufactured by DIC, Ltd., solid content concentration: 30% by mass) 1.83 parts by mass
Silica particles IPA dispersion: Sururia 4110 (manufactured by JGC Catalyst & Chemicals Co., Ltd., solid content concentration: 20.5%) 4.06 parts by mass
Surfactant B: Naroacty CL-95 (manufactured by Sanyo Chemical Industries Co., Ltd., solid content: 1% by mass) 1.18 parts by mass
Water 64.63 parts by mass
IPA 25.94 parts by mass

Production Example 6

Preparation of Coating Liquid B1 for Layer B

The coating liquid B1 for the layer B with the following composition was prepared.

Composition of Coating Liquid B1 for Layer B:
Polyurethane aqueous solution: Plascoat Z687 (manufactured by Goo Chemical Co., Ltd., solid content concentration: 25% by mass) 3.51 parts by mass
Surfactant B: Naroacty CL-95 (manufactured by Sanyo Chemical Industries Co., Ltd., solid content: 1% by mass) 1.20 parts by mass
Water 65.29 parts by mass
Methanol 30 parts by mass

Example 1

Production of Multilayer Structure

The surface of a PET film (A4300 manufactured by Toyobo Co., Ltd., thickness: 75 μm, refractive index: 1.66) was coated with a coating liquid A1 for a layer A as an undercoat layer using a wire bar such that the average thickness after drying became 100 nm. Subsequently, the resultant was heated at 130° C. for 1 minute, dried, and solidified, and then an undercoat layer was formed.

The obtained undercoat layer was coated with a coating liquid M1 for a metal particles-containing layer using a wire bar such that the average thickness after drying became 20 nm. Subsequently, the resultant was heated at 130° C. for 1 minute, dried, and solidified, and then a metal particles-containing layer was formed.

The surface of the obtained metal particles-containing layer was washed and an adhesive layer was laminated thereon. PET-W (manufactured by Sanritz Corporation) was used as the adhesive layer and the surface of the metal particles-containing layer was laminated with the surface from which a release sheet of one side of PET-W was peeled off.

The obtained multilayer structure was set as a multilayer structure of Example 1. The multilayer structure of Example 1 was illustrated in FIG. 1 (the adhesive layer formed on the metal particles-containing layer was not illustrated).

<Evaluation of Multilayer Structure>

—Measurement of Haze—

With a hazemeter (NDH-5000 made by Nippon Denshoku Industries Co., Ltd.), when the haze (%) of the multilayer structure obtained as above was measured, the value thereof was 1.48%. The obtained results are listed in Table 1 below.

<Production of Laminate Structure>

The release sheet of the obtained multilayer structure was peeled off. 0.5% by mass of a diluent of REAL PERFECT (manufactured by Lintec Corporation) was used as a construction solution and the sheet was laminated with transparent glass (thickness: 3 mm).

As the transparent glass, glass which was cleaned with isopropyl alcohol and left to stand was used, and the glass was pressed in the lamination in the surface pressure of 0.5 kg/cm$^2$ under the condition of 25° C. and the humidity of 65% using a rubber roller.

From above, a laminate structure of Example 1 in which the multilayer structure of Example 1 was laminated on the glass was prepared.

Further, such a configuration has a form in imitation of construction of an actual building material.

<Evaluation of Laminate Structure>

—Measurement of Reflection Spectrum and Transmission Spectrum—

In the laminate structure of Example 1, the reflection spectrum and the transmission spectrum were measured by using an ultraviolet-visible near infrared spectroscope (V-670 manufactured by JASCO Corporation). In the measurement of the reflection spectrum, an absolute reflectance measurement unit (ARV-474 manufactured by JASCO Corporation) was used, and incident light was incident light which can be considered to be unpolarized light through a 45° polarization plate.

Figure 7:
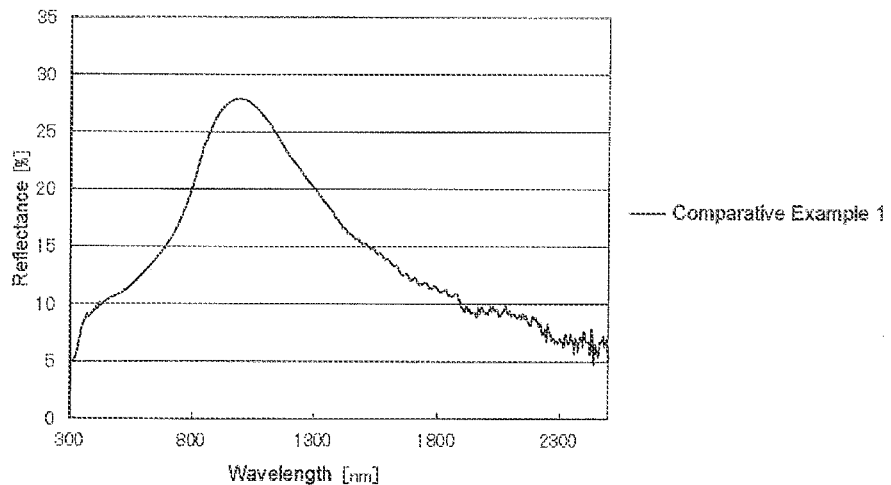
FIG. 7 illustrates a reflection spectrum according to Comparative Example 1.
Figure 8:
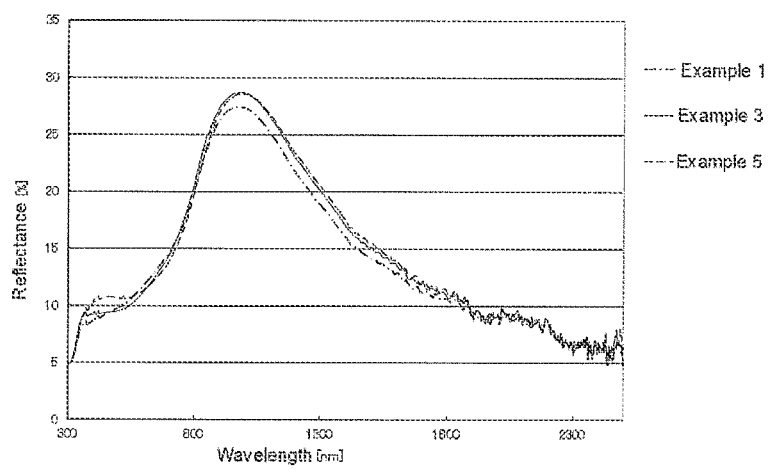
FIG. 8 illustrates reflection spectra of multilayer structures according to Examples 1, 3, and 5.
Figure 9:
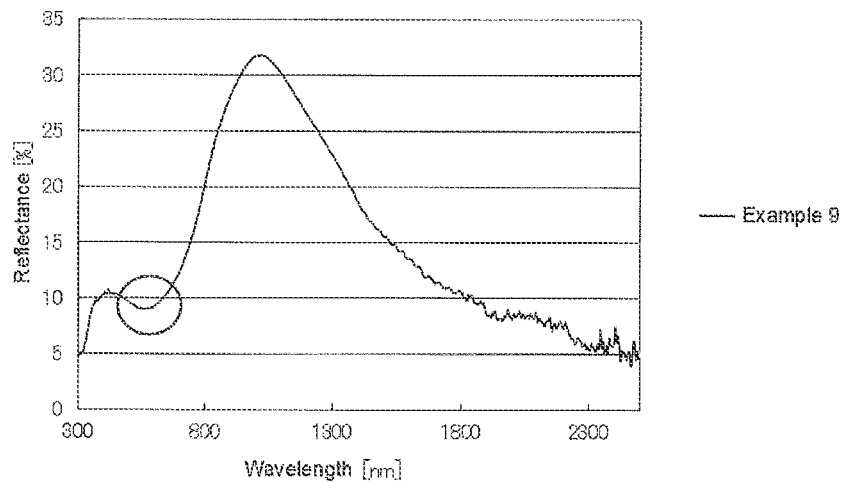
FIG. 9 illustrates a reflection spectrum according to Example 9.

The reflection spectrum and transmission spectrum measurement were similarly performed on structures of representative examples among respective Examples and Comparative Examples described below in addition to the laminate structure of Example 1, and the reflection spectra of respective Examples and Comparative Examples are illustrated in FIGS. 7 to 9.

The spectrum of Comparative Example 1 is illustrated in FIG. 7.

The spectra of Example 1, Example 3, and Example 5 are illustrated in FIG. 8. From these spectra, it was understood that low reflectance of visible light and high reflectance of near infrared light were kept in balance in the laminate structures of Examples 1 and 3, compared to Comparative Example 4.

The spectrum of Example 9 is illustrated in FIG. 9. From this spectrum, it was understood that the minimum value of reflection was in the visible light region. Further, in the reflection spectrum in the range of 380 nm to 1500 nm, it was understood that the minimum value of the reflection spectrum (the portion surrounded by a circle in FIG. 9) was present in the range of 380 nm to 780 nm.

—Visible Light Transmittance—

In regard to the laminate structure of Example 1, the results of the measurement of the visible light transmittance performed based on JIS A 5759 are listed in Table 1 below.

—Visible Light Reflectance—

In regard to the laminate structure of Example 1, the results of the measurement of the visible light reflectance performed based on JIS A 5759 are listed in Table 1 below.

—Solar Reflectance—

In regard to the laminate structure of Example 1, the results of the measurement of the solar reflectance performed based on JIS A 5759 are listed in Table 1 below.

Comparative Example 1

Figure 2:
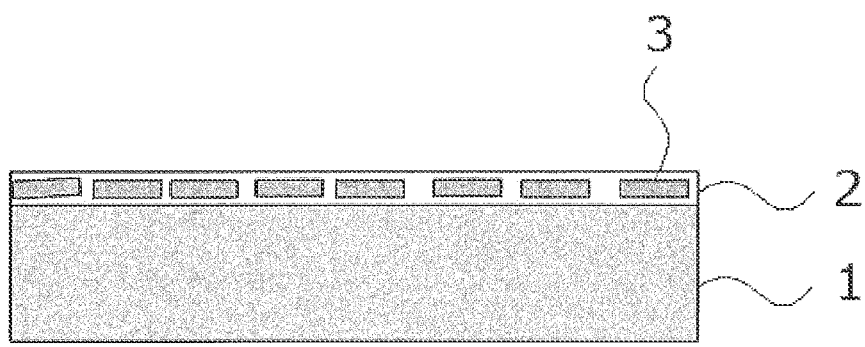
FIG. 2 a view schematically illustrating another example of a multilayer structure according to Comparative Example 1.

In Example 1, a multilayer structure of Comparative Example 1 and a laminate structure thereof were produced in the same manner as that of Example 1 except that the PET film was not coated with the coating liquid A1 for the layer A. The multilayer structure of Comparative Example 1 is illustrated in FIG. 2 (the adhesive layer formed on the metal particles-containing layer is not illustrated).

Examples 2 to 5 and Comparative Examples 2 and 3

In Example 1, multilayer structures of Examples 2 to 5 and Comparative Examples 2 and 3 and laminate structures thereof were produced in the same manner as that of Example 1 except that the coating thicknesses after drying of the coating liquid A1 for a layer A applied to the PET film were changed to 60 nm, 80 nm, 120 nm, 140 nm, 160 nm, and 180 nm as listed in Table 1 below.

Example 6

In Example 1, a multilayer structure of Example 6 and a laminate structure thereof were produced in the same manner as that of Example 1 except that the coating liquid M2 for the metal particles-containing layer was applied such that the coating thickness after drying became 160 nm in place of the coating liquid M1 for the metal particles-containing layer.

Example 7

The formed metal particles-containing layer in Example 1 was coated with the coating liquid A1 for the layer A as the overcoat layer using a wire bar such that the average thickness after drying became 50 nm. Subsequently, the resultant was heated at 130° C. for 1 minute, dried, and solidified, and then an overcoat layer was formed.

Subsequently, a multilayer structure of Example 7 and a laminate structure thereof were produced in the same manner as that of Example 1 except that an adhesive was laminated on the overcoat layer. The multilayer structure of Example 7 is illustrated in FIG. 3 (the adhesive layer formed on overcoat layer is not illustrated).

Example 8

A multilayer structure of Example 8 and a laminate structure thereof were prepared in the same manner as that of Example 7 except that the coating liquid A1 for the layer A was applied such that the average thickness of the overcoat layer in Example 7 after drying became 220 nm.

Example 9

The surface of a PET film (A4300 manufactured by Toyobo Corporation, thickness: 75 µm) was coated with a coating liquid B1 for a layer B as a second undercoat layer using a wire bar such that the average thickness after drying became 100 nm. Subsequently, the resultant was heated at 130° C. for 1 minute, dried, and solidified, and then a second undercoat layer was formed.

The obtained undercoat layer was coated with the coating liquid A2 for the layer A as a first undercoat layer using a wire bar such that the average thickness after drying became 45 nm. Subsequently, the resultant was heated at 130° C. for 1 minute, dried, and solidified, and then a first undercoat layer was formed.

The obtained first undercoat layer was coated with the coating liquid M1 for the metal particles-containing layer using a wire bar such that the average thickness after drying became 20 nm. Subsequently, the resultant was heated at 130° C. for 1 minute, dried, and solidified, and then a metal particles-containing layer was formed.

Next, a multilayer structure of Example 9 and a laminate structure thereof were produced in the same manner as that of Example 1. The multilayer structure of Example 9 is illustrated in FIG. 4 (the adhesive layer formed on the metal particles-containing layer is not illustrated).

Example 10

A multilayer structure of Example 10 and a laminate structure thereof were produced in the same manner as that of Example 9 except that the coating liquid A2 for the layer A was applied such that the average thickness of the first undercoat layer in Example 9 after drying became 220 nm.

Characteristics of the multilayer structures of Examples 2 to 10 and Comparative Examples 1 to 3 and the laminate structure thereof were evaluated in the same manner as that of Example 1. The results are listed in Table 1 below.

TABLE 1

| | Configuration of multilayer structure ||||||||||
| --- | --- | --- | --- | --- | --- | --- | --- | --- | --- | --- |
| | Layer C || Layer B |||| Layer A ||||
| | Composition | Refractive index n3 | Composition | Refractive index n2 | Thickness | Optical path length | Composition | Refractive index n1 | Thickness | Optical path length |
| Comparative Example 1 | — | — | — | — | — | — | PET | 1.66 | 75 um | 124.5 um |
| Comparative Example 2 | — | — | PET | 1.66 | 75 um | 124.5 um | Coating liquid A1 | 1.6 | 60 nm | 96 nm |
| Comparative Example 3 | — | — | PET | 1.66 | 75 um | 124.5 um | Coating liquid A1 | 1.6 | 80 nm | 128 nm |
| Example 1 | — | — | PET | 1.66 | 75 um | 124.5 um | Coating liquid A1 | 1.6 | 100 nm | 160 nm |
| Example 2 | — | — | PET | 1.66 | 75 um | 124.5 um | Coating liquid A1 | 1.6 | 120 nm | 192 nm |
| Example 3 | — | — | PET | 1.66 | 75um | 124.5 um | Coating liquid A1 | 1.6 | 140 nm | 224 nm |
| Example 4 | — | — | PET | 1.66 | 75 um | 124.5um | Coatin1 liquid A1 | 1.6 | 160 nm | 256 nm |
| Example 5 | — | — | PET | 1.66 | 75 um | 124.5 um | Coating liquid A1 | 1.6 | 180 nm | 288 nm |
| Example 6 | — | — | PET | 1.66 | 75 um | 124.5 um | Coating liquid A1 | 1.6 | 140 nm | 224 nm |
| Example 7 | — | — | PET | 1.66 | 75 um | 124.5 um | Coating liquid A1 | 1.6 | 140 nm | 224 nm |
| Example 8 | — | — | PET | 1.66 | 75 um | 124.5 um | Coating liquid A1 | 1.6 | 140 nm | 224 nm |
| Example 9 | PET | 1.66 | Coating liquid B1 | 1.4 | 100 nm | 140 nm | Coating liquid A2 | 1.6 | 45 nm | 72 nm |
| Example 10 | PET | 1.66 | Coating liquid B1 | 1.4 | 100 nm | 140 nm | Coating liquid A2 | 1.6 | 220 nm | 352 nm |

| | Configuration of multilayer structure ||||||| |
| --- | --- | --- | --- | --- | --- | --- | --- |
| | Overcoat layer (second layer A) |||||| Adhesive layer (second layer B) ||
| | Metal particles-containing layer || | | | Optical | | |
| | Composition | Thickness [nm] | Composition | Refractive index | Thickness [nm] | path length [nm] | Composition | Refractive index |
| Comparative Example 1 | Coating liquid M1 | 20 | — | — | — | — | PET-W | 1.53 |
| Comparative Example 2 | Coating liquid M1 | 20 | — | — | — | — | PET-W | 1.53 |
| Comparative Example 3 | Coating liquid M1 | 20 | — | — | — | — | PET-W | 1.53 |
| Example 1 | Coating liquid M1 | 20 | — | — | — | — | PET-W | 1.53 |
| Example 2 | Coating liquid M1 | 20 | — | — | — | — | PET-W | 1.53 |
| Example 3 | Coating liquid M1 | 20 | — | — | — | — | PET-W | 1.53 |
| Example 4 | Coating liquid M1 | 20 | — | — | — | — | PET-W | 1.53 |
| Example 5 | Coating liquid M1 | 20 | — | — | — | — | PET-W | 1.53 |
| Example 6 | Coating liquid M2 | 160 | — | — | — | — | PET-W | 1.53 |
| Example 7 | Coating liquid M1 | 20 | Coating liquid A1 | 1.6 | 50 | 80 | PET-W | 1.53 |
| Example 8 | Coating liquid M1 | 20 | Coating liquid A1 | 1.6 | 220 | 352 | PET-W | 1.53 |
| Example 9 | Coating liquid M1 | 20 | — | — | — | — | PET-W | 1.53 |
| Example 10 | Coating liquid M1 | 20 | — | — | — | — | PET-W | 1.53 |

TABLE 1-continued

| | | Evaluation | | | |
|---|---|---|---|---|---|
| | | Characteristics of laminate structure with, glass | | | |
| | Multilayer structure Haze value [%] | Wavelength λ for preventing reflection [nm] | Visible light transmittance [%] | Visible light reflectance [%] | Solar reflectance [%] |
| Comparative Example 1 | 1.48 | 600 | 77.2 | 11.5 | 15.3 |
| Comparative Example 2 | 1.42 | 600 | 79.4 | 11.2 | 14.8 |
| Comparative Example 3 | 1.45 | 600 | 79.5 | 11 | 14.9 |
| Example 1 | 1.34 | 600 | 79.7 | 10.6 | 15.1 |
| Example 2 | 1.35 | 600 | 79.9 | 10.3 | 15.3 |
| Example 3 | 1.34 | 600 | 80 | 10.1 | 15.4 |
| Example 4 | 1.35 | 600 | 79.9 | 10.2 | 15.3 |
| Example 5 | 1.34 | 600 | 79.7 | 10.5 | 15.2 |
| Example 6 | 1.7 | 600 | 76 | 9.8 | 12.1 |
| Example 7 | 1.32 | 600 | 30.4 | 9.6 | 15 |
| Example 8 | 1.3 | 600 | 30.4 | 9.5 | 15.2 |
| Example 9 | 1.27 | 600 | 80.9 | 8.7 | 14 |
| Example 10 | 1.29 | 600 | 80.9 | 8.9 | 16 |

From the results of respective Examples of Table 1, in the multilayer structure of the present invention and the laminate structure of the present invention for which the multilayer structure was used, it was understood that reflected light at a wavelength λ intended to prevent reflection was suppressed.

From the results of Comparative Example 1, in a case where an undercoat layer satisfying the condition (1-1) or the condition (2-1) of the present invention was not provided between the metal particles-containing layer and the support, it was understood that the reflectance at a wavelength λ intended to prevent reflection was increased.

From the results of Comparative Example 2 and 3, in a case where an undercoat layer having a film thickness (optical path length) not satisfying the condition (1-1) or the condition (2-1) of the present invention was provided, it was understood that the reflectance was increased, compared to the case where the undercoat layer having a film thickness (optical path length) not satisfying the condition (1-1) or (2-1) was provided.

Further, in Example 6, it was confirmed that absorption of visible light was increased.

—Confirmation of Existence Region of Tabular Metal Particles in Metal Particles-Containing Layer—

When the thickness of the metal particles-containing layer was referred to as d, the range in which 80% by number or more of the hexagonal to circular tabular metal particles relative to the total number of the hexagonal to circular tabular metal particles contained in the metal particules-containing layer were present was calculated from an image taken through SEM observation of a vertical cross-sectional sample of the multilayer structure.

As a result, in the multilayer structures of respective Examples and the multilayer structures of respective Comparative Examples other than Example 6, it was confirmed that 80% by number or more of the hexagonal to circular tabular metal particles relative to the total number of the hexagonal to circular tabular metal particles contained in the metal particules-containing layer were present in the range of λ/4.

(Confirmation of Particle Tilt Angle of Metal Particles-Containing Layer)

The multilayer structure was buried in an epoxy resin and frozen with liquid nitrogen. This was cut with a razor in the vertical direction to prepare a vertical cross-sectional sample of the material. The vertical cross-sectional sample was observed with a scanning electron microscope (SEM), and 100 tabular metal particles in the view field were analyzed in point of the tilt angle thereof to the horizontal plane of the substrate (corresponding to ±θ in FIG. 6B). The found data were averaged to produce an average value of the tilt angle.

(Evaluation Criterion of Tilt Angle)

A: ±10° C. or less

B: Over ±10° C.

As a result, the multilayer structure of Example 6 was evaluated by "B" and other Examples and Comparative Examples were evaluated by "A."

INDUSTRIAL APPLICABILITY

Since the multilayer structure of the present invention can suppress reflected light at a wavelength λ intended to prevent reflection, low reflectance of visible light and high reflectance of infrared light can be kept in balance. Accordingly, the heat ray shielding material can be favorably utilized as various members that are required to prevent heat ray transmission, for example, for films and laminate structures for vehicles such as automobiles, buses, or the like; films and laminate structures for buildings, or the like.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/072412, filed Aug. 22, 2013, and Japanese Patent Application No. 2012-192164 filed on Aug. 31, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

REFERENCE SIGNS LIST

1 Support
2 Metal Particles-Containing Layer
3 Tabular Metal Particles
4 Overcoat Layer
5 Undercoat Layer
5' Second Undercoat Layer
6 Adhesive Layer
D Diameter
L Thickness
F($\lambda$) Thickness of Particles-Existence Region

What is claimed is:

1. A multilayer structure including a metal particles-containing layer; a layer A having a refractive index, n1; and a layer B having a refractive index, n2 in that order, wherein the metal particles-containing layer and layer A are arranged in close contact with one another and layer A and layer B are arranged in close contact with one another, and wherein the metal particles-containing layer is a silver particles-containing layer, and wherein one of the following conditions (1-1) and (2-1) is satisfied, Condition (1-1): n1<n2 and Expression (1-1) below are satisfied, $$\lambda/4+m\lambda/2 < n1 \times d1 < \lambda/2+m\lambda/2 \qquad \text{Expression (1-1)}$$

wherein in Expression (1-1), m represents an integer of 0 or greater; $\lambda$ represents a wavelength with a unit of nm intended to prevent reflection; n1 represents a refractive index of the layer A; and d1 represents a thickness with a unit of nm of the layer A, Condition (2-1): n1>n2 and Expression (2-1) below are satisfied, $$0+m\lambda/2 < n1 \times d1 < \lambda/4+m\lambda/2 \qquad \text{Expression (2-1)}$$

wherein in Expression (2-1), m represents an integer of 0 or greater; $\lambda$ represents a wavelength with a unit of nm intended to prevent reflection; n1 represents a refractive index of the layer A; and d1 represents a thickness with a unit of nm of the layer A.

2. The multilayer structure according to claim 1, wherein one of the following conditions (1-2) and (2-2) is satisfied, Condition (1-2): n1<n2 and Expression (1-2) below are satisfied, $$7\lambda/24+m\lambda/2 \leq n1 \times d1 \leq 11\lambda/24+m\lambda/2 \qquad \text{Expression (1-2)}$$

wherein in Expression (1-2), m represents an integer of 0 or greater; $\lambda$ represents a wavelength with a unit of nm intended to prevent reflection; n1 represents a refractive index of the layer A; and d1 represents a thickness with a unit of nm of the layer A, Condition (2-2): n1>n2 and Expression (2-2) below are satisfied, $$1\lambda/24+m\lambda/2 \leq n1 \times d1 \leq 5\lambda/24+m/2 \qquad \text{Expression (2-2)}$$

wherein in Expression (2-2), m represents an integer of 0 or greater; $\lambda$ represents a wavelength with a unit of nm intended to prevent reflection; n1 represents a refractive index of the layer A; and d1 represents a thickness with a unit of nm of the layer A.

3. The multilayer structure according to claim 1, wherein one of the following conditions (1-3) and (2-3) is satisfied, Condition (1-3): n1<n2 and Expression (1-3) below are satisfied, $$5\lambda/16+m\lambda/2 \leq n1 \times d1 \leq 7\lambda/16+m\lambda/2 \qquad \text{Expression (1-3)}$$

wherein in Expression (1-3), m represents an integer of 0 or greater; $\lambda$ represents a wavelength with a unit of nm intended to prevent reflection; n1 represents a refractive index of the layer A; and d1 represents a thickness with a unit of nm of the layer A, Condition (2-3): n1>n2 and Expression (2-3) below are satisfied, $$1\lambda/16+m\lambda/2 \leq n1 \times d1 \leq 3\lambda/16+m\lambda/2 \qquad \text{Expression (2-3)}$$

wherein in Expression (2-3), m represents an integer of 0 or greater; $\lambda$ represents a wavelength with a unit of nm intended to prevent reflection; n1 represents a refractive index of the layer A; and d1 represents a thickness with a unit of nm of the layer A.

4. The multilayer structure according to claim 1, wherein main metal particles contained in the metal particles-containing layer are tabular metal particles having forms of hexagonal to circular forms.

5. The multilayer structure according to claim 1, wherein 80% by number or more of the tabular metal particles having a hexagonal to circular forms relative to the total number of the hexagonal to circular tabular metal particles contained in the metal particles-containing layer are present in a range of $\lambda/4$ in terms of the thickness in the metal particles-containing layer and $\lambda$ represents a wavelength with a unit of nm intended to prevent reflection.

6. The multilayer structure according to claim 1, wherein the thickness of the metal particles-containing layer is $\lambda/4$ or less and $\lambda$ represents a wavelength with a unit of nm intended to prevent reflection.

7. The multilayer structure according to claim 1, wherein one side of the metal particles-containing layer includes a layer C in contact with the layer B and the layer B satisfies Expression (3-1) below, $$L\lambda/4-\lambda/8 \leq n2 \times d2 \leq L\lambda/4+\lambda/8 \qquad \text{Expression (3-1)}$$

wherein in Expression (3-1), L represents an integer of 1 or greater; $\lambda$ represents a wavelength with a unit of nm intended to prevent reflection; n2 represents a refractive index of the layer B; and d2 represents a thickness with a unit of nm of the layer B.

8. The multilayer structure according to claim 7, wherein the layer B satisfies Expression (3-2) below, $$L\lambda/4-\lambda/12 \leq n2 \times d2 \leq L\lambda/4+\lambda/12 \qquad \text{Expression (3-2)}$$

wherein in Expression (3-2), L represents an integer of 1 or greater; $\lambda$ represents a wavelength with a unit of nm intended to prevent reflection; n2 represents a refractive index of the layer B; and d2 represents a thickness with a unit of nm of the layer B.

9. The multilayer structure according to claim 7, wherein the layer B satisfies Expression (3-3) below, $$L\lambda/4-\lambda/16 \leq n2 \times d2 \leq L\lambda/4+\lambda/16 \qquad \text{Expression (3-3)}$$

wherein in Expression (3-3), L represents an integer of 1 or greater; $\lambda$ represents a wavelength with a unit of nm intended to prevent reflection; n2 represents a refractive index of the layer B; and d2 represents a thickness with a unit of nm of the layer B.

10. The multilayer structure according to claim 7, wherein the layer B is a laminate formed of a plurality of layers B' and all of the layers B' respectively satisfy Expression (3-1) described above.

11. The multilayer structure according to claim 7, wherein a refractive index n3 of the layer C is greater than a refractive index n2 of the layer B.

12. The multilayer structure according to claim 7, which includes a layer C as a support.

13. The multilayer structure according to claim 1, wherein one side of the metal particles-containing layer includes the layer C in contact with the layer B and the layer B satisfies Expression (4-1) below, $$k\lambda'/4 - \lambda/8 \le n2 \times d2 \le k\lambda'/4 + \lambda/8 \quad \text{Expression (4-1)}$$

wherein in Expression (4-1), k represents an integer of 1 or greater; λ' represents a wavelength with a unit of nm intended to have strong reflection; n2 represents a refractive index of the layer B; and d2 represents a thickness with a unit of nm of the layer B.

14. The multilayer structure according to claim 13, wherein the layer B satisfies Expression (4-2) below, $$k\lambda'/4 - \lambda/12 \le n2 \times d2 \le k\lambda'/4 + \lambda/12 \quad \text{Expression (4-2)}$$

wherein in Expression (4-2), k represents an integer of 1 or greater; λ' represents a wavelength with a unit of nm intended to have strong reflection; n2 represents a refractive index of the layer B; and d2 represents a thickness with a unit of nm of the layer B.

15. The multilayer structure according to claim 13, wherein the layer B satisfies Expression (4-3) below, $$k\lambda'/4 - \lambda/16 \le n2 \times d2 \le k\lambda'/4 + \lambda/16 \quad \text{Expression (4-3)}$$

wherein in Expression (4-3), k represents an integer of 1 or greater; λ' represents a wavelength with a unit of nm intended to have strong reflection; n2 represents a refractive index of the layer B; and d2 represents a thickness with a unit of nm of the layer B.

16. The multilayer structure according to claim 13, wherein the layer B is a laminate formed of a plurality of layers B' and all of the layers B' respectively satisfy Expression (4-1) described above.

17. The multilayer structure according to claim 1, wherein a second layer A and a second layer B which satisfy the above-described condition (1-1) or (2-1) are present on the opposite side of the layer A and the layer B of the metal particles-containing layer.

18. The multilayer structure according to claim 1, wherein m is 1 or more.

19. The multilayer structure according to claim 1, which includes a support.

20. The multilayer structure according to claim 19, which the support is the layer B.

21. The multilayer structure according to claim 19, wherein the refractive index at a wavelength λ of the support is 1.55 or more and λ represents a wavelength with a unit of nm intended to prevent reflection.

22. The multilayer structure according to claim 19, wherein the support contains PET as a main component.

23. The multilayer structure according to claim 1, wherein a minimum value of a reflection spectrum is present in the range of visible light having a wavelength of 380 nm to 780 nm.

24. The multilayer structure according to claim 1, wherein a minimum value of the reflection spectrum in the range of a wavelength of 380 nm to 1500 nm is present in the range of a wavelength of 380 nm to 780 nm in the reflection spectrum.

25. The multilayer structure according to claim 1, wherein a visible light transmittance thereof is 60% or more.

26. The multilayer structure according to claim 1, wherein a haze value thereof is 5% or less.

27. The multilayer structure according to claim 1, wherein the wavelength λ intended to prevent reflection is in the range of 400 nm to 700 nm.

28. The multilayer structure according to claim 1, which is used for a heat ray shielding material.

29. The multilayer structure according to claim 1, which further includes an adhesive layer.

30. The multilayer structure according to claim 29, wherein a second layer A and a second layer B which satisfy the above-described condition (1-1) or (2-1) are present on the opposite side of the layer A and the layer B of the metal particles-containing layer and the second layer B is the adhesive layer.

31. A laminate structure which is obtained by laminating the multilayer structure and one of glass and plastic,
  wherein the multilayer structure includes a metal particles-containing layer; a layer A having a refractive index, n1; and a layer B having a refractive index, n2 in that order, wherein the metal particles-containing layer and layer A are arranged in close contact with one another and layer A and layer B are arranged in close contact with one another, and wherein the metal particles-containing layer is a silver particles-containing layer, and wherein one of the following conditions (1-1) and (2-1) is satisfied,
  Condition (1-1): n1<n2 and Expression (1-1) below are satisfied, $$\lambda/4 + m\lambda/2 < n1 \times d1 < \lambda/2 + m\lambda/2 \quad \text{Expression (1-1)}$$

wherein in Expression (1-1), m represents an integer of 0 or greater; λ represents a wavelength with a unit of nm intended to prevent reflection; n1 represents a refractive index of the layer A; and d1 represents a thickness with a unit of nm of the layer A,
  Condition (2-1): n1>n2 and Expression (2-1) below are satisfied, $$0 + m\lambda/2 < n1 \times d1 < \lambda/4 + m\lambda/2 \quad \text{Expression (2-1)}$$

wherein in Expression (2-1), m represents an integer of 0 or greater; λ represents a wavelength with a unit of nm intended to prevent reflection; n1 represents a refractive index of the layer A; and d1 represents a thickness with a unit of nm of the layer A.

* * * * *